United States Patent
Lee et al.

(10) Patent No.: US 10,680,322 B2
(45) Date of Patent: Jun. 9, 2020

(54) COIL SHARING METHOD AND DEVICE

(71) Applicant: SAMSUNG ELECTRONICS CO., LTD., Suwon-si, Gyeonggi-do (KR)

(72) Inventors: Woosup Lee, Suwon-si (KR); Younju Kim, Suwon-si (KR); Jungoh Sung, Suwon-si (KR); Taekun Kim, Incheon (KR); Sehwan Choi, Suwon-si (KR); Sungchul Park, Seoul (KR); Jungsik Park, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/306,167

(22) PCT Filed: Jul. 20, 2017

(86) PCT No.: PCT/KR2017/007828
§ 371 (c)(1),
(2) Date: Nov. 30, 2018

(87) PCT Pub. No.: WO2018/016892
PCT Pub. Date: Jan. 25, 2018

(65) Prior Publication Data
US 2019/0214719 A1    Jul. 11, 2019

(30) Foreign Application Priority Data

Jul. 20, 2016 (KR) .......... 10-2016-0092056

(51) Int. Cl.
*H04B 5/00* (2006.01)
*H04B 1/04* (2006.01)
(Continued)

(52) U.S. Cl.
CPC ............. *H01Q 1/521* (2013.01); *G06K 19/06* (2013.01); *G06Q 20/325* (2013.01); *H01F 38/14* (2013.01);
(Continued)

(58) Field of Classification Search
CPC ... H04B 1/38; H04B 1/40; H04B 1/48; H04B 5/0037; H04B 5/0081; H04W 4/80;
(Continued)

(56) References Cited

U.S. PATENT DOCUMENTS 7,602,340 B2 * 10/2009 Sato .................. H01Q 3/44
343/700 MS
8,200,301 B2 * 6/2012 Yamamoto ............. H01Q 1/243
370/339

(Continued)

FOREIGN PATENT DOCUMENTS

EP    2804290    11/2014
JP    3747677    12/2005
(Continued)

OTHER PUBLICATIONS

International Search Report for PCT/KR2017/007828, dated Oct. 27, 2017, 3 pages.
(Continued)

*Primary Examiner* — Quochien B Vuong
(74) *Attorney, Agent, or Firm* — Nixon & Vanderhye, P.C.

(57) ABSTRACT

An electronic device comprises: a first cover constituting the front surface of the electronic device; a second cover constituting the rear surface of the electronic device; a memory included in a space formed between the first cover and the second cover; a processor included in the space and electrically connected with the memory; a first antenna and a second antenna included in the space and electrically con-
(Continued)

nected with the processor; and a switch included in the space and connected to the first antenna and/or the second antenna, wherein the memory can include, during execution, instructions for: allowing the first antenna and the second antenna to be connected by shorting the switch when the processor executes a function corresponding to the first antenna; and allowing the first antenna and the second antenna to transmit magnetic field signals together. Other examples are also possible.

15 Claims, 54 Drawing Sheets

(51) Int. Cl.

| | | |
|---|---|---|
| *H01Q 1/52* | (2006.01) | |
| *H02J 50/12* | (2016.01) | |
| *H02J 7/02* | (2016.01) | |
| *G06K 19/06* | (2006.01) | |
| *H04M 1/02* | (2006.01) | |
| *H02J 5/00* | (2016.01) | |
| *H02J 50/20* | (2016.01) | |
| *G06Q 20/32* | (2012.01) | |
| *H01F 38/14* | (2006.01) | |
| *H01Q 7/00* | (2006.01) | |

(52) U.S. Cl.
CPC .............. *H01Q 7/00* (2013.01); *H02J 5/005* (2013.01); *H02J 7/025* (2013.01); *H02J 50/12* (2016.02); *H02J 50/20* (2016.02); *H04B 1/0475* (2013.01); *H04B 5/00* (2013.01); *H04B 5/0087* (2013.01); *H04M 1/02* (2013.01)

(58) Field of Classification Search
CPC ....... H04W 88/06; H01Q 1/242; H01Q 1/243; H01Q 1/2291; H01Q 3/247; H01Q 5/00; H01Q 5/321; H01Q 21/30; H01Q 23/00

USPC .......................... 455/41.1, 41.2, 552.1, 553.1
See application file for complete search history.

(56) References Cited

U.S. PATENT DOCUMENTS

| | | | | |
|---|---|---|---|---|
| 8,482,474 | B2 * | 7/2013 | Baba ...................... | H01Q 1/246 |
| | | | | 343/795 |
| 8,922,162 | B2 * | 12/2014 | Park ......................... | H02J 7/00 |
| | | | | 320/108 |
| 9,160,073 | B2 * | 10/2015 | Okada .................. | H01Q 9/0407 |
| 9,503,081 | B2 * | 11/2016 | Yang ..................... | H03K 17/693 |
| 9,837,857 | B2 * | 12/2017 | Fujiwara ................. | H02J 17/00 |
| 10,511,093 | B2 * | 12/2019 | Shamblin ............... | H01Q 5/392 |
| 2010/0279606 | A1 | 11/2010 | Hillan et al. | |
| 2011/0241950 | A1 * | 10/2011 | Milosavljevic .......... | H01Q 1/52 |
| | | | | 343/702 |
| 2013/0038278 | A1 | 2/2013 | Park et al. | |
| 2014/0035793 | A1 | 2/2014 | Kato et al. | |
| 2015/0054455 | A1 | 2/2015 | Kim et al. | |
| 2016/0204836 | A1 | 7/2016 | Lee et al. | |
| 2017/0170562 | A1 * | 6/2017 | Lee ........................ | H01Q 1/243 |

FOREIGN PATENT DOCUMENTS

| | | | |
|---|---|---|---|
| KR | 10-2013-0015618 | | 2/2013 |
| KR | 10-2013-0016588 | | 2/2013 |
| KR | 20130015618 A | * | 2/2013 |
| KR | 10-1276650 | | 6/2013 |
| KR | 10-2013-0102218 | | 9/2013 |
| KR | 10-2014-0091362 | | 7/2014 |
| KR | 10-2015-0077884 | | 7/2015 |

OTHER PUBLICATIONS

Written Opinion of the ISA for PCT/KR2017/007828, dated Oct. 27, 2017, 6 pages.
Extended European Search Report dated Jun. 7, 2019 in European Patent Application No. 17831365.6.

* cited by examiner

FIG. 13C
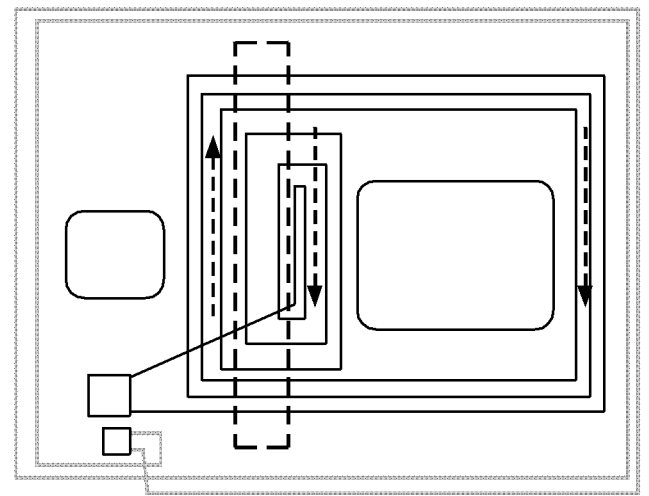
<1370>
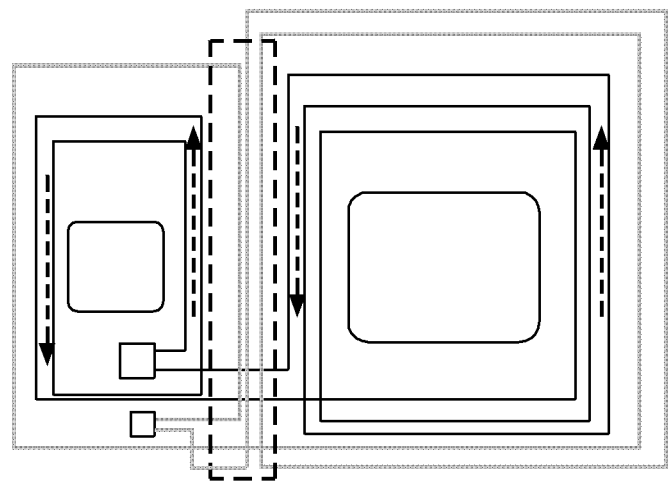
<1360>
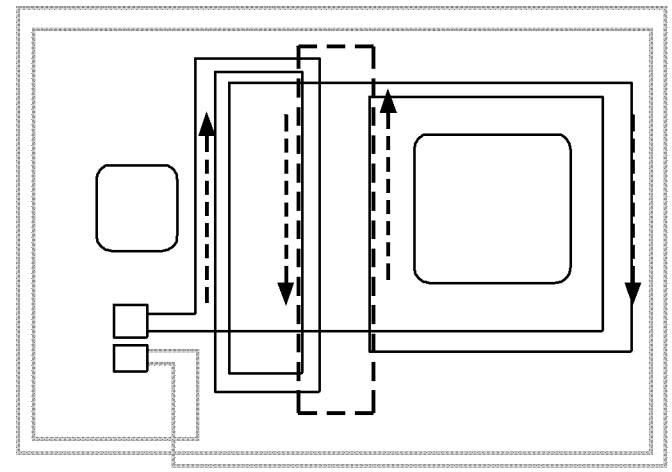
<1350>

FIG. 19
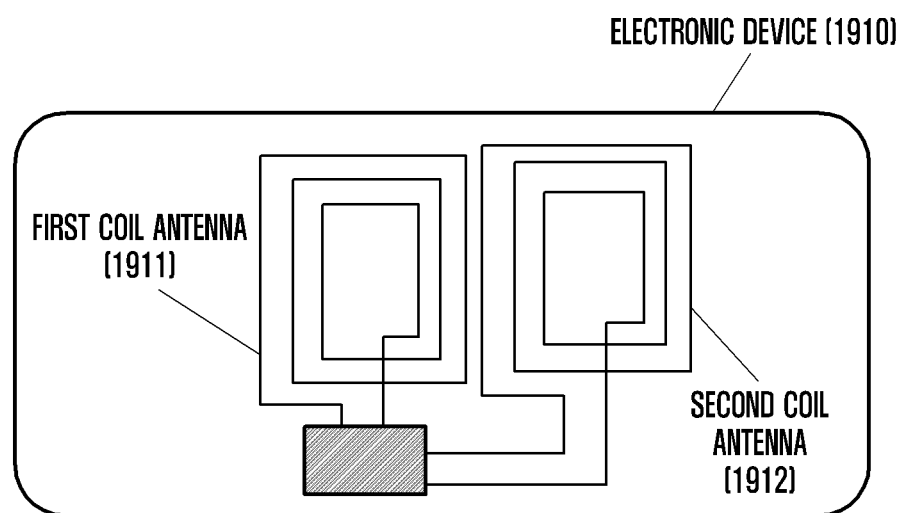
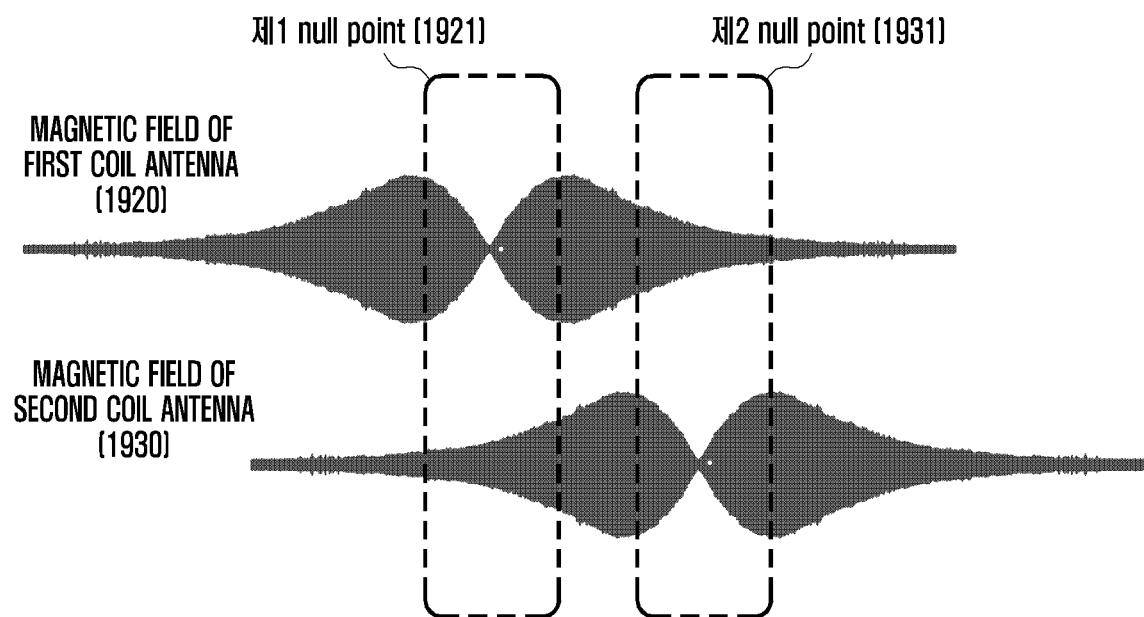

FIG. 20
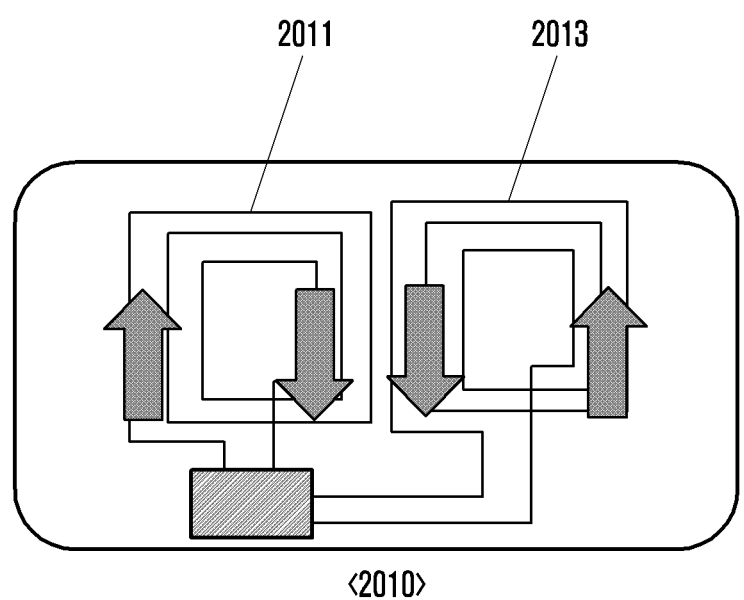
⟨2010⟩
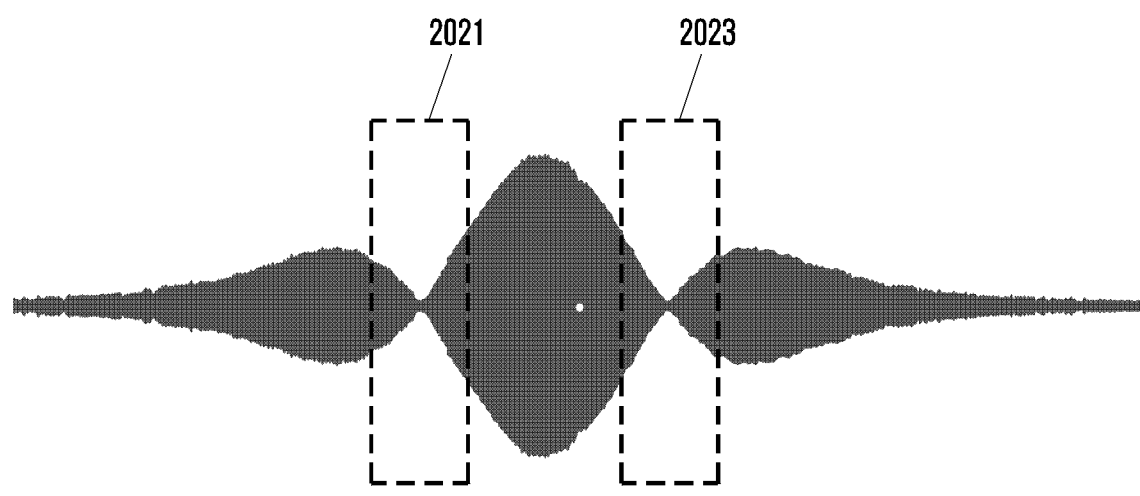
⟨2020⟩

FIG. 21
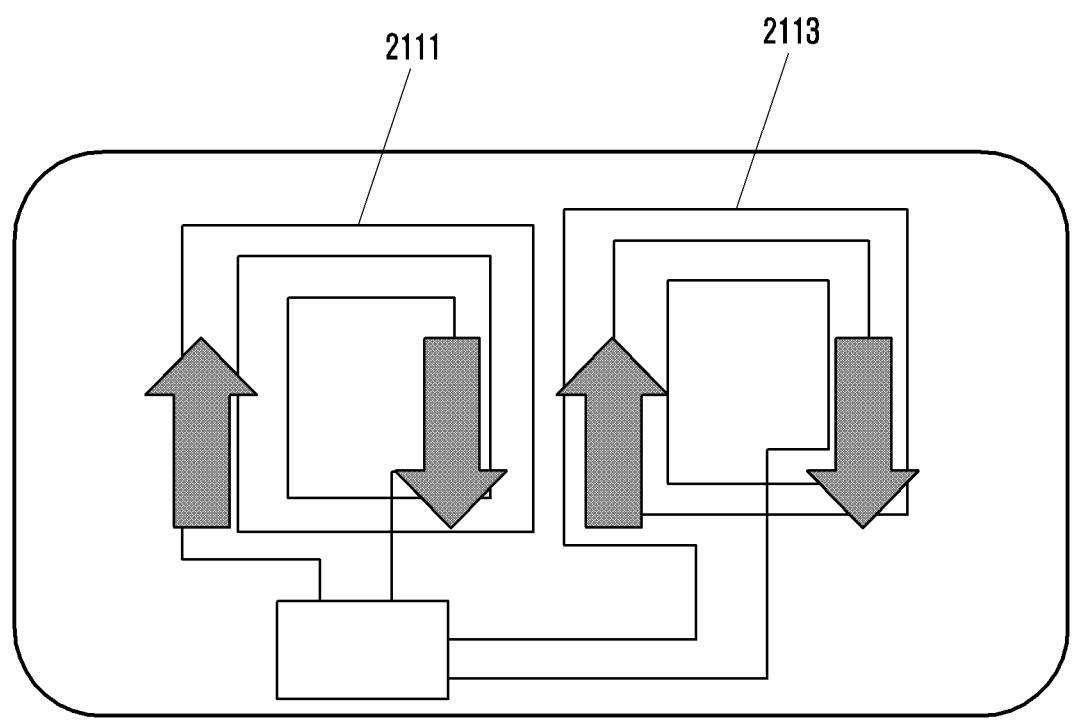
⟨2110⟩
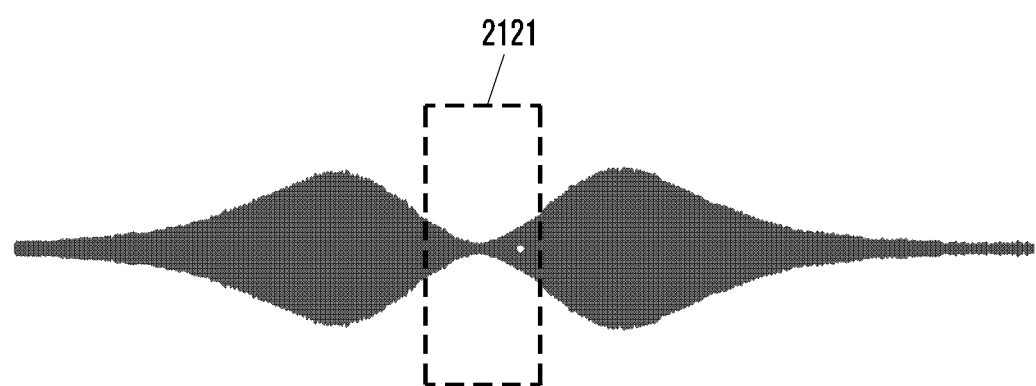
⟨2120⟩

| | MST | WPC | A4WP | NFC |
|---|---|---|---|---|
| FREQUENCY | 0.5Khz~5Khz | 100~200Khz | 6.78Mhz | 13.56Mhz |
| Inductance | 15uH~80uH | 8.8uH | 1uH~2uH | 0.5uH~1uH |

COIL SHARING METHOD AND DEVICE

This application is the U.S. national phase of International Application No. PCT/KR2017/007828, filed 20 Jul. 2017, which designated the U.S., and claims priority to KR Patent Application No. 10-2016-0092056 filed 20 Jul. 2016, the entire contents of each of which are hereby incorporated by reference.

TECHNICAL FIELD

Embodiments of the present disclosure relate to a method of sharing a coil and an electronic device using the same.

BACKGROUND ART

Technologies for transmitting power or data according to a magnetic induction method using the coil of an electronic device are increasing. For example, power may be transmitted using wireless power consortium (WPC) or alliance for wireless power (A4WP), that is, an international standard. Data may be transmitted using magnetic secure transfer (MST) or near field communication (NFC).

DISCLOSURE

Technical Problem

In order to apply the aforementioned different technologies (WPC, A4WP, MST and NFC), a coil optimized for each technology may be necessary. In this case, there is limitation to the area and thickness in a small electronic device, such as a smartphone. There may be a difficulty in securing coil performance due to interference attributable to surrounding coils. Each of the technologies may have different frequency characteristics and may have different inductance for performance optimization. Furthermore, inductors (e.g., coils) having proximate resonant frequencies may act as mutual interference.

Solution to Problem

An electronic device according to various embodiments includes a first cover configured to form the front of the electronic device; a second cover configured to form the back of the electronic device; memory included in a space formed between the first cover and the second cover; a processor included in the space and electrically connected to the memory; a first antenna and second antenna included in the space and electrically connected to the processor, and a switch included in the space and connected to at least one of the first antenna and the second antenna. When the memory may be executed, the memory may include instructions enabling the processor to short-circuit the switch so that the first antenna and the second antenna are connected when the processor executes a function corresponding to the first antenna; and the first antenna and the second antenna together transmits magnetic field signals.

A method of operating an electronic device including a first antenna, a second antenna and a switch connected to at least one of the first antenna and the second antenna according to various embodiments may include an operation of connecting the first antenna and the second antenna by short-circuiting the switch when a function corresponding to the first antenna may be executed; and an operation for the first antenna and the second antenna to transmit magnetic field signals together.

Advantageous Effects

In accordance with the embodiments of the present disclosure, the length of a coil in the electronic device can be adjusted using the switch. Accordingly, performance can be optimized in each of the technologies. Furthermore, the best performance can be obtained without mutual interference in the operations of different technologies through the on/off of the switch.

BRIEF DESCRIPTION OF DRAWINGS

FIGS. 13A to 13D are diagrams schematically showing the structures of loop antennas according to various embodiments of the present disclosure.

FIG. 19 schematically shows a plurality of coil antennas within an electronic device according to various embodiments of the present disclosure and is a diagram showing the intensities of magnetic fields and null points generated in a plurality of coil antennas.

FIG. 20 schematically shows a plurality of coil antennas within an electronic device, and FIG. 21 is a diagram showing the intensities of magnetic fields and null points generated in a plurality of coil antennas according to various embodiments of the present disclosure.

FIG. 27 is a diagram illustrating the best frequency and inductance necessary for each radio technology according to embodiments of the present disclosure.

MODE FOR THE EXAMPLE EMBODIMENTS

Figure 1:
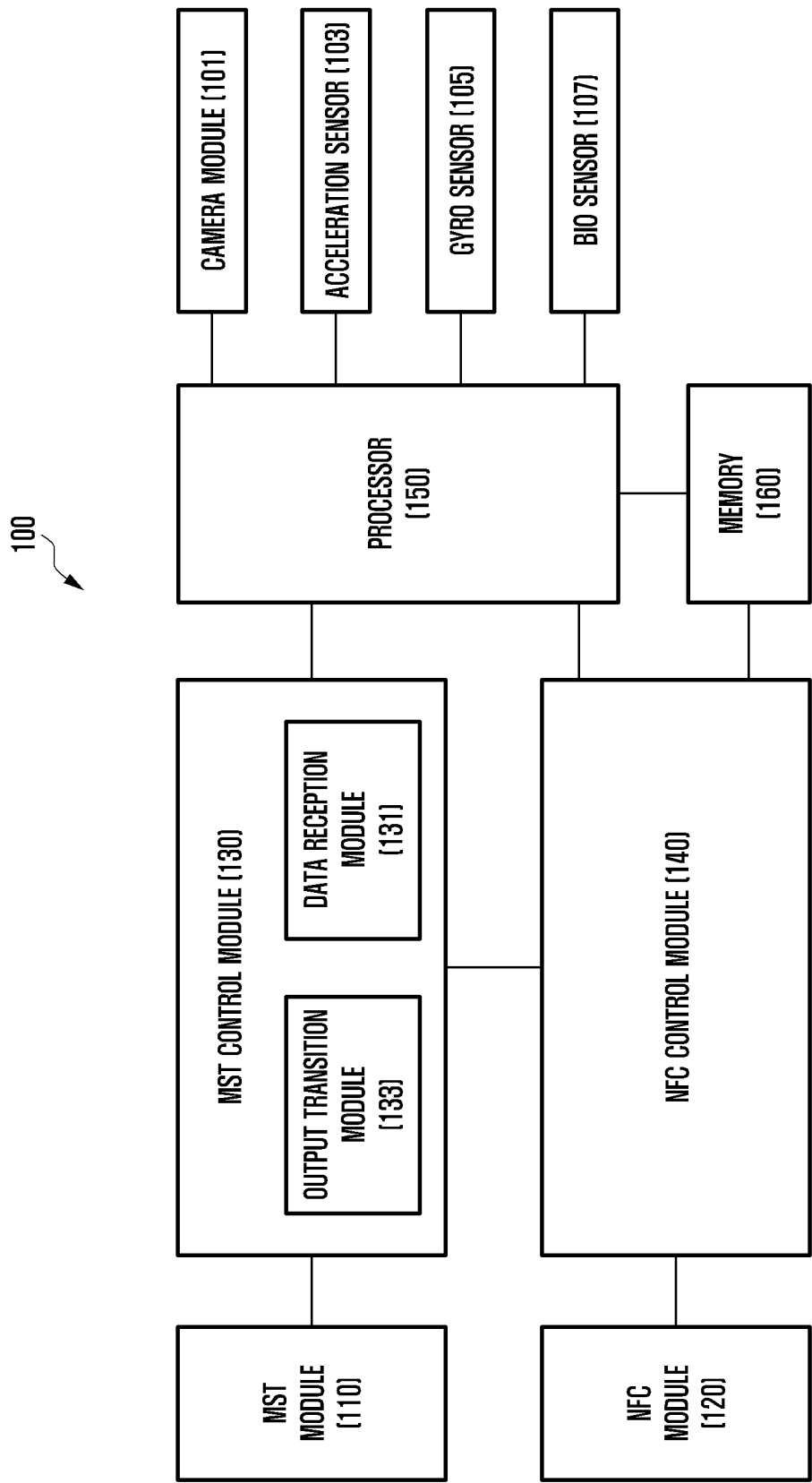
FIG. 1 is a block diagram of an electronic device capable of performing a payment function according to embodiments of the present disclosure.

Hereinafter, embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered to be limited thereto. The same reference numerals are used throughout the drawings to refer to the same or like parts.

An expression "comprising" or "may comprise" used in the present disclosure indicates presence of a corresponding function, operation, or element and does not limit an additional at least one function, operation, or element. The term "comprise" or "have" used herein indicates presence of a characteristic, numeral, step, operation, element, component, or combination thereof described in the Specification and does not exclude presence or addition of at least one other characteristic, numeral, step, operation, element, component, or combination thereof.

In the present disclosure, the term "or" includes any combination or the entire combination of together listed words. For example, "A or B" may include A, B, or A and B.

Expressions such as "a first" and "a second" in the present disclosure may represent various elements of the present disclosure, but do not limit corresponding elements, e.g., do not limit order and/or importance of corresponding elements, but may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that a first element is "coupled" to another element, such as a second element, the first element may be "directly coupled" to the second element or "electrically coupled" to the second element through a third element. However, when it is described that a first element is "directly coupled" to a second element, no third element may exist between the first and second elements.

Terms used in the present disclosure are not intended to limit the present disclosure but to illustrate embodiments of the present disclosure. When using in a description of the present disclosure and the appended claims, a singular form includes a plurality of forms unless it is explicitly differently represented.

Unless differently defined, terms including a technical term and a scientific term used herein have the same meaning as may be generally understood by a person of common skill in the art. It should be understood that generally using terms defined in a dictionary have a meaning corresponding to that of a context of related technology and are not understood to have an ideal or excessively formal meaning unless explicitly defined.

In this disclosure, an electronic device may have a communication function. For example, an electronic device may be a smart phone, a tablet PC, a mobile phone, a video phone, an e-book reader, a desktop PC, a laptop PC, a netbook computer, a PDA (personal digital assistant), a PMP (portable multimedia player), an MP3 player, a portable medical device, a digital camera, or a wearable device, such as an HMD (head-mounted device) in the form of electronic glasses, electronic clothes, an electronic bracelet, an electronic necklace, an electronic appcessory, or a smart watch.

According to some embodiments, an electronic device may be a smart home appliance that involves a communication function, such as a TV (television), a DVD (digital video disk) player, audio equipment, a refrigerator, an air conditioner, a vacuum cleaner, an oven, a microwave, a washing machine, an air cleaner, a set-top box, a TV box, such as Samsung HomeSync™, Apple TV™, and Google TV™, a game console, an electronic dictionary, an electronic key, a camcorder, or an electronic picture frame.

According to some embodiments, an electronic device may be a medical device, such as MRA (magnetic resonance angiography), MRI (magnetic resonance imaging), CT (computed tomography), and ultrasonography, a navigation device, a GPS (global positioning system) receiver, an EDR (event data recorder), an FDR (flight data recorder), a car infotainment device, electronic equipment for ship, such as a marine navigation system or a gyrocompass), avionics, security equipment, or an industrial or home robot.

According to some embodiments, an electronic device may be furniture or part of a building or construction having a communication function, an electronic board, an electronic signature receiving device, a projector, or various measuring instruments, such as a water, electric, gas, or a wave meter. An electronic device disclosed herein may be one of the above-mentioned devices or any combination thereof. As well understood by those skilled in the art, the above-mentioned electronic devices are not to be considered as a limitation of the present disclosure.

An electronic device according to various embodiments of this document may be one of the aforementioned various devices or a combination of one or more of them. Furthermore, the electronic device according to various embodiments of this document may be a flexible device. Furthermore, it is evident to those skilled in the art that the electronic device according to various embodiments of this document is not limited to the aforementioned devices.

The electronic device according to embodiments of the present disclosure may generate a magnetic field signal. For example, the magnetic field signal generated by the electronic device may be a signal of a form similar to a magnetic field signal generated when a magnetic card swipes the card reader of a card reading device (e.g., point of sale (POS) reader). For example, a user may pay a cost without a magnetic card by bringing an electronic device that has generated a magnetic field signal into contact with a card reading device (or by making the electronic device proximate to the card reading device).

A magnetic field communication method may include near field communication (NFC) or magnetic secure transmission or near field magnetic data stripe transmission (MST). The methods may be different in the data ratio (bit/sec) and a communication range and frequency.

Hereinafter, an electronic device according to various embodiments is described with reference to the accompanying drawings. In this document, a term "user' may refer to a person who use an electronic device or a device (e.g., an artificial intelligence electronic device) using an electronic device.

WPC disclosed in the present disclosure discloses a representative example of induction method wireless charging, and may support various types of induction method wireless charging (e.g., power matters alliance (PMA)).

FIG. 1 is a block diagram of an electronic device capable of performing a payment function according to embodiments of the present disclosure.

Referring to FIG. 1, in accordance with various embodiments of the present disclosure, the electronic device 100 may include a camera module 101, an acceleration sensor 103, a gyro sensor 105, a bio sensor 107, an MST module 110, an NFC module 120, an MST control module 130, an NFC control module 140, a processor 150, and memory 160, for example.

In accordance with one embodiment, the camera module 101 may obtain card information by photographing a card for payment. The camera module 101 may recognize card information (e.g., a card company, a card number, a valid date or a card owner) written in a card through an optical character reader (OCR) function. Or a user may input necessary card information to the electronic device using an input device (e.g., a touch panel, a pen sensor, a key, an ultrasonic input device or a microphone input device) included in the device.

In accordance with one embodiment, the acceleration sensor 103 or the gyro sensor 105 may obtain information about the location of the electronic device when performing payment. The obtained information about the location of the electronic device is delivered to the processor 150. The processor 150 may adjust the intensity of a magnetic field transmitted to a POS terminal or select a coil antenna used if a plurality of coil antennas is used through control of the intensity of current supplied to the antenna (e.g., coil antenna) of the MST module 110 based on the obtained information about the location of the electronic device.

In accordance with one embodiment, the bio sensor 107 may obtain bio information (e.g., a fingerprint or an iris) of a user in order to perform card or user authentication for payment.

In accordance with one embodiment, the MST module 110 may include a coil antenna. The MST control module 130 may supply voltages of different directions across the coil antenna in response to data (e.g., 0 or 1 bit), and may control the direction of current flowing into the coil antenna. A signal (magnetic field signal by a coil through which current flows) transmitted to the coil antenna may generate an induced electromotive force with respect to a POS terminal in a form similar to an operation of making a magnetic card actually read by the POS terminal.

In accordance with one embodiment, the MST control module 130 may include a data reception module 131 and an output transition module 133. The data reception module 131 may receive a pulse of a logical low/high form including payment information transmitted by the processor 150 (or security module within the electronic device 100).

In accordance with one embodiment, the output transition module 133 may include a circuit for converging data recognized by the data reception module 131 into a required form in order to deliver the data to the MST module 110. The circuit may include a circuit (H-Bridge) for changing the direction of voltages supplied to both ends of the MST module 110.

In accordance with one embodiment, the electronic device 100 may receive payment information (e.g., track 1, track 2, track 3 or token information), included in at least part of a magnetic stripe of a card (e.g., magnetic card), from a card company/bank server through a communication module (not shown) based on card information input through the camera module 101 or the input device (e.g., a touch panel or a pen sensor), and may store the payment information in the processor 150 or a separated embedded security module in a require form.

Figure 2:
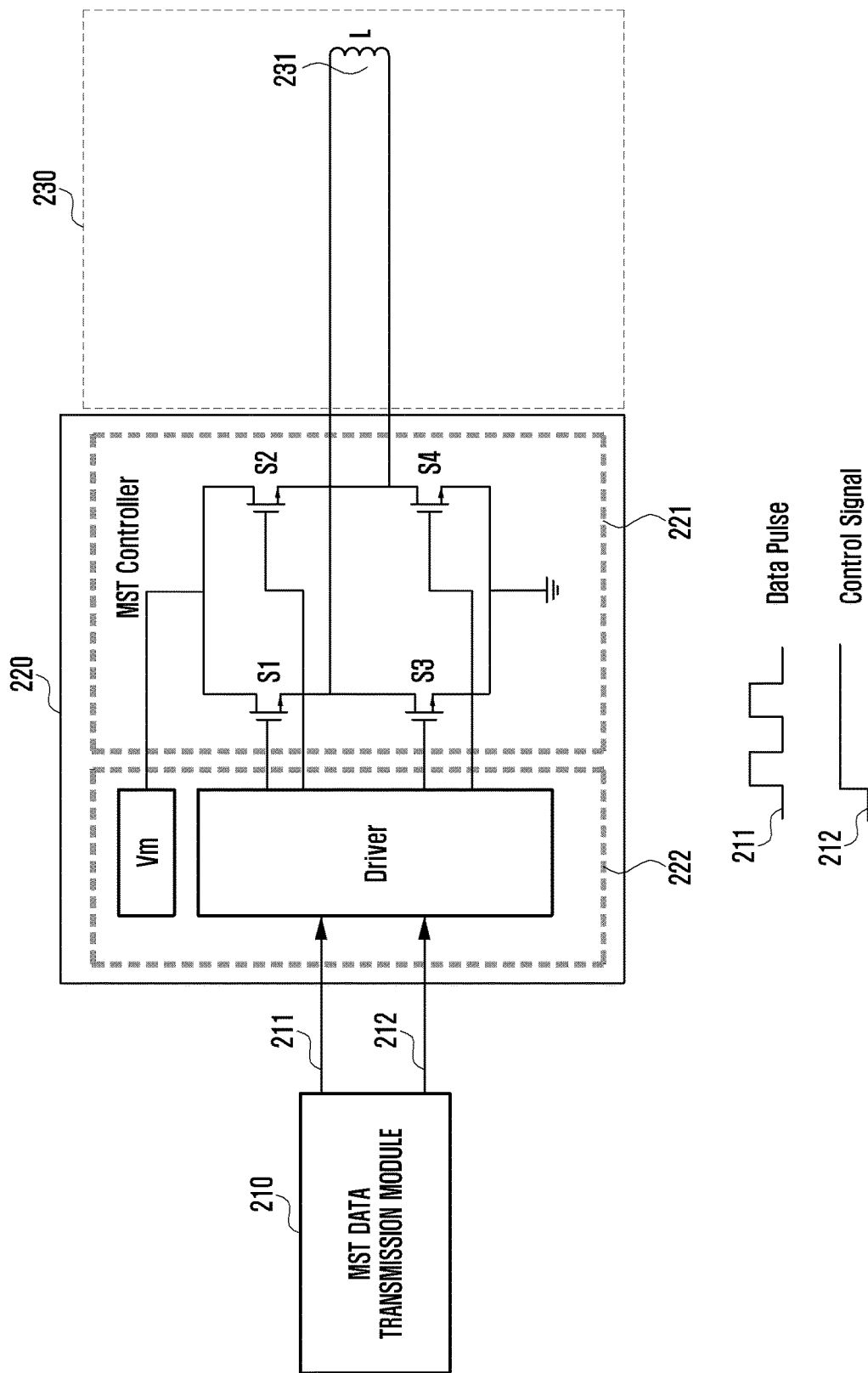
FIG. 2 shows the configuration of an electronic device capable of performing a payment function using MST according to various embodiments of the present disclosure.

FIG. 2 shows the configuration of an electronic device capable of performing a payment function using MST according to various embodiments of the present disclosure.

In accordance with one embodiment, an MST data transmission module 210 may transmit information necessary for payment to an MST control module 220. The MST data transmission module 210 may be a processor or a security region (Trustzone, Secure World) within the processor. The MST data transmission module 210 may be a security module (eSE/UICC) embedded in an electronic device (e.g., electronic device 100). The MST data transmission module 210 may transmit a control signal 212 for enabling an MST output module 230 along with a data pulse 211 for a required time (e.g., the time taken to periodically transmit an MST signal as many as a predetermined number). In accordance with another embodiment, the MST data transmission module 210 may transmit data of differential forms having different phases. In accordance with another embodiment, the MST data transmission module 210 may divide track 1, track 2 or track 3 data included in a magnetic card by time and sequentially transmit the track data or may interleave and transmit the track data.

In accordance with one embodiment, the data reception module 222 of the MST control module 220 may recognize the low/high state of a received pulse as data (e.g., 0 or 1 bit). Or the data reception module 222 may recognize the number of transitions between low and high as data by identifying the number of transitions for a given time. For example, when the number of low/high transitions is one for a given time, the data reception module 222 may recognize the number of low/high transitions as 0 (zero) bit. When the number of low/high transitions is two for a given time, the data reception module 222 may recognize the number of low/high transitions as 1 (one) bit.

In accordance with one embodiment, the output transition module 221 of the MST control module 220 may include a circuit for converting data, recognized by the data reception module 222, into a required form in order to deliver the data to the MST module 230. The circuit may include a first switch S1, a second switch S2, a third switch S3 and a fourth switch S4. The first switch S1 and the fourth switch S4 may have the same control state, and the second switch S2 and the third switch S3 may have the same control state. The directions of voltages supplied to both ends of a coil antenna 231 may be changed depending on the control state of the switches. For example, in the case of a zero bit, the first switch and the fourth switch may be ON and the second switch and the third switch may be OFF and vice versa. The output transition module 221 may change the direction of a magnetic field, delivered to an external device (e.g., POS terminal), through a coil antenna L by changing the direction of a voltage (direction of current) supplied to both ends of the coil antenna L based on data recognized by the data reception module 222. This may be a form similar to a magnetic field generated when a magnetic card swipes a POS terminal. The switches S1, S2, S3 and S4 may include at least one of an N type transistor (e.g., metal oxide semiconductor field effect transistor (MOSFET), a P type transistor and a relay.

In accordance with one embodiment, the MST output module 230 may include the coil antenna L. The MST output module 230 may further include an inductor, a capacitor and a resistor. In accordance with another embodiment, the MST output module 230 may further include an amplifier for amplifying a signal. The coil antenna L may be used for NFC or wireless charging. In accordance with yet another embodiment, the coil antenna may be a plural number.

Figure 3:
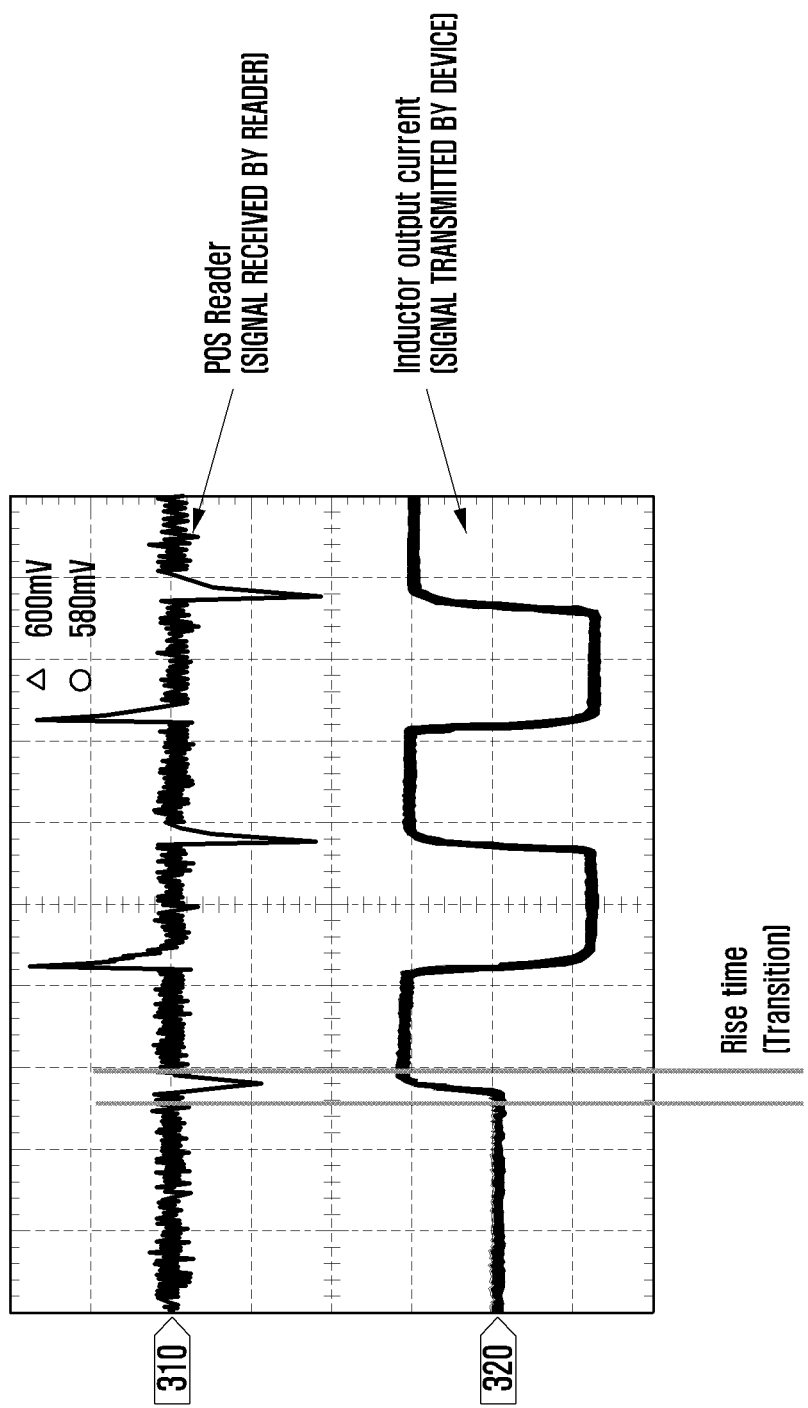
FIG. 3 is a diagram showing examples of signals transmitted through an MST output module and signal measurement values received from an external device according to various embodiments of the present disclosure.

FIG. 3 is a diagram showing examples of signals transmitted through an MST output module and signal measurement values received from an external device according to various embodiments of the present disclosure.

Referring to FIG. 3, when an MST signal 320 including payment data is transmitted through an MST output module (e.g., MST output module 230), an external device (e.g., POS terminal) may receive a signal 310 and recognize the data based on a transition section (transition rise time) of the MST signal. In order to improve the recognition ratio of the MST signal, an inductance value and the number of turns of a coil antenna may be optimized. For example, the inductance value may be 10 uH or more.

Figure 4:
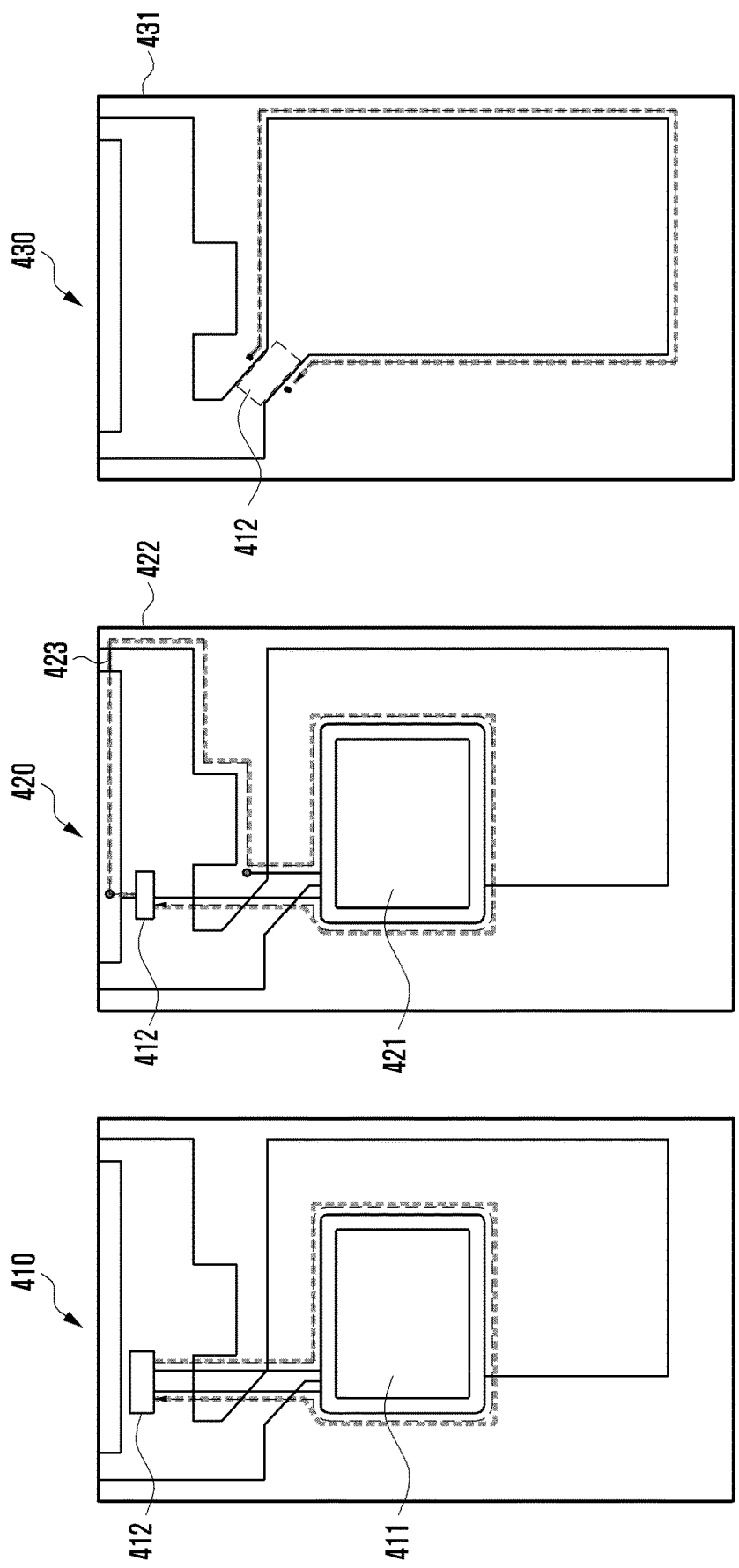
FIG. 4 is a diagram showing the structures of loop antennas according to embodiments of the present disclosure.

FIG. 4 is a diagram showing the structures of loop antennas according to embodiments of the present disclosure.

Referring to FIG. 4, the loop antenna (e.g., coil antenna) may be implemented in a terminal in various forms.

In accordance with one embodiment, a loop antenna 410 may be a form in which a pattern has been implemented in a flexible PCB (FPCB) 411. A path (current path) (dotted line) may be formed through the pattern formed in the FPCB 411, and may be connected to an MST control module 412 (e.g., MST control module 220). The FPCB 411 may further include loop antennas for NFC and wireless charging in addition to the loop antenna for MST.

In accordance with another embodiment, a loop antenna 420 (coil antenna) may be a form in which a pattern implemented in an FPCB 421 and at least part of an instrument of the electronic device 100 have been connected. For example, part 422 of an exterior (e.g., cover) of a terminal may include a conductive material (e.g., metal) through which a current may flow. Furthermore, if the part 422 has been separated from a different part (not electrically connected to the different part), it may be electrically connected to the different part through a connection element 423. The connection element 423 may be a passive element, such as an inductor or a capacitor, or may be a structure including a conductive material.

In accordance with yet another embodiment, a loop antenna 430 (coil antenna) may be a form using at least part 431 of an instrument of the electronic device 100. At least part of the instrument of the terminal may include a slit (not shown) in order to secure inductance for communication. A current path may be formed in the periphery of the slit and connected to the MST control module 412.

Although not shown in FIG. 4, the loop antenna may be connected to a part including a coil (or inductor) within the electronic device 100. For example, the loop antenna may be electrically connected to coils (or inductors) configured within parts, such as the speaker, motor and pen of the electronic device, and may be used as an loop antenna.

In accordance with yet another embodiment, the loop antenna may be formed in a display panel part. The loop antenna may be implemented using a transparent electrode under cover glass.

Figure 5:
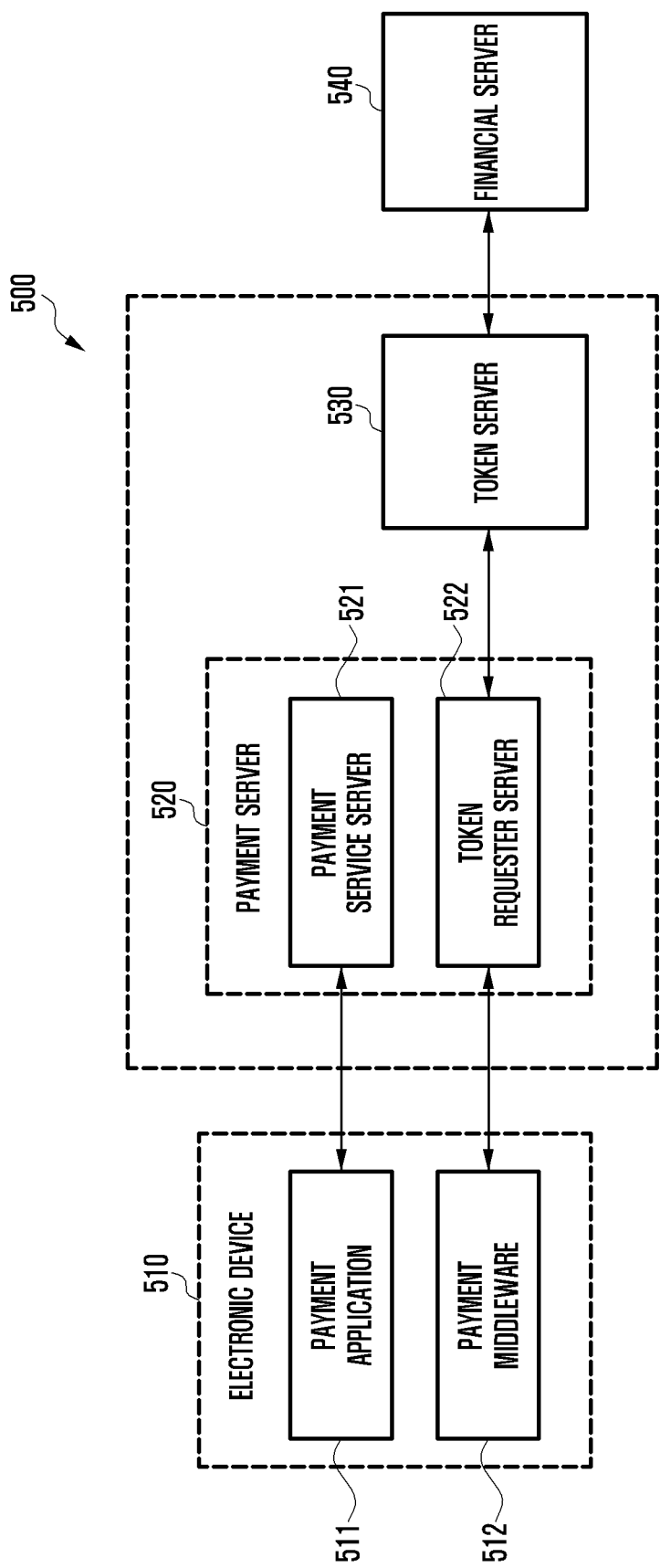
FIG. 5 is a diagram showing a payment system according to embodiments of the present disclosure.

FIG. 5 is a diagram showing a payment system according to embodiments of the present disclosure.

In accordance with various embodiments, the payment system 500 may include an electronic device 510 (e.g., electronic device 100) and/or at least one server. For example, the server may include a payment server 520, a token server (token service provider) 530 or a financial server (issuer) 540. The electronic device 510 may include a payment application (wallet application) 511 and/or payment middleware 512, for example. The payment server 520 may include a payment service server 521 and/or a token requester server (token requester) 522, for example.

In accordance with various embodiments, the payment application 511 may include Samsung Pay Application, for example. The payment application 511 may provide a user interface (e.g., user interface (UI) or user experience (UX) related to payment, for example. The user interface related to payment may include a wallet user interface (wallet UI/UX). For example, the payment application 511 may provide a user interface related to card registration, payment or transactions. The payment application 511 may provide an interface related to card registration through a character reader (e.g., optical character reader (OCR)/recognition)) or external input (e.g., user input), for example. Furthermore, the payment application 511 may provide an interface related to user authentication through identification & verification (ID&V), for example.

In accordance with various embodiments, the electronic device 510 may perform payment transactions using the payment application 511. For example, the payment application 511 may provide a payment function to a user through Simple Pay omitting at least some or Quick Pay or given application execution among functions included in the application. A user may perform a payment function using the payment application 511 and receive information associated with the payment function from the electronic device 510.

In accordance with various embodiments, the payment middleware 512 may include information related to a card company. For example, the payment middleware 512 may include a card company software development kit (SDK).

In accordance with various embodiments, the payment server 520 may include a management server for electronic payment or mobile payment. The payment server 520 may receive information related to payment from the electronic device 510, for example, and transmit the information to the outside or may process the information.

In accordance with various embodiments, the payment server 520 may transmit and receive information between the electronic device 510 and the token server 530 using the payment service server 521 and/or the token requester server 522. The payment service server 521 may include the payment server 520 (e.g., Samsung payment server), for example. The payment service server 521 may manage card information operating in conjunction with a service account (e.g., Samsung account) or a user account, for example. Furthermore, the payment service server 521 may include an application program interface (API) server (not shown) related to the payment application 511. Furthermore, the payment service server 521 may provide an account management module (e.g., account integration or Samsung account integration), for example.

In accordance with various embodiments, the token requester server 522 may provide an interface for processing information related to payment. For example, the token requester server 522 may perform the issue, deletion or activation of information (e.g., token) related to payment. Or the token requester server 522 may be functionally connected to the payment middleware 512, and may control information for payment.

In accordance with various embodiments, the payment application 511 included in the electronic device 510 and the payment service server 521 included in the payment server 520 may be functionally connected. For example, the payment application 511 may transmit and receive information related to payment to and from the payment server 520. In accordance with one embodiment, the payment middleware 512 included in the electronic device 510 and the token requester server 522 included in the payment server 520 may be functionally connected. For example, the payment middleware 512 may transmit and receive information related to payment to and from the token requester server 522.

In accordance with various embodiments, the token server 530 may issue or manage information (e.g., token) related to payment. For example, the token server 530 may control the life cycle of a token. The life cycle may include a generation, modification or deletion function. Furthermore, the token server 530 may include a token management server, for example, may manage token provisioning, [ID&V], replenishment or a life cycle, and may perform financial server integration.

In accordance with various embodiments, the payment server 520 and/or the token server 530 may be positioned in the same or similar area or may be positioned in separate areas. For example, the payment server 520 may be included in a first server, and the token server 530 may be included in a second server. Furthermore, for example, the payment server 520 and/or the token server 530 may be divided and implemented in a single server (e.g., first server or second server).

In accordance with various embodiments, the financial server 540 may perform card issue. For example, the financial server 540 may include a card issue server. Furthermore, the financial server may generate information for payment provided to a user. A user may store information for payment, generated by the financial server 540, in the electronic device 510 using the payment application 511. Furthermore, the financial server 540 may be functionally connected to the token server 530, and may transmit and receive information for payment.

Although not shown, the electronic device 510 may transmit track information (track 1/2/3), that is, data for payment, to the payment server 520 as a bit value.

In accordance with various embodiments, a track 1 may include the number of an issued card, a name, additional data (valid date) and given data (given data that may be input by a card issue company). A track 2 may include the number of a card, additional data (valid date) and given data (given data space that may be input by a card issue company). In a payment method using a token, a value of token cryptogram (token+cryptogram) other than a track 1/2/3 may be converted into a bit and discharged through a magnetic signal.

In this case, the token may be an identifier (ID) by which a card supplied by a card company can be identified when the card is registered through mobile. The transaction data is information related to transactions, and may be the expiration date of the card used when payment is made or a merchant ID provided by a POS and may be generated by combining some of information related to transactions. A value obtained by a token and cryptogram for some of the data of the track1/2/3 may be converted into a bit and discharged as a POS through a magnetic signal. If the format of the existing track is used, token information can be received without a separate change on the POS and transmitted to a card network (e.g., VISA or MASTER). The token may include a number by which at least a card company can be identified.

Figure 6:
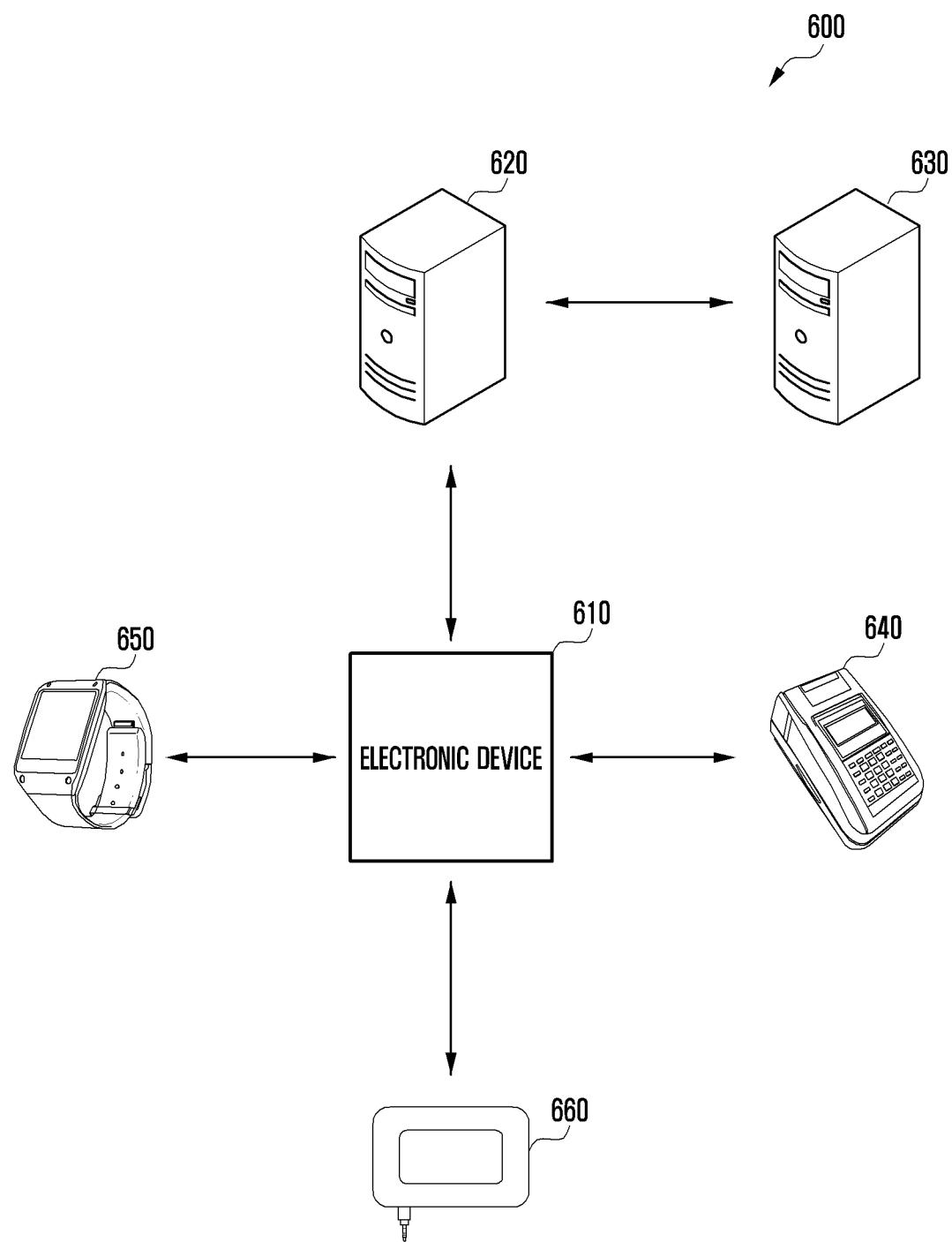
FIG. 6 is a block diagram regarding a payment system according to various embodiments of the present disclosure.

FIG. 6 is a block diagram regarding a payment system according to various embodiments of the present disclosure.

Referring to FIG. 6, the payment system 600 may include an electronic device 610 (e.g., electronic device 100), a payment server 620, a token service provider (TSP) 630 and a POS terminal 640. In accordance with one embodiment, one or more electronic devices may be added to the payment system 600. For example, an electronic device 650 may be a wearable device (e.g., a smart watch) functionally (e.g., communication) connected to the electronic device 610. An electronic device 660 may be an accessory (e.g., Loop Pay Fob).

In accordance with one embodiment, the electronic device 610 may drive a payment function. The electronic device 610 may register a card (e.g., Master Card or VISA Card) with the electronic device 610 or the payment service server 620 (e.g., first external device) in order to perform a payment function. The payment service server 620 may manage information about a plurality of registered cards, including a card registered through another electronic device (e.g., electronic device 650) of a user corresponding to the electronic device 610 or another card registered through the electronic device of another user, in addition to a card registered through the electronic device 610. In accordance with one embodiment, the payment service server 620 may obtain token information, corresponding to registered card information, from the token service provider 630 (e.g., second external device) and deliver it to the electronic device 610.

The token service provider 630 may issue a token used in a payment process. In accordance with one embodiment, the token may be a value that substitutes a primary account number (PAN), that is, information of a card. In accordance with one embodiment, the token may be created using a bank identification number (BIN). The created token may be ciphered by the token service provider 630 or may be transmitted to the payment service server 620 in the state in which the token has not been ciphered and then ciphered by the payment service server 620. The ciphered token information may be delivered to the electronic device 610 through the payment service server 620 and then deciphered in the electronic device 610. In accordance with one embodiment, the token may be created and ciphered in the token service provider 630 and delivered to the electronic device 610 without the intervention of the payment service server 620. In accordance with another embodiment, the payment service server 620 may include a token creation function. In such a case, the token service provider 630 may not be used in the payment system 600.

The electronic device 610 may perform payment using at least one of one or more other electronic devices 650 or 660 functionally connected thereto based on short-distance communication (e.g., Bluetooth or WiFi), for example. In accordance with one embodiment, another electronic device 650 (e.g., third external device) may be a wearable device (e.g., a smart watch). In such a case, the electronic device 610 may perform payment while operating in conjunction with a wearable device. For example, the electronic device 610 may transmit a card image to a smart watch. In response thereto, the smart watch may transmit a payment command signal to the electronic device 610. The electronic device 610 may receive a payment command signal and transmit an MST signal in response thereto. In accordance with one embodiment, another electronic device 660 (e.g., fourth external device) may be an accessory (e.g., Loop Pay Fob). In such a case, the electronic device 1210 may be functionally connected to the accessory (e.g., Loop Pay Fob) through an input/output interface (e.g., earphone).

Figure 7:
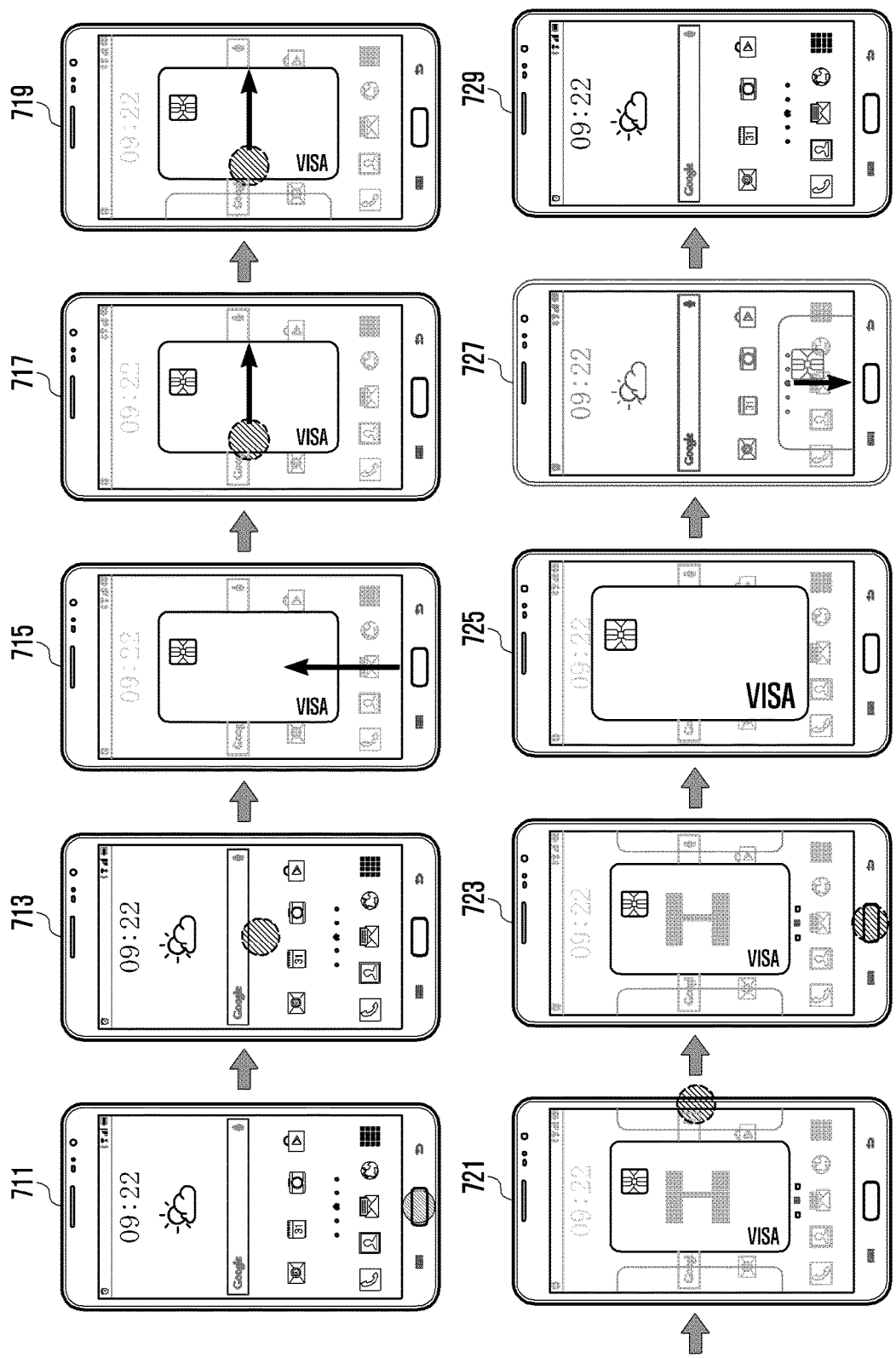
FIG. 7 is a diagram regarding a payment user interface of an electronic device according to various embodiments.

FIG. 7 is a diagram regarding a payment user interface of an electronic device according to various embodiments.

Referring to FIGS. 711 to 715 according to various embodiments, the electronic device 100 may receive user input and execute a payment application. For example, the electronic device 100 may execute a payment application (e.g., Samsung Pay) in response to input to sweeping in the direction from a bottom bezel area to a display.

Referring to FIGS. 717 to 721 according to various embodiments, the electronic device 100 may select at least one of previously registered cards in response to user input, and may display a card image corresponding to the selected card through the display. For example, the electronic device 100 may select a card to be used for payment in response to user input (e.g., left and right scroll), and may display a corresponding card image.

Referring to FIG. 723 according to various embodiments, the electronic device 100 may request a user from authentication for payment using the selected card. The electronic device 100 may perform user authentication using bio information of the user. For example, the electronic device 100 may perform a payment operation by scanning a fingerprint of the user through a fingerprint detection module.

Referring to FIGS. 725 to 729 according to various embodiments, when the payment is completed, the electronic device 100 may automatically terminate the payment application. Or the electronic device 100 may receive input to press a button (e.g., a home button) of the electronic device 100 from the user, and may terminate the payment application. When the payment is completed, the electronic device 100 may identify this and stop the generation of an MST signal. For example, when a card company identifies payment, it may notify the electronic device 100 of the payment over a network (e.g., a payment message through SMS). The electronic device 100 may stop the generation of an MST signal. A value-added network (VAN) company or a POS terminal in addition to the card company may directly notify the electronic device 100 of the identification of the payment.

Figure 8:
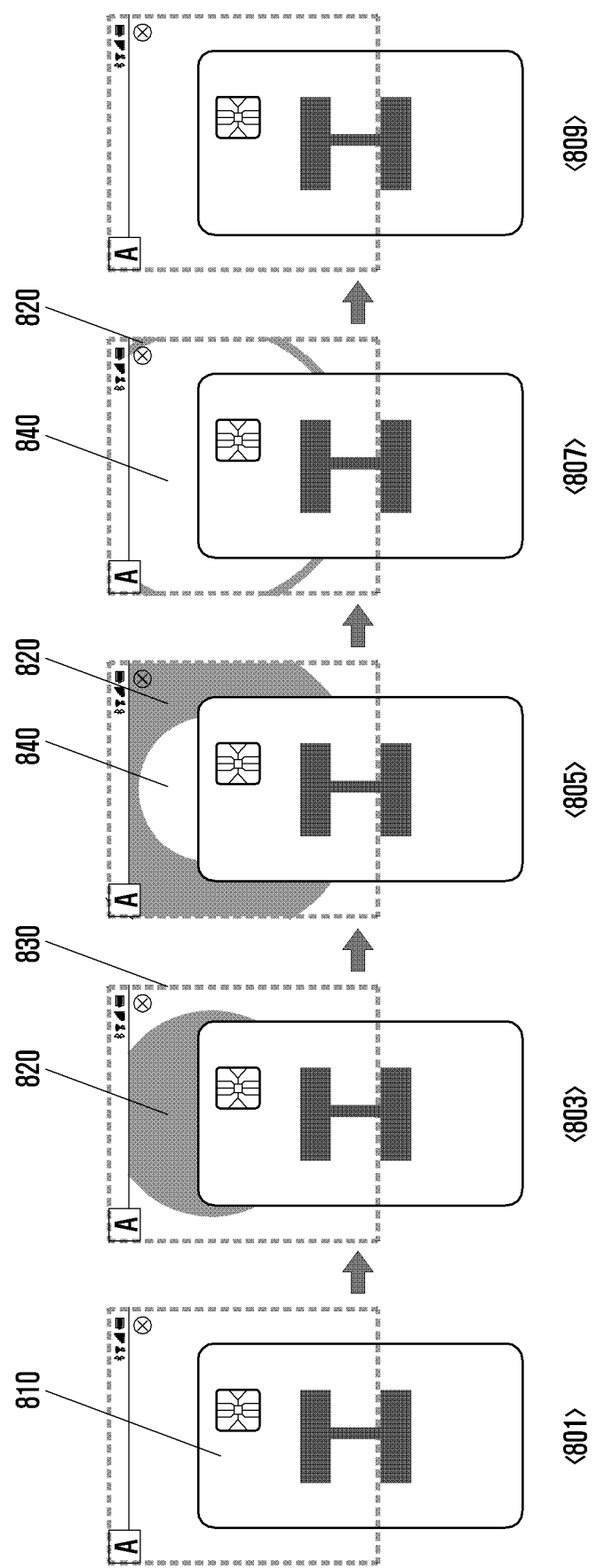
FIG. 8 is a diagram regarding a payment user interface of an electronic device according to various embodiments.

FIG. 8 is a diagram regarding a payment user interface of an electronic device according to various embodiments.

In accordance with one embodiment, while user authentication is completed and payment is in progress, the electronic device 100 may display the state in which the payment is possible (or the state in which payment information is being transmitted to an external device through the electronic device 100). For example, referring to FIGS. 803 to 807, the electronic device 100 may display part 820 of a translucent circle at the back of a card image 810, and may display an effect that the circle gradually increases within a box 830 and part 840 of a new circle is displayed. In this case, the box 830 may provide notification of the location of a loop antenna that transmits an MST signal. A user may recognize the location of the antenna by seeing the box 830. Furthermore, the user may recognize that payment is in progress by seeing the effect that the circle gradually increases within the box 830.

Figure 9:
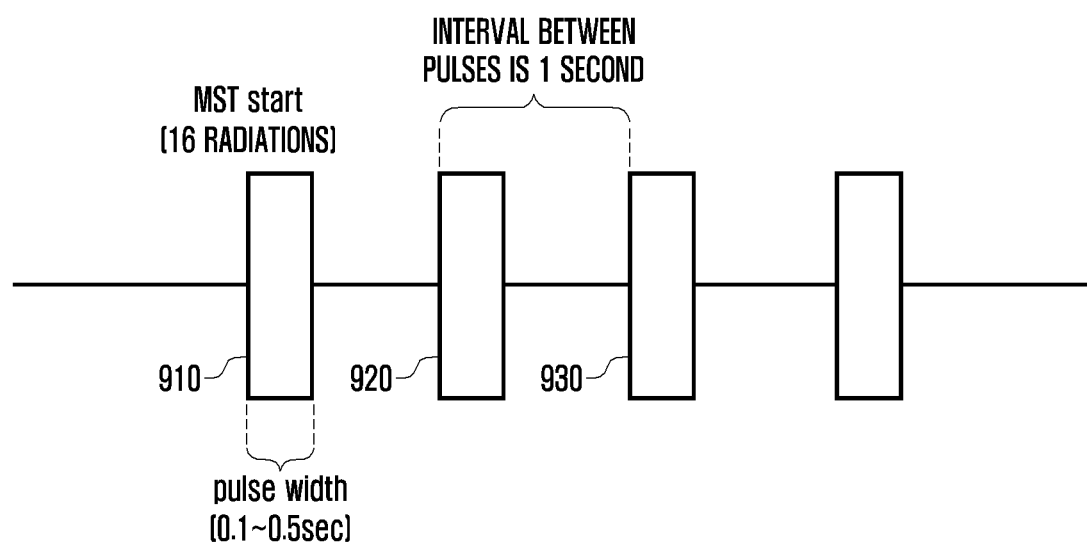
FIG. 9 is a diagram showing a method of outputting a signal including payment information through the MST output module of an electronic device according to various embodiments.

FIG. 9 is a diagram showing a method of outputting a signal including payment information through the MST output module of an electronic device according to various embodiments.

In accordance with one embodiment, the electronic device 100 may transmit a signal, including payment information, for a given cycle through the MST output module 230 (e.g., coil antenna or loop antenna) whole payment is in progress.

Referring to FIG. 9, for example, the electronic device 100 may transmit pulse (910, 920 and 930) signals at intervals of 1 second, and may transmit 16 MST signals per one pulse signal. In this case, the width of the pulse signal may be 0.1~0.5 second.

In accordance with various embodiments, a first pulse and a second pulse may include different data. The first pulse and the second pulse may be transmitted through different MST output modules 230. Although not shown, while the MST signal is transmitted, NFC may operate in a polling mode.

Figure 10A:
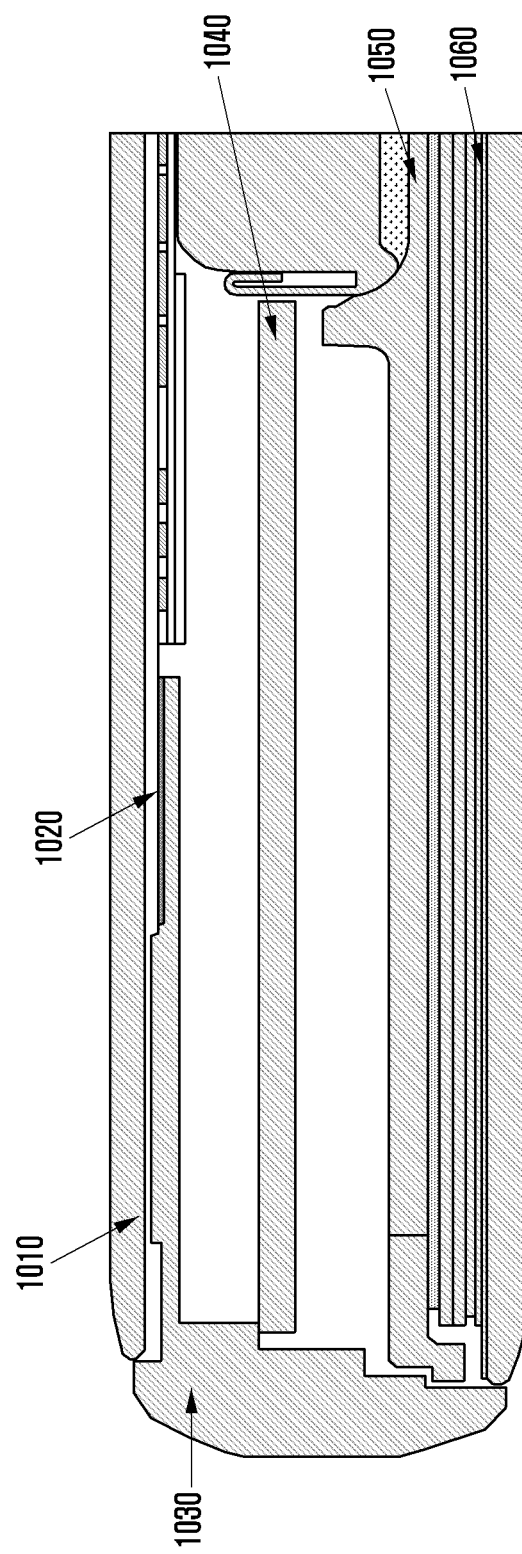
FIGS. 10A to 10D show the structures of an electronic device including an antenna for magnetic payment according to various embodiments of the present disclosure.
Figure 10B:
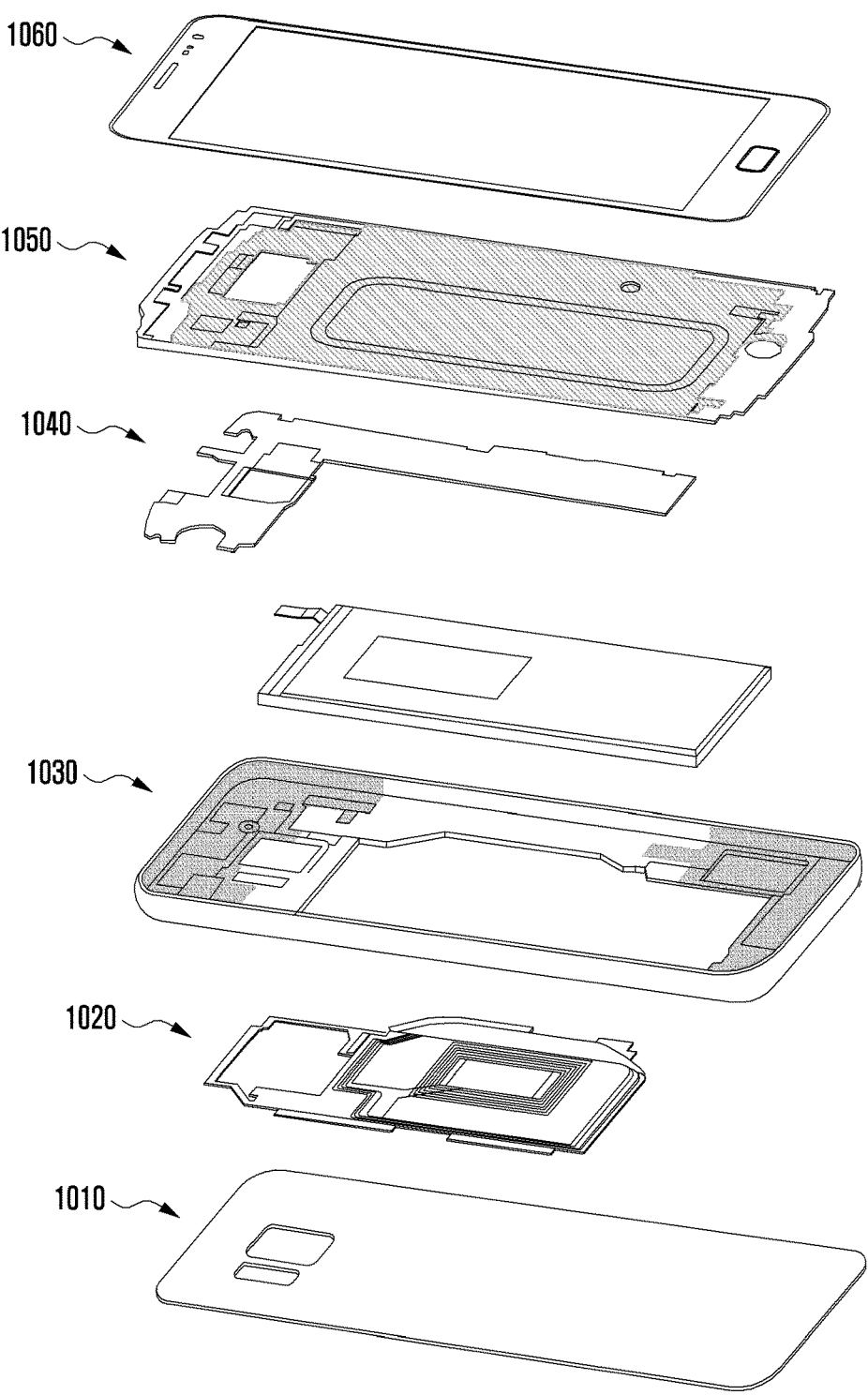
Figure 10C:
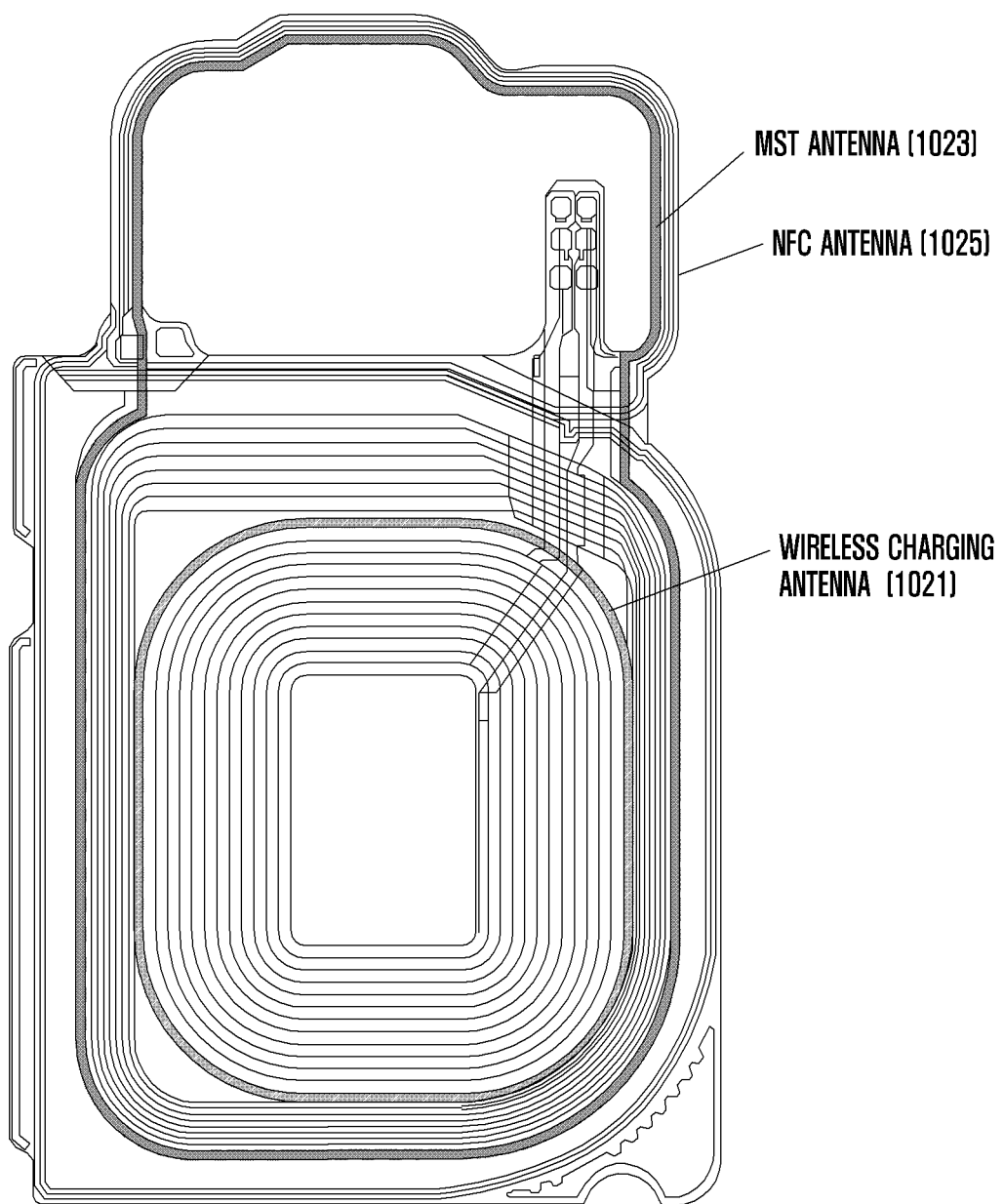

FIGS. 10A and 10B show the structures of an electronic device including an antenna for magnetic payment according to various embodiments of the present disclosure.

Referring to FIGS. 10A and 10B, the electronic device 100 may include an upper housing 1010 positioned to be exposed to at least some area of the exterior, a lower housing 1060, a side housing 1030, and a support structure 1050 positioned within the portable device. The side housing 1030 may made of a single material or a combination of heterogeneous materials, and may be positioned to support at least part of the upper housing 1010 and the lower housing 1060. The internal support structure 1050 may be made of a single material or a combination of heterogeneous materials, and may be positioned to support at least part of the lower housing 1060. In this case, at least some area of the upper housing 1010 and the lower housing 1060 may include a display region. For example, a display module may be exposed through some area of the upper housing 1010. An enclosure formed of the upper housing 1010, the side housing 1030 and the support structure 1050 may include a printed circuit board (PCB) 1040 and a battery 1070.

In accordance with various embodiments, the electronic device 100 may include an antenna 1020 (e.g., coil antenna) for magnetic payment. For example, the antenna 1020 may be positioned to cover at least some area of the side housing 1030 and the battery 1070, and may be connected to the PCB 1040 through an opening of the side housing 1030 in such a way as to communicate data for payment with a processor (e.g., processor 150) or a communication module (e.g., MST control module 130) positioned in the PCB 1040. Another area having a height or thickness different from that of a surrounding area may be present in some area of the side housing 1030 and the upper housing 1010 in order to attach the antenna 1020.

In accordance with various embodiments, in the side housing 1030, the material of the area where the coil part (e.g., metal pattern) of the antenna 1020 is positioned may have a property different from that of the material of an area where the coil part is not positioned. For example, the area where the coil part is positioned may include a non-conductive material (e.g., plastic), and the area where the coil part is not positioned may include a conductive material (e.g., metal).

In accordance with various embodiments, the antenna 1020 may be configured using a flexible printed circuit board (FPCB) including a multi-layer. At least one of the plurality of layers may include a line forming an antenna coil and a via. The antenna 1020 may be formed of a single coil or may be formed of two or more different coils. In accordance with various embodiments, the antenna 1020 may further include a heat prevention sheet (e.g., graphite sheet) and a shielding material (e.g., ferrite).

In accordance with various embodiments, the electronic device 100 may include a fingerprint sensor (not shown) in order to perform card or user authentication for payment. For example, the fingerprint sensor (not shown) may be included in the front home key or side key of the electronic device 100 or a separate key at the back of the electronic device. Furthermore, the fingerprint sensor may be included in at least part of a display panel.

Figure 10D:
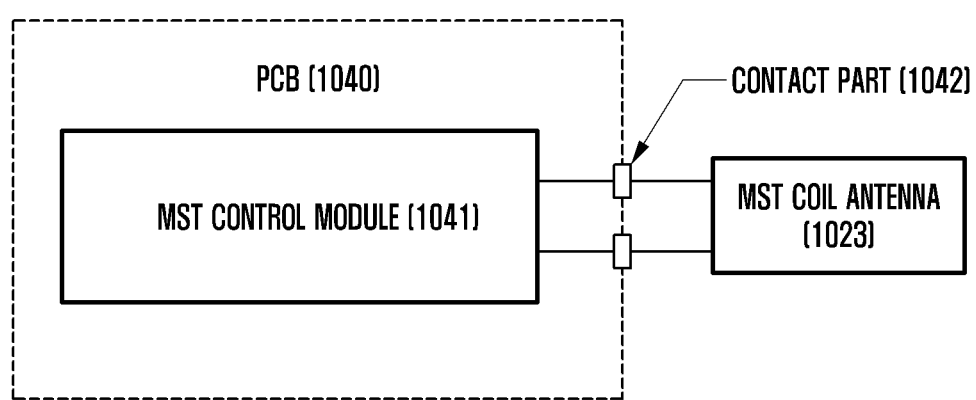

FIGS. 100 and 10D are diagrams illustrating a method of deploying and implementing coil antennas when coil antennas for different short-distance wireless communication are proximately implemented within an electronic device according to embodiments of the present disclosure.

Referring to FIG. 100, the electronic device 100 may include a wireless charging antenna 1021 (e.g., WPC, A4WP or PMA), an MST antenna 1023 and an NFC antenna 1025.

In accordance with various embodiments, the NFC antenna 1025 performs communication of a 13.5 MHz band, and may be sensitive to the influence of surrounding coils (e.g., wireless charging antenna 1021 and MST antenna 1023). Accordingly, the NFC antenna 1025 may be positioned on the outermost side and may have an inductance value of about 1 uH.

In accordance with various embodiments, the MST antenna 1023 performs communication of a magnetic field power induction method and may not be relatively sensitive to a frequency. The MST antenna 1023 may be positioned between the NFC antenna 1025 and the wireless charging antenna 1021. An inductance value of the MST coil antenna 1023 may be about 15 uH, and a DCR (resistance value) thereof may be about 1.4 ohm.

In accordance with various embodiments, the wireless charging antenna 1021 may use both WPC and PMA methods. An inductance value of the wireless charging antenna 1021 may be about 8 uH, and a resistance value thereof may be about 0.25 ohm.

Referring to FIG. 10D, (parallel) capacitors (not shown) may be included at both ends of the output unit of an MST signal. For example, the capacitors may be positioned on the PCB 1040 close to a contact part 1042 where the PCB 1040 and MST coil antenna 1023 within the electronic device 100 come into contact with each other. Or the capacitors (not shown) may be included in the MST coil antenna 1023.

In accordance with various embodiments, the capacitor (not shown) may prevent the resonant frequency of the MST coil antenna 1023 from operating as the parasitization of the NFC coil antenna 1025 by changing the resonant frequency of the MST coil antenna 1023. For example, the capacitor (not shown) may be about 0.18 nF. In accordance with another embodiment, (serial) inductors (not shown) may also be included at both ends of the MST signal. An inductor (not shown) included in each output terminal may have an internal voltage of 2~2.5 volts [V] based on a peak current value of the MST signal.

Figure 11:
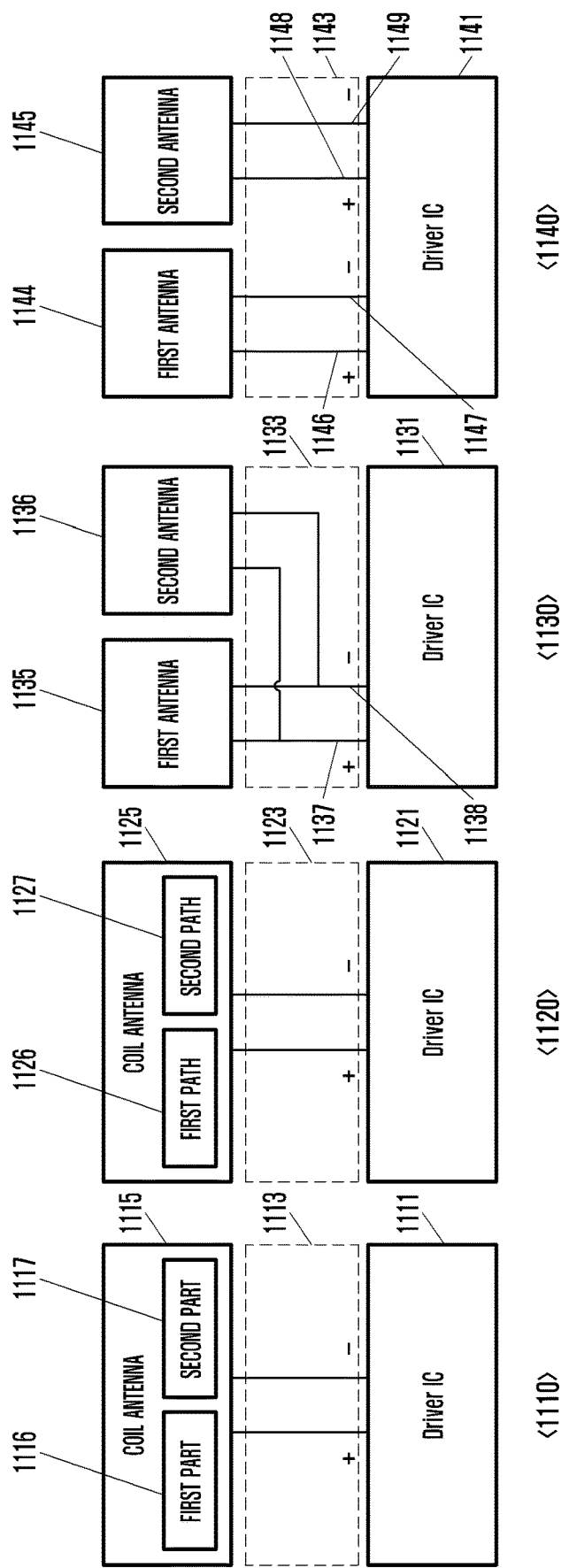
FIG. 11 shows the configuration of an MST module that may have various antenna structures according to various embodiments of the present disclosure.

FIG. 11 shows the configuration of an MST module that may have various antenna structures according to various embodiments of the present disclosure.

Referring to FIG. 1110 and FIG. 1120, an MST module (e.g., MST module 110) may include one antenna (e.g., coil antenna). The MST module may include a driving IC 1111, a connection part 1113 and an antenna 1115. The connection part 1113 may receive a current from the driver IC 1111 and feed the current to the antenna 1115. The antenna 1115 may form a magnetic field by the fed current and radiate a magnetic field signal (MST signal) of a given frequency to the outside.

In accordance with one embodiment, the antenna 1115 may be designed to form magnetic fields of partially different intensities. For example, as shown in FIG. 1110, when a current is fed to the antenna 1115, a first part 1116 and a second part 1117 may form magnetic fields of different intensities.

In accordance with one embodiment, an antenna 1125 may be designed to form multiple paths (current paths) partially. For example, as shown in FIG. 1120, when a current is fed to the coil antenna 1125, a first path 1126 may be formed in one part of the coil antenna 1125, and a second path 1127 may be formed in the other part of the coil antenna 1125.

Referring to FIG. 1130 and FIG. 1140, an MST module (e.g., MST module 110) may include two antennas (e.g., loop antennas). The MST module may include a driver IC 1131, a connection part 1133, a first antenna 1135 and a second antenna 1136.

In accordance with one embodiment, the first antenna 1135 and the second antenna 1136 may transmit the same MST signal. Referring to FIG. 1130, a first electrode 1137 and second electrode 1138 may be formed in the driver IC 1131. The connection part 1133 may electrically connect the first electrode 1137 to the first antenna 1135 and the second antenna 1136, and may electrically connect the second electrode 1138 to the first antenna 1135 and the second antenna 1136. The first antenna 1135 and the second antenna 1136 is fed with a current from the first electrode 1137 or the second electrode 1138 through the connection part 1133, may form a magnetic field by the fed current, and may radiate a magnetic field signal (MST signal) of a given frequency to the outside.

In accordance with another embodiment, a first antenna 1144 and a second antenna 1145 may transmit different MST signals. Referring to FIG. 1140, a third electrode 1146 and a fourth electrode 1147 may be formed in a driver IC 1141 as one pair, and a fifth electrode 1148 and a sixth electrode 1149 may be formed in the driver IC as the other pair. A connection part 1143 may electrically connect the third electrode 1146 and the fourth electrode 1147 to the first antenna 1144, and may electrically connect the fifth electrode 1148 and the sixth electrode 1149 to the second antenna 1145. The first antenna 1144 may be fed with a current from the third electrode 1146 or the fourth electrode 1147 through the connection part 1143, may form a magnetic field by the fed current, and may radiate an RF signal of a given frequency to the outside. The second antenna 1145 may be fed with a current from the fifth electrode 1148 or the sixth electrode 1149 through the connection part 1143, may form a magnetic field by the fed current, and may radiate it to the outside.

Figure 12:
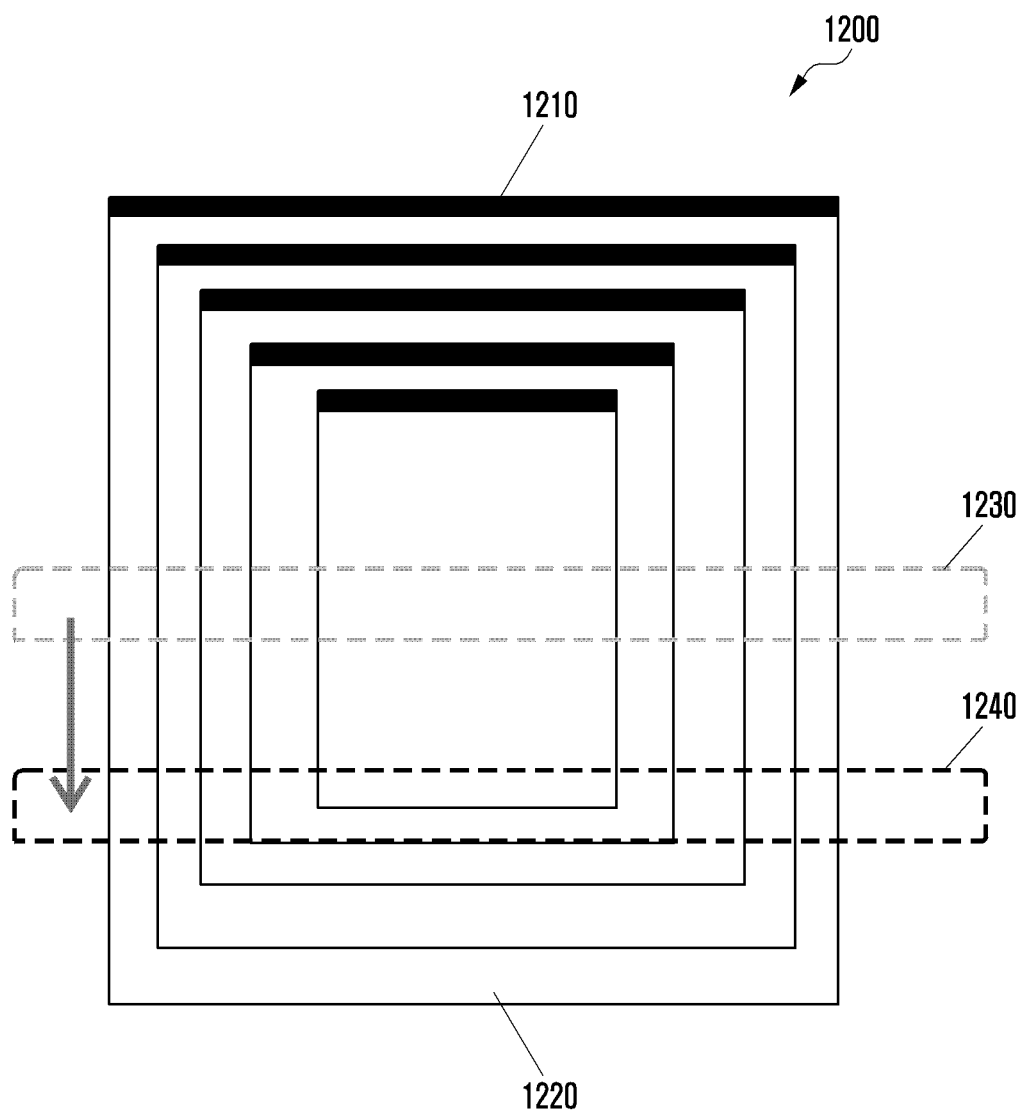
FIG. 12 is a diagram schematically showing a loop antenna according to various embodiments of the present disclosure.

FIG. 12 is a diagram schematically showing a loop antenna according to various embodiments of the present disclosure.

In accordance with one embodiment, the loop antenna 1200 may be designed to form a magnetic field having different intensity for each area. Accordingly, the location of a null point of the loop antenna occurring within a terminal may be moved. For example, the width of an antenna pattern (e.g., coil) of a first part 1210 may be implemented to be wider than that of an antenna pattern of a second part 1220. Accordingly, when a current flows, resistance in the first part 1210 is relatively lower than that in the second part 1220. Accordingly, the intensity of a magnetic field generated in the first part 1210 may be stronger than the intensity of a magnetic field generated in the second part 1220. When the intensity of a magnetic field generated in the first part 1210 is stronger than the intensity of a magnetic field generated in the second part 1220, the null point of the loop antenna 1200 may be formed on the lower side 1240 of the terminal not the center 1230 of the terminal. For example, as in FIG. 8, while payment is in progress, the electronic device 100 may display an MST recognition range (e.g., an "area between the center and top of the terminal" corresponding to a box 830). Accordingly, a recognition ratio of MST can be improved because a user makes the MST recognition range proximate a reader. In accordance with another embodiment, when the width of the antenna pattern of the first part 1210 and the width of the antenna pattern of the second part 1220 are the same, a null point may be the center 1230 of the terminal.

FIGS. 13A to 13D are diagrams schematically showing the structures of loop antennas according to various embodiments of the present disclosure.

Figure 13A:
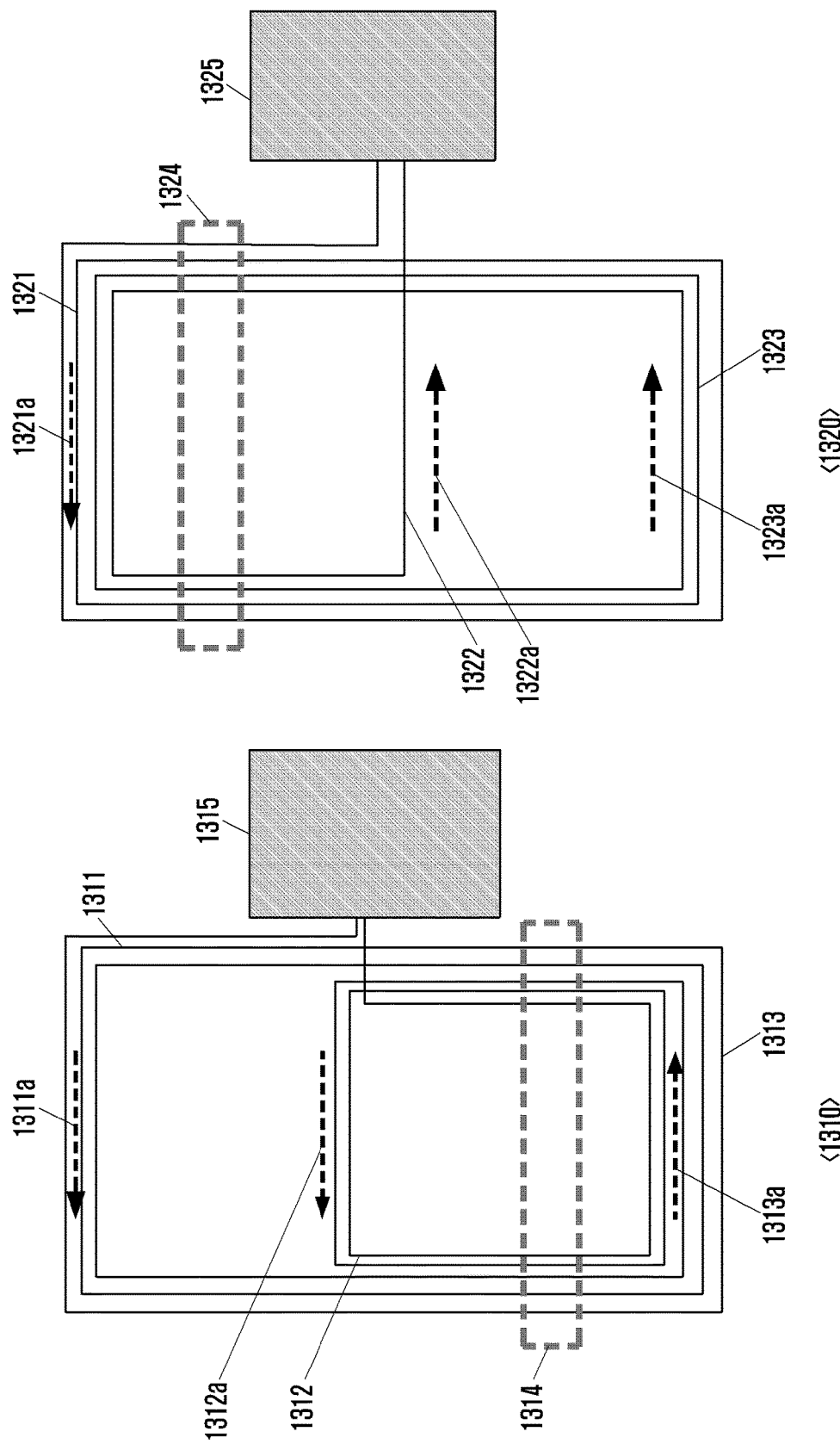

In accordance with one embodiment, referring to FIG. 13A, a loop antenna 1310 may be designed to have a first path 1311 formed at the top of the electronic device 100, a second path 1312 formed at the center thereof, and a third path 1313 at the bottom thereof. Furthermore, the loop antenna 1310 may be designed to have the direction 1311a of a current flowing along the first path 1311 identical with the direction 1312a of a current flowing along the second path 1312. Accordingly, the direction 1311a of the current in the first path 1311 may be opposite the direction 1313a of a current flowing along the third path 1313. Accordingly, when the loop antenna 1310 forms a magnetic field by a current fed from the communication module 1315 (e.g., MST module 110), the intensity of the magnetic field is stronger at the top and center than on the lower side, so a null point 1314 may be formed around the lower side.

In accordance with another embodiment, referring to FIG. 13A, a loop antenna 1320 may be designed to have the direction 1323a of a current flowing along a third path 1323 identical with the direction 1322a of a current flowing along a second path 1322. Accordingly, the direction 1323a and the direction 1322a may be opposite the direction 1321a of a current flowing along a first path 1321. Accordingly, a null point 1324 may be formed near the upper side of the terminal.

Figure 13B:
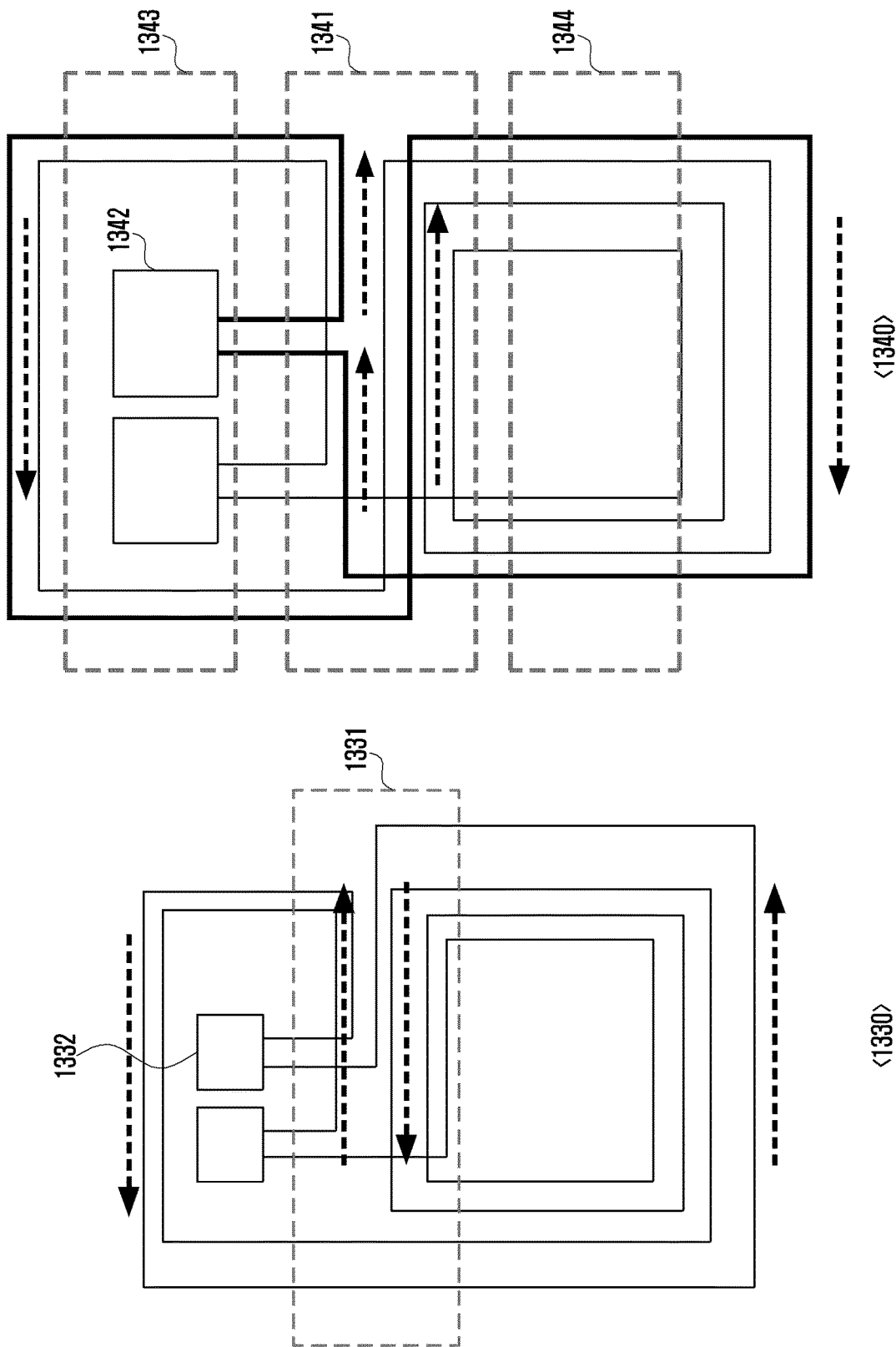

In accordance with yet another embodiment, referring to FIG. 13B, the paths of a loop antenna 1330 connected to a communication module 1332 (e.g., MST module 110) may be a "B"-shaped form (i.e., a "B"-shaped form when a current flow is drawn). The direction of currents may be opposite at a center 1331. Accordingly, the center 1331 may be a null point. The loop antenna of a "B"-shaped form, for example, the loop antenna 1330 may have an effect that a magnetic field is spread to both sides (upper and lower sides) compared to the loop antenna 1200 of FIG. 12.

In accordance with yet another embodiment, referring to FIG. 13B, the paths of a loop antenna 1340 connected to a communication module 1342 (e.g., MST module 110) may be an "8"-shaped form. The directions of currents at the center 1341 may be the same. Accordingly, the intensity of a magnetic field at the center 1341 may be the strongest. An upper side 1343 and a lower side 1344 may be null points.

In accordance with various embodiments, referring to FIG. 13C, a loop antenna may be designed to have various structures, for example, paths of a "B"-shaped form, such as those shown in FIGS. 1350, 1360 and 1370, in addition to the structures of 13a to 13b. In these drawings, an arrow indicates the direction of a current, and the place (dotted line square) where the directions of currents are opposite may be a null point.

Referring to the structures of the loop antenna of FIGS. 13A to 13C, the null point may be different depending on the location of paths (current paths) in the loop antenna and the direction of currents. Accordingly, in the antenna design for raising the MST recognition ratio, the location of a null point may be a target to be considered in order to raise the MST recognition ratio.

Figure 13D:
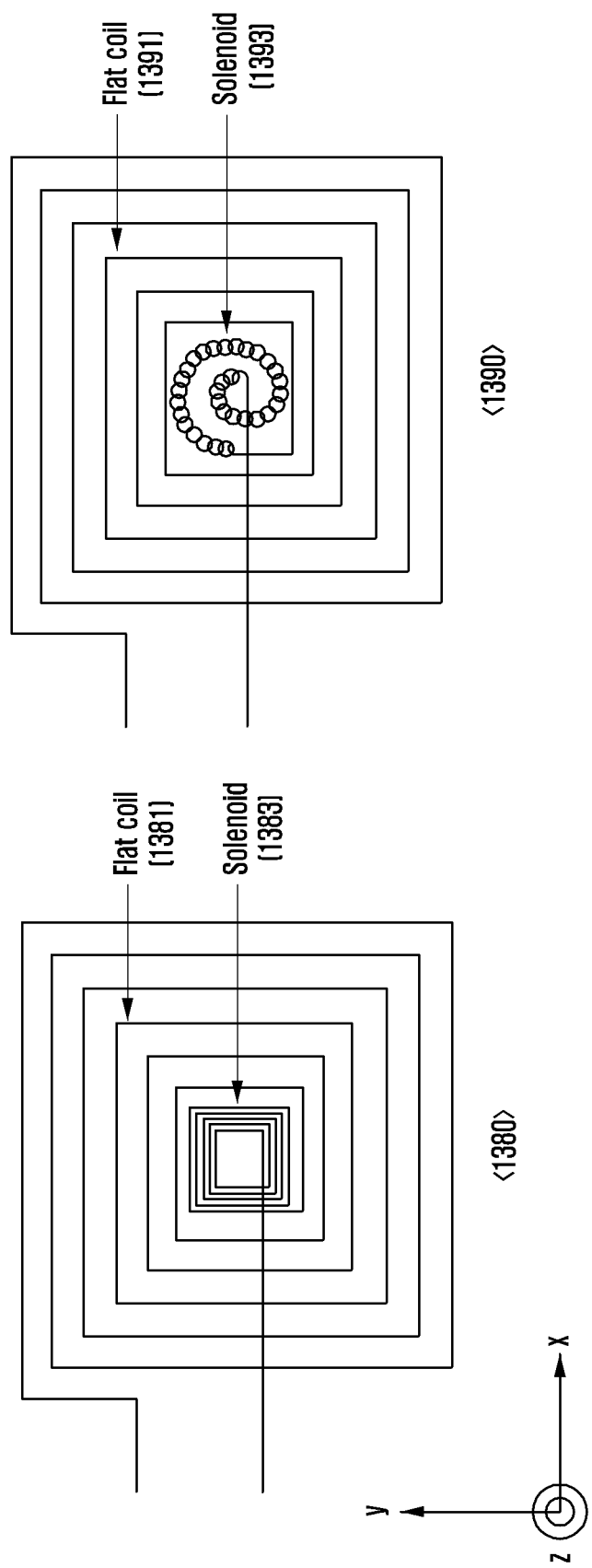

In accordance with various embodiments, referring to FIG. 13D, a loop antenna 1380 may be applied to the antenna 1125 of FIG. 1120, for example. A first path 1381 forming the outside of the loop antenna 1380 may consist of a coil of a flat type, and a second path 1383 relatively forming the inside may consist of a solenoid coil. The flat coil may be a form in which it has been wound on an XY plane without overlap, for example. The solenoid coil may be a form in which it has been wound around a Z axis several times.

In accordance with various embodiments, the solenoid coil 1393 of a loop antenna 1390 may be a form in which it has been wound several times in the direction perpendicular to the Z axis. By making different the number of turns of a coil positioned in each section and the area where the coil has been positioned, a null point moves from the center of the loop antenna 1390 to the outskirts. Accordingly, a more magnetic line of force may be radiated from the second path 1393 than from the first path 1391.

Figure 14:
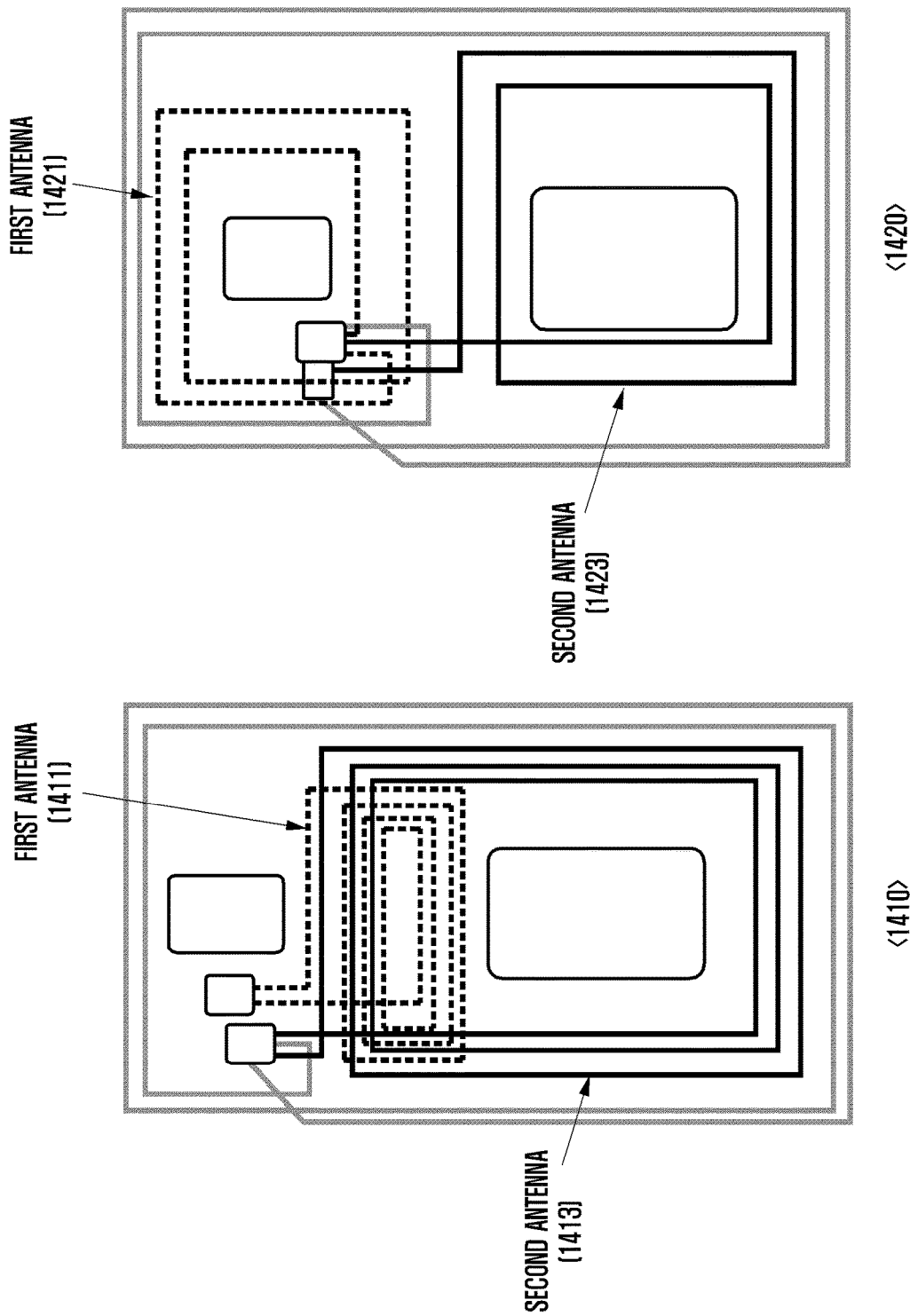
FIG. 14 is a diagram schematically showing a plurality of loop antennas according to various embodiments of the present disclosure.

FIG. 14 is a diagram schematically showing a plurality of loop antennas according to various embodiments of the present disclosure.

In accordance with various embodiments, a plurality of loop antennas, for example, a first antenna 1411 and a second antenna 1413 may be connected to the same output unit of an MST control module. The first antenna 1411 and the second antenna 1413 may transmit the same signal at the same time. For example, referring to FIG. 1410, one end of the first antenna 1411 and one end of the second antenna 1413 may be connected to a first electrode, and the other end of the first antenna 1411 and the other end of the second antenna 1413 may be connected to a second electrode. The first antenna 1411 and the second antenna 1413 may be implemented in different layers of an FPCB. For example, the first antenna 1411 may be formed at the bottom layer of the FPCB and the second antenna 1413 may be formed at the top layer of the FPCB based on the illustrated Z axis. The loop antennas may be formed at the same layer. For example, referring to FIG. 1420, a first antenna 1421 may be formed at the upper part of the same layer and the second antenna 1423 may be formed at the lower part of the same layer on an XY plane.

Figure 15A:
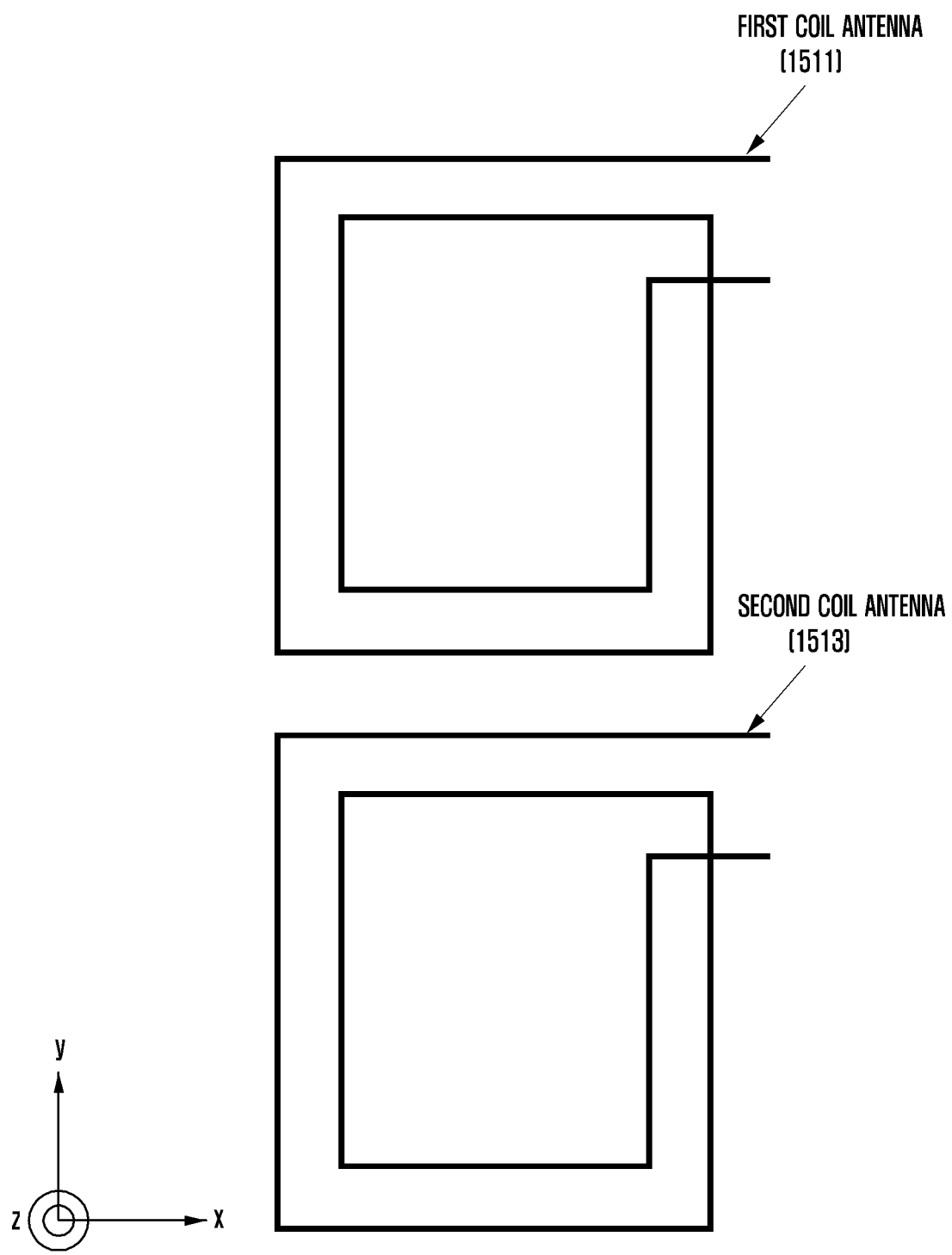
FIGS. 15A and 15B are diagrams schematically showing a plurality of coil antennas according to various embodiments.
Figure 15B:
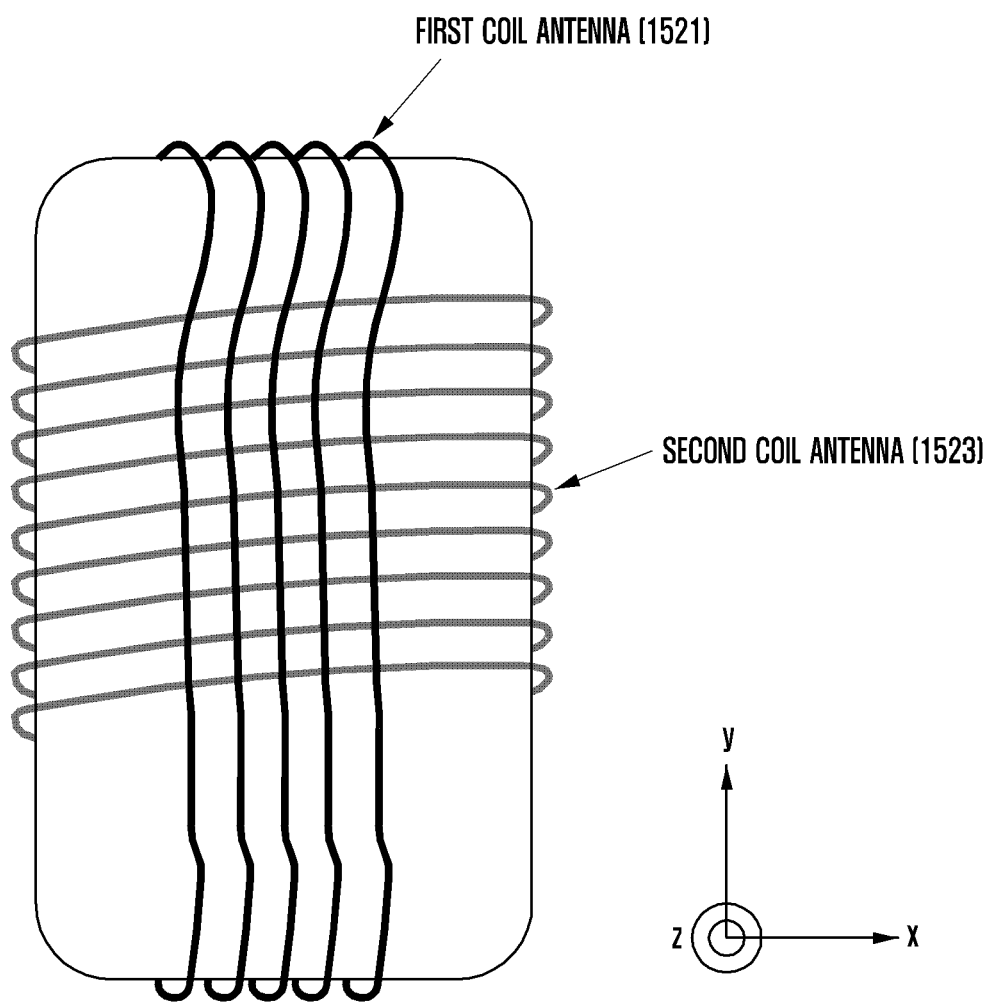

FIGS. 15A and 15B are diagrams schematically showing a plurality of coil antennas according to various embodiments.

Referring to FIG. 15A, a plurality of coil antennas, for example, a first antenna 1511 and a second antenna 1513 may be formed on the same plane (XY plane). In accordance with one embodiment, a loop antenna for MST may be fabricated in various forms in order to improve the recognition of a magnetic field delivered to an external device (e.g., POS terminal). For example, paths may be an "8"-shaped form, or may be a "B"-shaped form. When an electronic device approaches an external device (e.g., POS terminal), the antennas may be a form which the paths (current paths) having a direction orthogonal to the direction in which a magnetic card swipes the external device (e.g., POS terminal) can be formed to a maximum extent. The first antenna 1511 and the second antenna 1513 may transmit different MST signals.

Referring to FIG. 15B, coil antennas may be formed on different planes based on different axes. For example, a first coil antenna 1521 may form a loop around an x axis, and a second coil antenna 1523 may form a loop around a y axis. A shielding material (not shown) for removing interference between the first coil antenna 1521 and the second coil antenna 1523 may be positioned.

In accordance with one embodiment, the first coil antenna 1521 or the second coil antenna 1523 may be an FPCB antenna. The antenna may form a loop in a stack form by connecting a pattern to an FPCB having a plurality of layers.

In accordance with another embodiment, the first coil antenna 1521 or the second coil antenna 1523 may form a loop in a form to surround at least part of the housing of an electronic device. One portion of the coil antenna may be positioned under the front display of a terminal, and the other portion of the coil antenna may be positioned under the back cover of the terminal. The coil antenna may be an FPCB form or may use at least part of the exterior of the terminal.

Figure 16A:
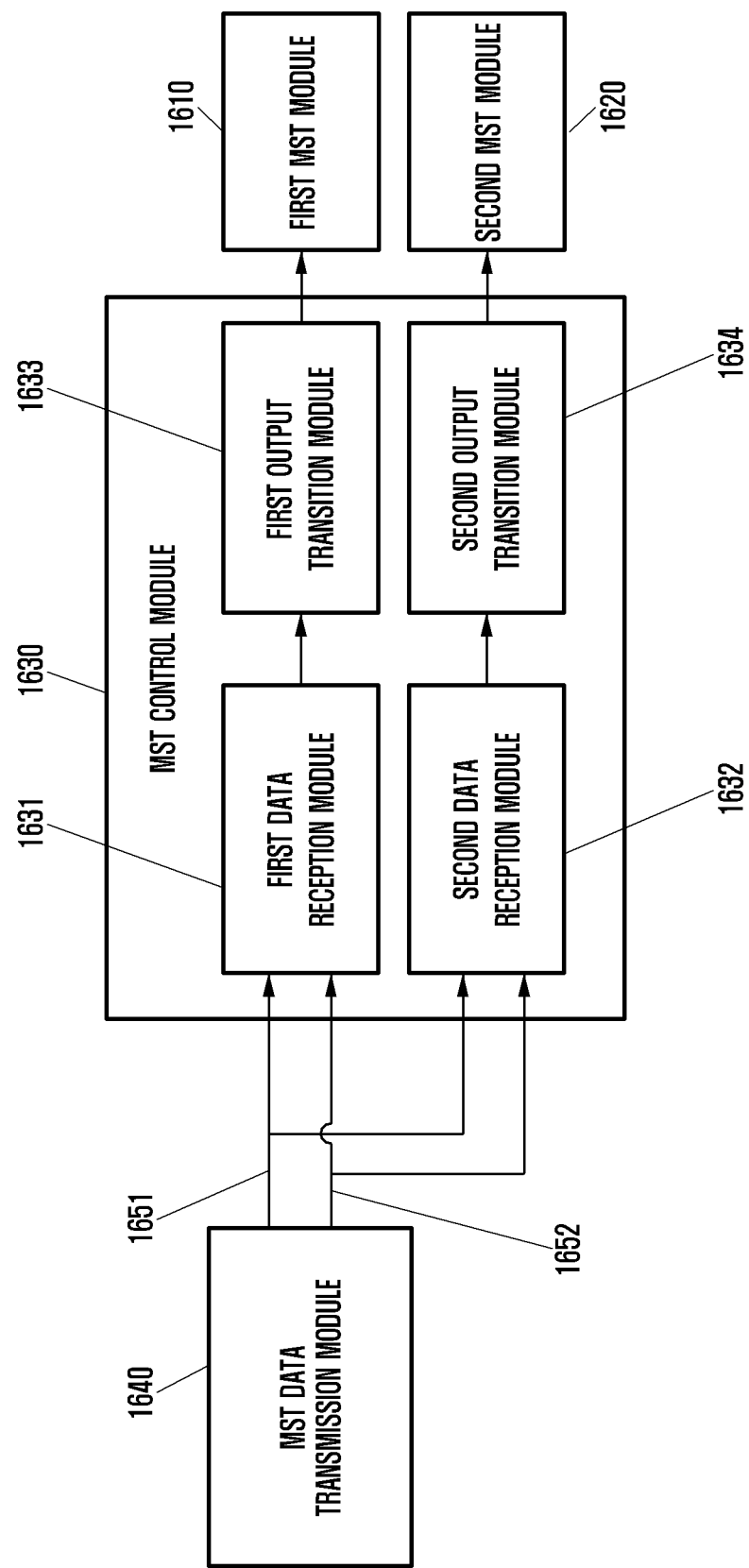
FIGS. 16A to 16C are block diagrams of hardware within an electronic device including a plurality of MST modules according to various embodiments of the present disclosure.
Figure 16B:
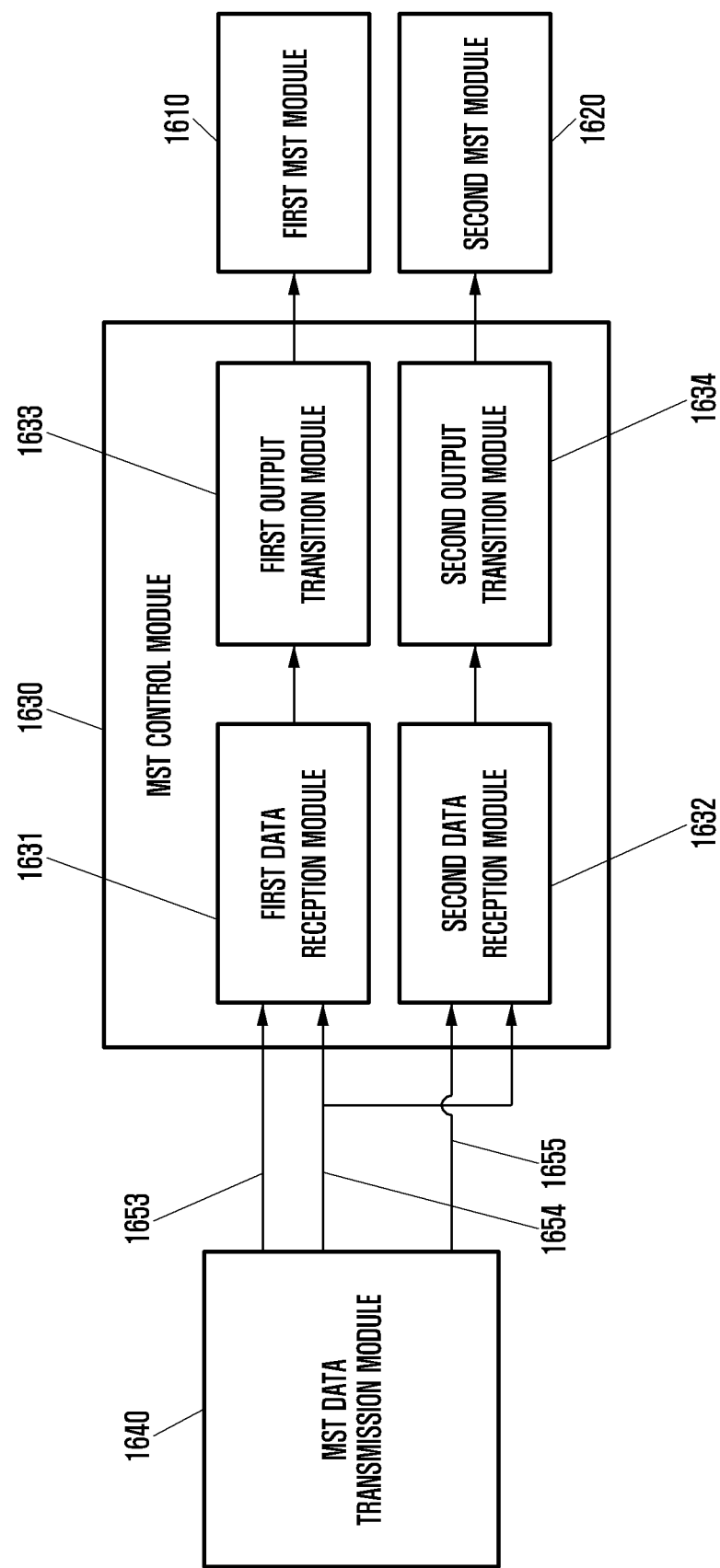
Figure 16C:
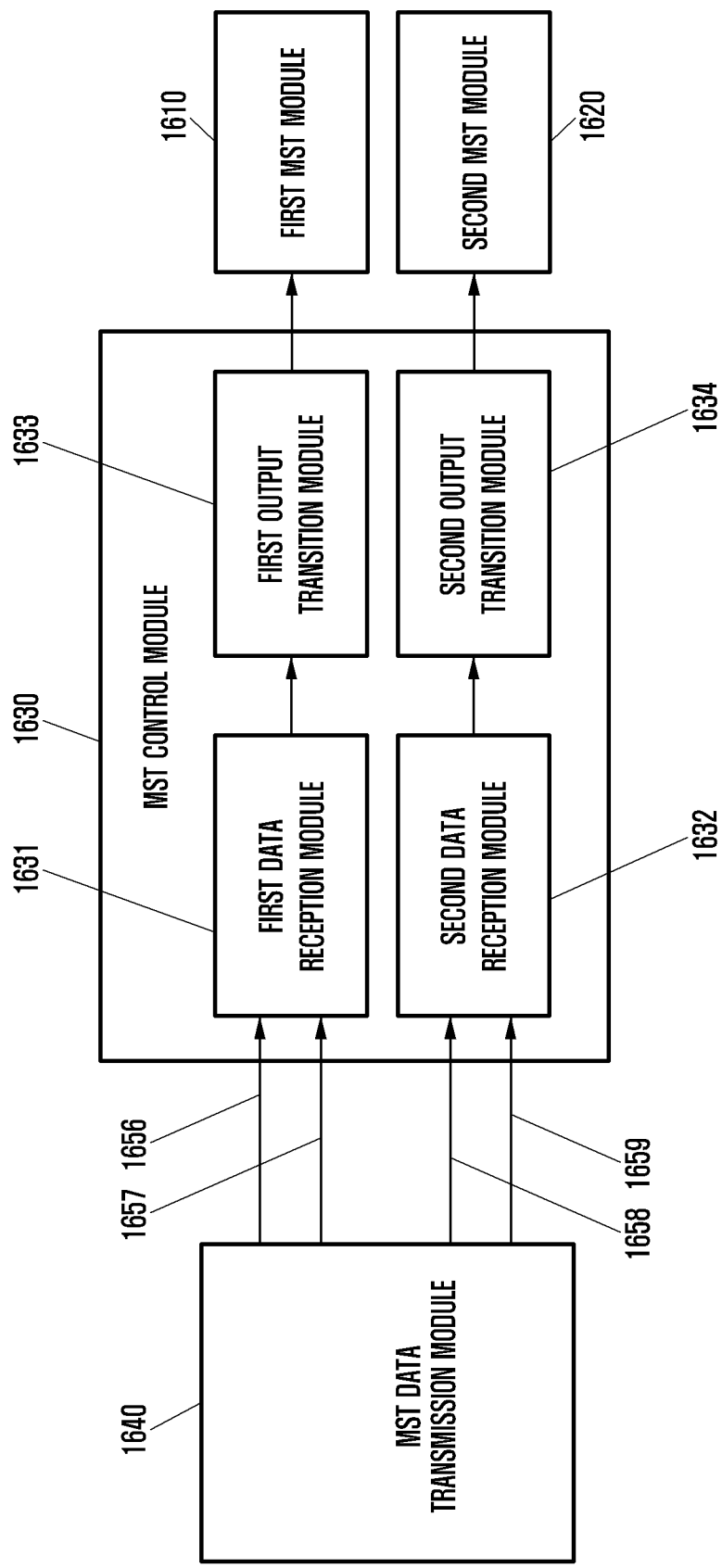

FIGS. 16A to 16C are block diagrams of hardware within an electronic device including a plurality of MST modules according to various embodiments of the present disclosure.

Referring to FIG. 16A according to one embodiment, a first MST module 1610 and a second MST module 1620 may transmit the same data to an external device. The first MST module 1610 and the second MST module 1620 may include coil antennas of different forms. The first MST module 1610 and the second MST module 1620 may be spaced apart. Voltages or currents delivered to the first MST module 1610 and the second MST module 1620 may be different levels. A first data reception module 1631 and a second data reception module 1632 within an MST control module 1630 may receive at least one same signal from an MST data transmission module 1640. For example, the MST data transmission module 1640 may transmit an MST signal 1651, including the same payment information, to the first data reception module 1631 and the second data module 1632. Furthermore, the MST data transmission module 1640 may identically transmit a control signal 1652 for enabling the first MST module 1610 and the second MST module 1620 to the first data reception module 1631 and the second data reception module 1632. For example, in response to the reception of the control signal 1652, the MST control module 1630 may control the first MST module 1610 and the second MST module 1620 to transmit the MST signal 1651 to the outside. The first data reception module 1631 and a first output transition module 1633 may be one module. The second data reception module 1632 and a second output transition module 1634 may be one module.

Referring to FIG. 16B according to one embodiment, the MST data transmission module 1640 may transmit an MST signal 1654, including the same payment information, to the first data reception module 1631 and the second data module 1632, and may transmit different control signals 1653 and 1655 to the first data reception module 1631 and the second data reception module 1632, respectively, so that the first MST module 1610 and the second MST module 1620 are controlled independently.

In accordance with one embodiment, the first MST module 1610 and the second MST module 1620 may be sequentially enabled based on the control signals and may transmit some of the respective MST signals. In accordance with another embodiment, the first MST module 1610 and the second MST module 1620 may be enabled alternately to transmit the MST signal to an external device (e.g., POS terminal).

In accordance with one embodiment, the first MST module 1610 and the second MST module 1620 may be selectively enabled depending on the state of a terminal. For example, when short-distance wireless communication (e.g., NFC communication) in the terminal is enabled using a loop antenna adjacent to the first MST module 1610 or cellular network wireless communication is enabled using an adjacent antenna, the MST control module 1630 may enable the second MST module 1620 to transmit an MST signal. For example, if an MST signal is rarely recognized when the MST signal is transmitted by enabling at least one of the first MST module 1610 and the second MST module 1620 or a user wants to recognize an MST signal again by moving a terminal (e.g., when the user terminal is spaced apart from a POS terminal and tags it again), the MST control module 1630 may recognize this as a sensor and enable the first MST module 1610 and the second MST module 1620 at the same time. For example, when the display mode of the electronic device 100 is a portrait mode, the second MST module 1620 (e.g., the second coil antenna 1523 of FIG. 15B) may be enable. When the display mode of the electronic device 100 is a landscape mode, the first MST module 1610 (e.g., the first coil antenna 1521 of FIG. 15B) may be enabled.

In accordance with one embodiment, the MST data transmission module 1640 may identically transmit the control signal 1654 for enabling the first MST module 1610 and the second MST module 1620 to the first data reception module 1631 and the second data reception module 1632, and may transmit the MST signals 1653 and 1655, including different payment information, to the first data reception module 1631 and the second data reception module 1632. For example, Track1 information and Track2 information may be delivered to the first data reception module 1631 and the second data reception module 1632, respectively. The MST signal including the Track1 information may be delivered to the first MST module 1610 through the first output transition module 1633 and thus transmitted to the outside. Furthermore, the MST signal including the Track 2 information may be delivered to the second MST module 1620 through the second output transition module 1634 and thus transmitted to the outside. The first data reception module 1631 and the first output transition module 1633 may be one module. The second data reception module 1632 and the second output transition module 1634 may be one module.

In accordance with one embodiment, referring to FIG. 16C, the MST data transmission module 1640 may transmit MST signals 1656 and 1658, including different payment information, to the first data reception module 1631 and the second data reception module 1632 within the MST control module 1630. Furthermore, the MST data transmission module 1640 may transmit different control signals 1657 and 1659 to the MST control module 1630 so that the first MST module 1610 and the second MST module 1620 are controlled independently. The first data reception module 1631 and the first output transition module 1633 may be one module. The second data reception module 1632 and the second output transition module 1634 may also be one module.

Figure 17A:
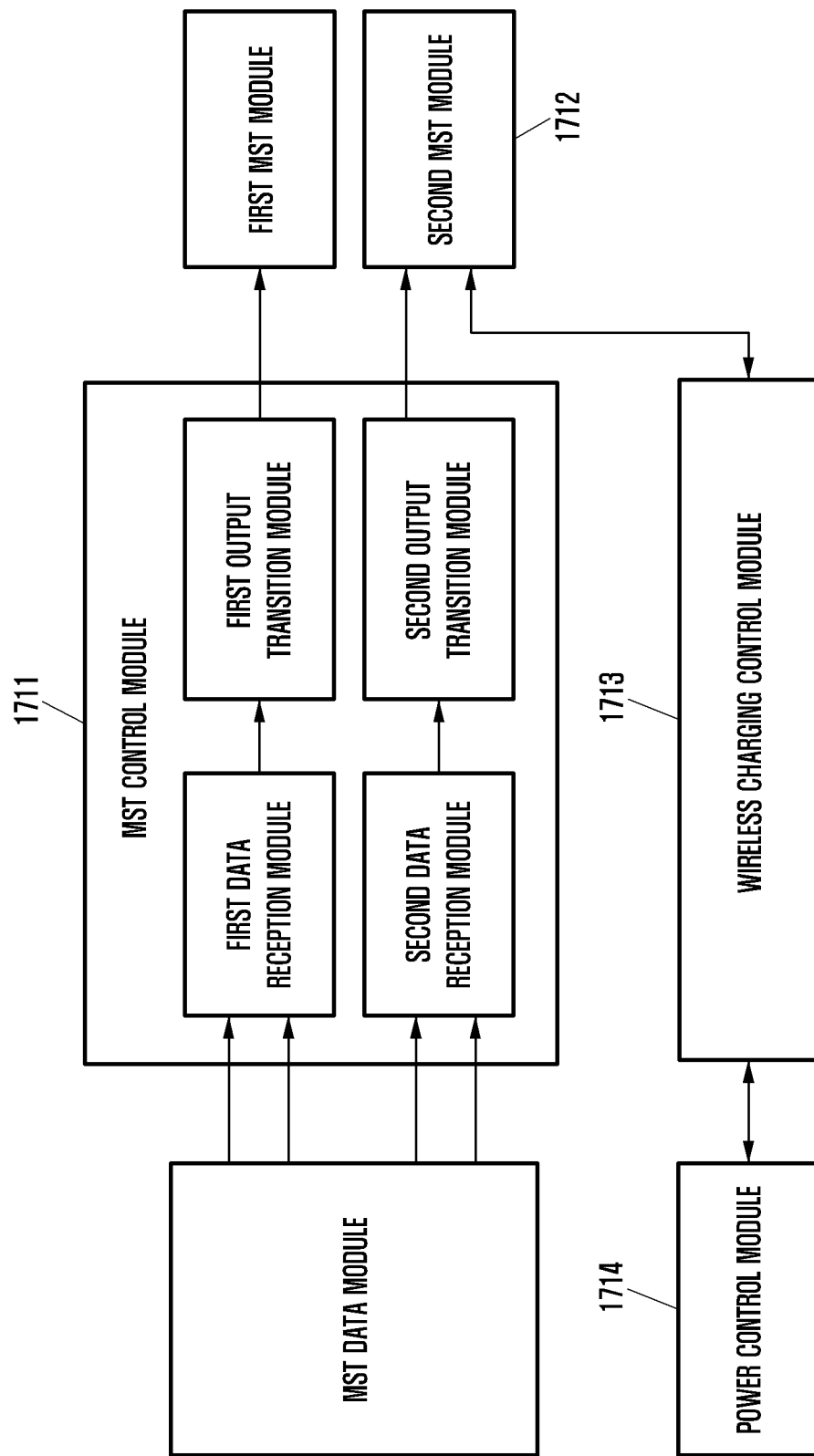
FIGS. 17A to 17C are block diagrams of hardware within an electronic device in which at least one of a plurality of MST modules may be shared with other wireless short-distance communication according to various embodiments of the present disclosure.
Figure 17B:
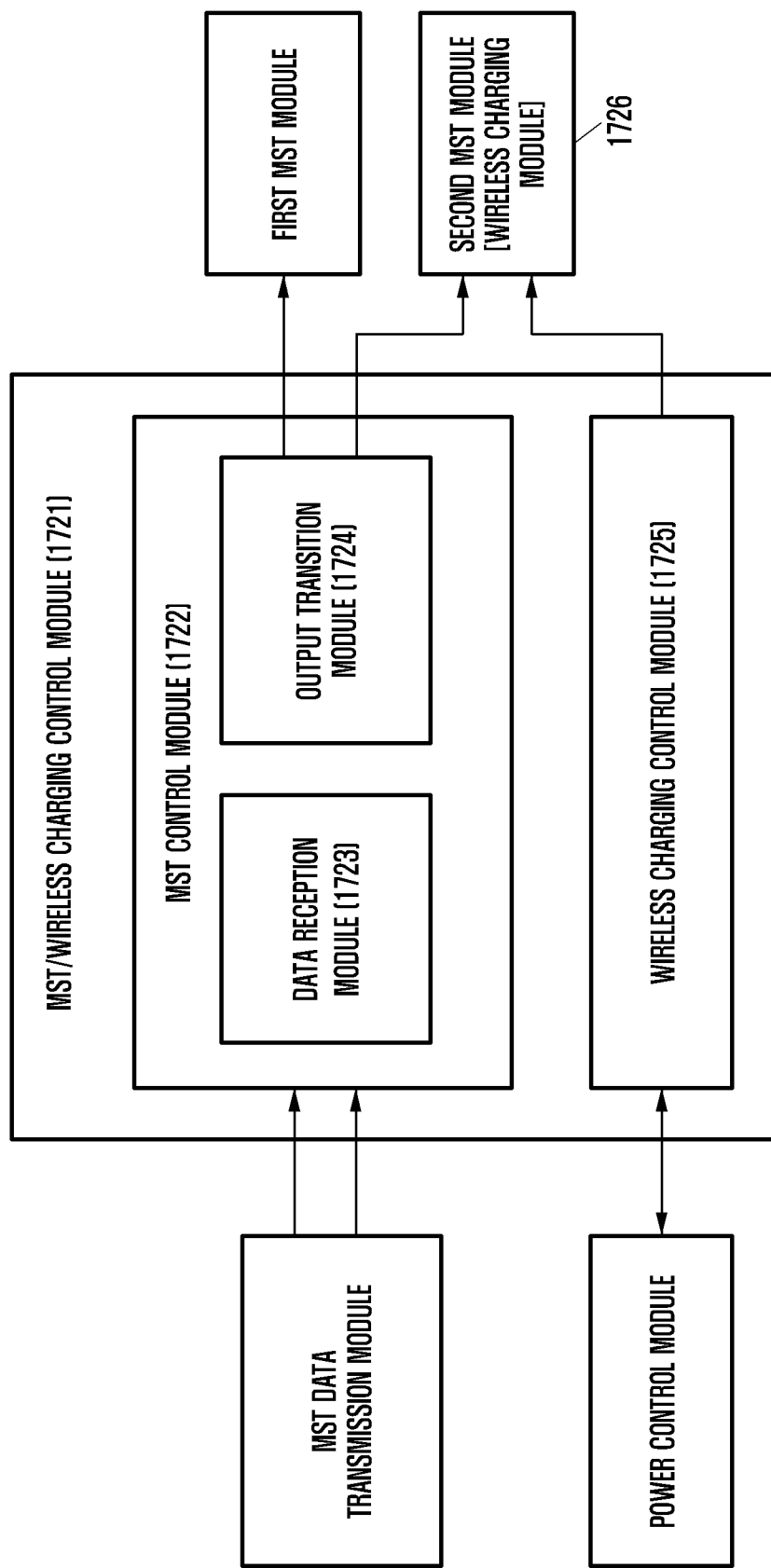
Figure 17C:
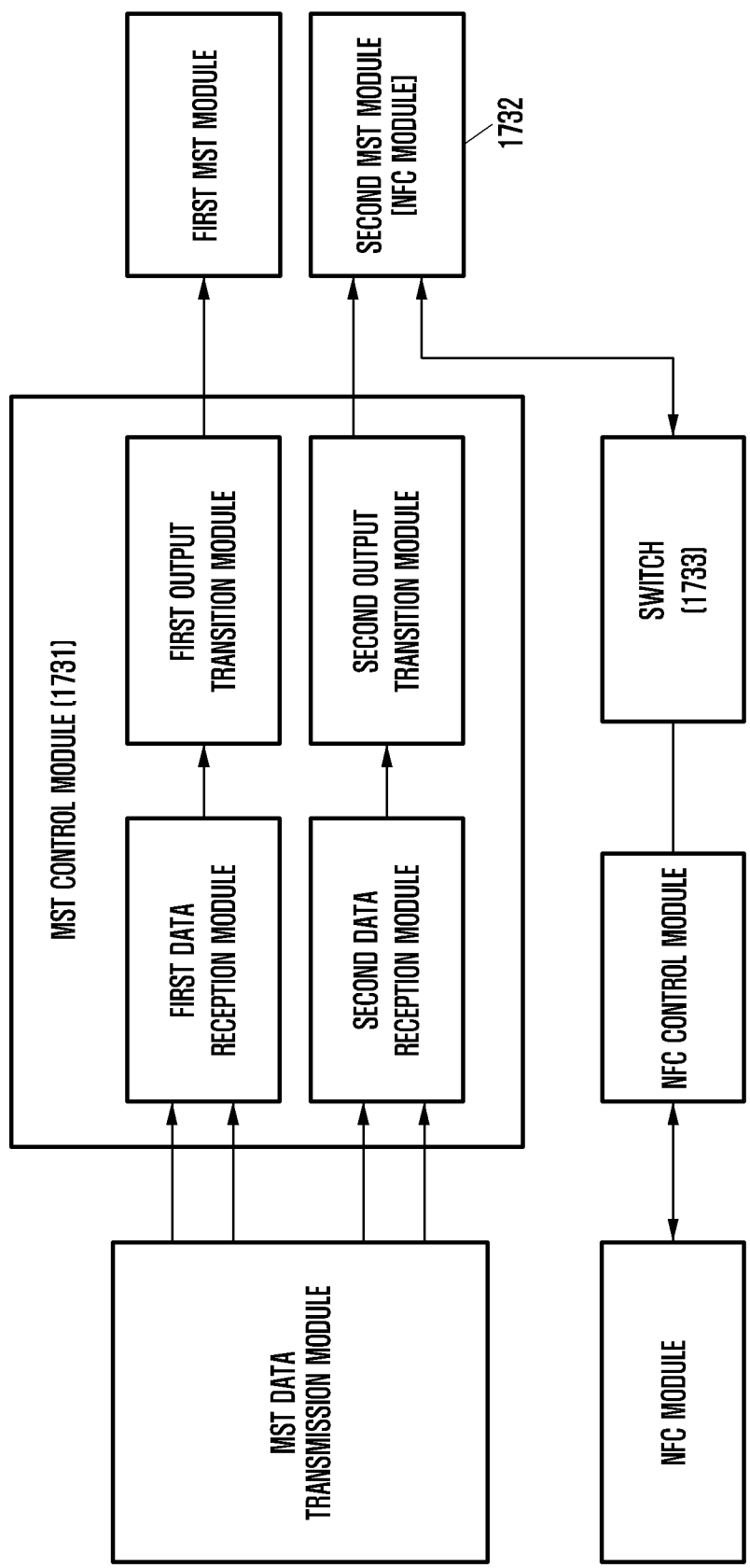

FIGS. 17A to 17C are block diagrams of hardware within an electronic device in which at least one of a plurality of MST modules may be shared with other wireless short-distance communication according to various embodiments of the present disclosure.

Referring to FIG. 17A, an MST control module 1711 according to various embodiments of the present disclosure may further include a switch (not shown) for preventing a second MST module 1712 from being connected to the MST control module 1711 (open (high impedance) state) when the second MST module 1712 is connected to a wireless charging control module 1713 and operates as a wireless charging module (wireless charging coil antenna). The wireless charging control module 1713 may include an AC/DC converter, a rectifier, etc. A power control module 1714 may be an element of the electronic device 100, for example. In accordance with one embodiment, the second MST module 1712 may include a coil antenna having an inductance value of about 10 uH, for example.

Referring to FIG. 17B, the electronic device 100 according to various embodiments of the present disclosure may use at least one of a plurality of MST modules, for example, a second MST module 1726 as a coil antenna for wireless charging of a resonance method. An MST/wireless charging control module 1721 may include an MST control module 1722, including a data reception module 1723 and an output transition module 1724, and a wireless charging control module 1725.

Referring to FIG. 17C, the electronic device 100 according to various embodiments of the present disclosure may use at least one of a plurality of MST modules, for example, a second MST module 1732 as an NFC coil antenna. If the second MST module 1732 is used as an NFC coil antenna, the electronic device may further include a switch 1733 in order to adjust the number of turns or inductance value of a coil antenna. If at least one of the MST modules is used for different short-distance wireless communication (e.g., NFC communication), an MST control module 1731 may further include an internal switch (not shown) for preventing the MST module used for different short-distance wireless communication, for example, the second MST module 1732 from being connected to the MST control module 1731.

Figure 18:
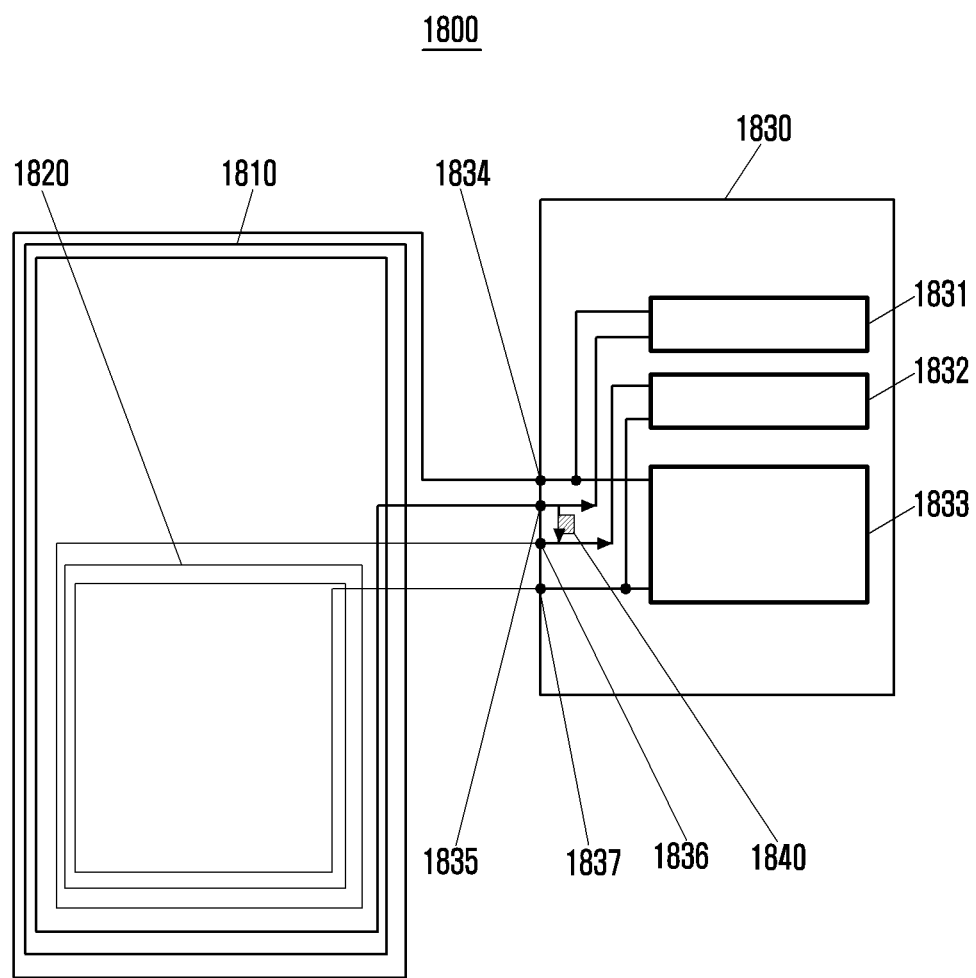
FIG. 18 is a diagram schematically showing an antenna device according to various embodiments of the present disclosure.

FIG. 18 is a diagram schematically showing an antenna device according to various embodiments of the present disclosure.

Referring to FIG. 18, the antenna device 1800 according to various embodiments of the present disclosure may be an element of an electronic device (e.g., electronic device 100), and may include a first loop antenna 1810, a second loop antenna 1820, a communication module 1830 and a switch 1840. The communication module 1830 may include a first communication module 1831, a second communication module 1832, a third communication module 1833 and four terminals 1834~1837.

The first communication module 1831 according to various embodiments may be electrically connected to the first loop antenna 1810 through the first terminal 1834 and the second terminal 1835, and may transmit and receive radio waves of short-distance communication. For example, the first communication module 1831 is a resonant charging (e.g., an alliance for wireless power (A4WP) module, and may receive radio waves for charging through the first loop antenna 1810.

The second communication module 1832 according to various embodiments may be electrically connected to the second loop antenna 1820 through the third terminal 1836 and the fourth terminal 1837, and may transmit and receive radio waves of short-distance communication. For example, the second communication module 1832 may operate as an NFC module.

The third communication module 1833 according to an embodiment may be electrically connected to the first loop antenna 1810 and the second loop antenna 1820 through the terminals 1834~1837 and the switch 1840, and may transmit radio waves of short-distance communication (e.g., MST or wireless power consortium (WPC)). For example, when the switch 1840 is an ON state and a current is supplied from the third communication module 1833 to the first terminal 1834, the current flows into the second terminal 1835 via the first loop antenna 1810 through the first terminal 1834. The current then flows through the second loop antenna 1820 via the switch 1840 and the third terminal 1836 and then flows into the third communication module 1833 via the fourth terminal 1837. As described above, the first loop antenna 1810 and the second loop antenna 1820 form one path through the switch 1840, and the third communication module 1833 may transmit and receive radio waves through the path.

The ON/OFF operation of the switch 1840 according to various embodiments of the present disclosure may be controlled by the communication module 1830 or a control module (e.g., AP) within the electronic device. The switch 1840 may be included in the communication module 1830 as shown, but is not limited thereto. The switch may be positioned at any place where the loop antenna 1810 and the second loop antenna 1820 can be electrically connected. In this case, the switch 1840 may be positioned by taking into consideration the length of a path, the number of turns of the path, and an inductance value so that a given frequency of the third communication module 1833 can be selected (i.e., resonate).

FIG. 19 schematically shows a plurality of coil antennas within an electronic device according to various embodiments of the present disclosure, and is a diagram showing the intensities of magnetic fields and null points generated in a plurality of coil antennas.

Referring to FIG. 19, an electronic device 1910 (e.g., electronic device 100) according to various embodiments of the present disclosure includes a first coil antenna 1911 and a second coil antenna 1912. Each of the first coil antenna 1911 and the second coil antenna 1912 may form a magnetic field in response to the feeding of a current. FIG. 1920 shows the intensity of a magnetic field and the position of a null point generated in the first coil antenna 1911 (recognized in an external device (POS terminal)) according to various embodiments of the present disclosure. Furthermore, FIG. 1930 shows the intensity of a magnetic field and the position of a null point generated in the second coil antenna 1912 according to various embodiments of the present disclosure.

Referring to FIG. 1920, a first null point 1921 generated by the first coil antenna 1911 and a first null point 1931 generated by the second coil antenna 1912 may not overlap. The first coil antenna 1911 and the second coil antenna 1912 may transmit an MST signal periodically and alternately. For example, the first coil antenna 1911 and the second coil antenna 1912 may transmit a total of 16 (i.e., each one transmits 8 MST signals) MST signals to the outside once every second. Accordingly, the null points may also be periodically alternated. For example, the null points may be periodically changed from the first null point 1921 to the second the null point 1931 and vice versa. In this case, if an external device (e.g., POS terminal) is positioned in the first null point 1921, the external device (POS terminal) may not receive payment information from the first coil antenna 1911 or may not recognize payment information although it receives the payment information. The external device (e.g., POS terminal) may receive payment information (MST signal) from the second coil antenna 1912 and complete payment. As described with reference to FIG. 19, the electronic device sequentially drives a plurality of coil antennas so that null points are alternated, thereby raising a success rate of payment.

FIG. 20 schematically shows a plurality of coil antennas within an electronic device, and FIG. 21 is a diagram showing the intensities of magnetic fields and null points generated in a plurality of coil antennas according to various embodiments of the present disclosure.

Referring to FIG. 20, a first coil antenna 2011 and a second coil antenna 2013 according to various embodiments of the present disclosure may operate at the same time in order to transmit MST signals. For example, referring to FIG. 2010, the first coil antenna 2011 may be formed in the left area of an electronic device (e.g., smartphone), and the second coil antenna 2013 may be formed in the right area thereof. The first coil antenna 2011 and the second coil antenna 2013 may be fed with currents at the same time. In this case, the directions of the currents may be different. For example, the path of the first coil antenna 2011 may form a clockwise direction, and the path of the second coil antenna 2013 may form a counterclockwise direction. Accordingly, referring to FIG. 2020, the directions of the currents become equal at the center, the intensity of a magnetic field may be the greatest at the center, and null points may be formed nearby. For example, the two null points 2021 and 2023 may be formed on both sides of the center.

Referring to FIG. 21, in accordance with various embodiments, the directions of currents may be the same. The intensity of a magnetic field may be the weakest at the center because the direction of a current is changed at the center. Referring to FIG. 2110, a first coil antenna 2111 and a second coil antenna 2113 may be positioned as shown. When the directions of currents are the same, the place (i.e., center) where the two coil antennas are adjacent may be a null point 2121.

In accordance with various embodiments, referring to FIGS. 20 and 21, a null point may be periodically changed by driving a plurality of coil antennas at the same time, but changing the directions of currents (e.g., by making the directions of the currents identical or opposite). That is, an electronic device may drive a plurality of coil antennas at the same time so that null points are alternated, but change the directions of currents, thereby being capable of raising a success rate of payment.

Meanwhile, the electronic device 100 may change null points using all of a method of sequentially driving a plurality of coil antennas, a method of driving a plurality of coil antennas at the same time, but changing the directions of currents or a combination of the methods. Accordingly, an effect that a success rate of MST payment is raised can be obtained.

FIGS. 22A to 22D are diagrams regarding various embodiments using a plurality of coil antennas according to embodiments of the present disclosure.

Figure 22A:
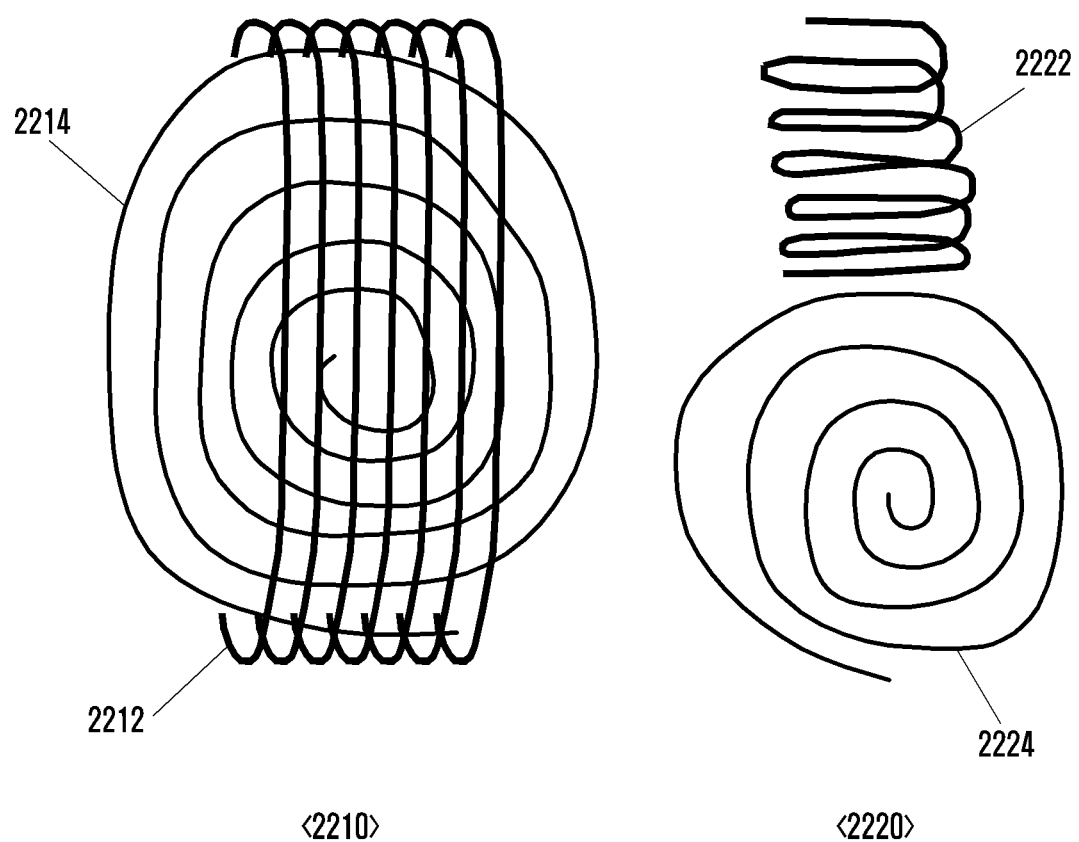
FIGS. 22A to 22D are diagrams regarding various embodiments using a plurality of coil antennas according to embodiments of the present disclosure.
Figure 22B:
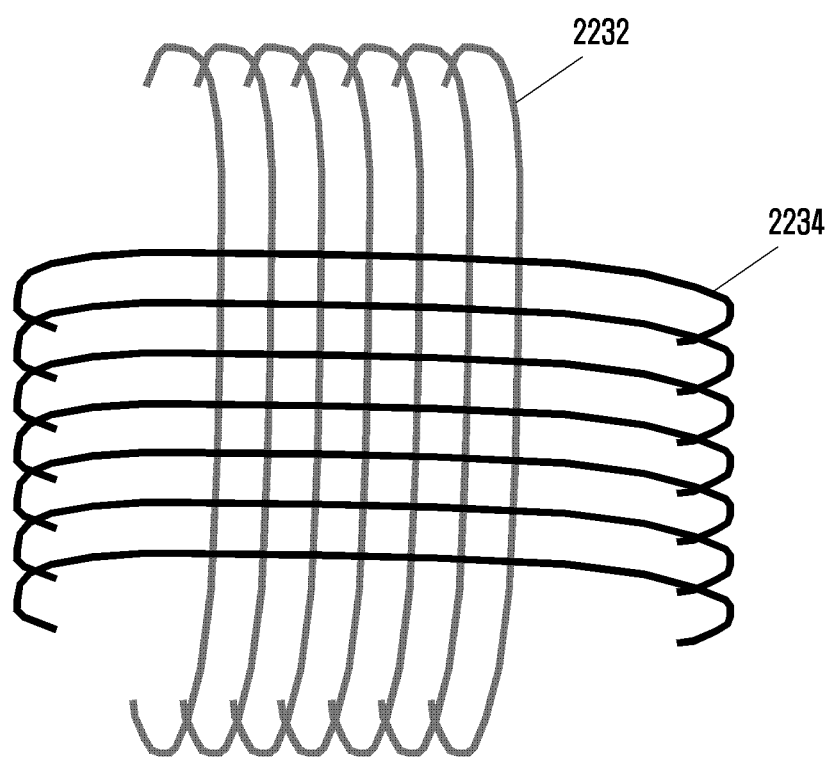
Figure 22C:
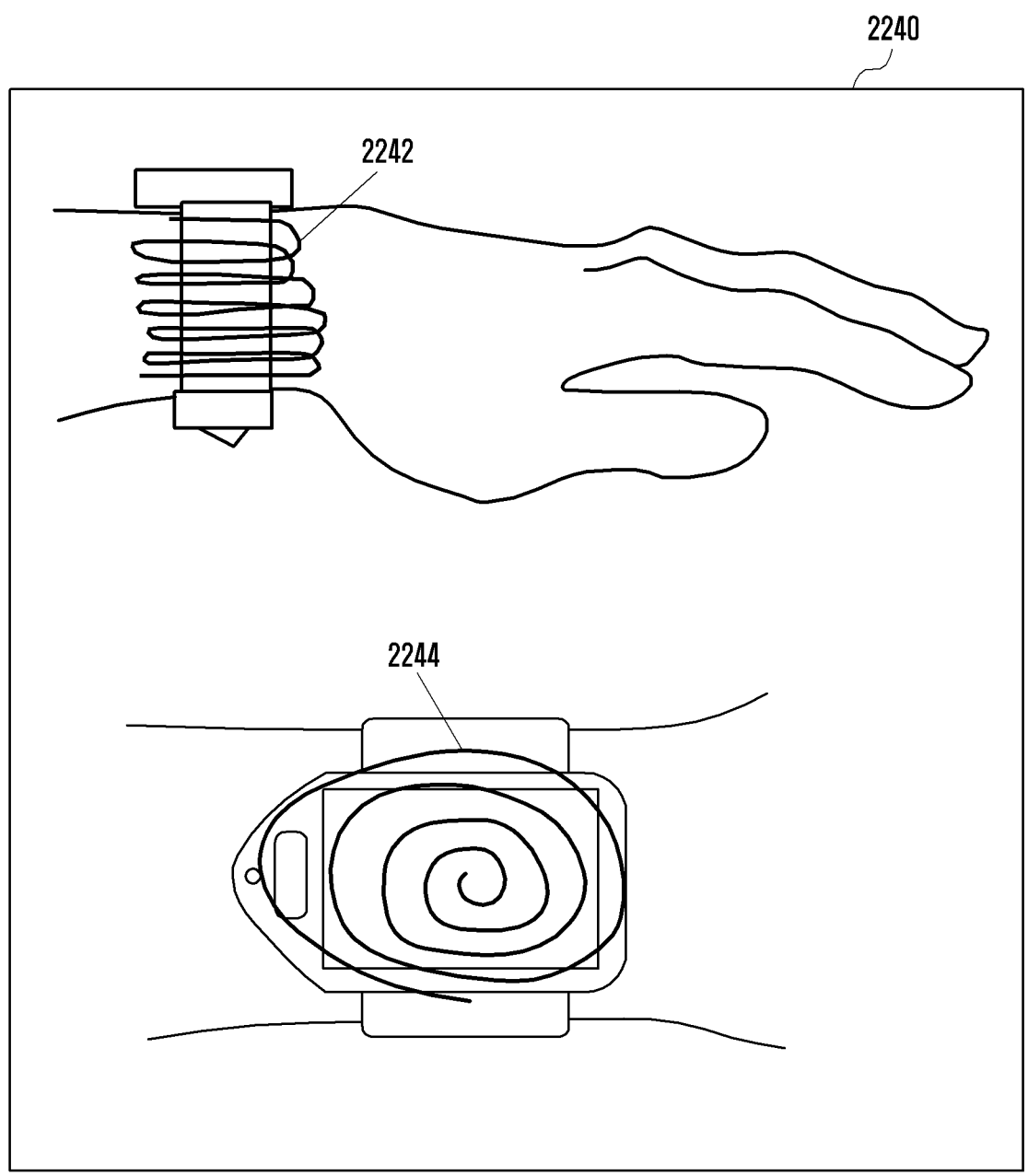
Figure 22D:
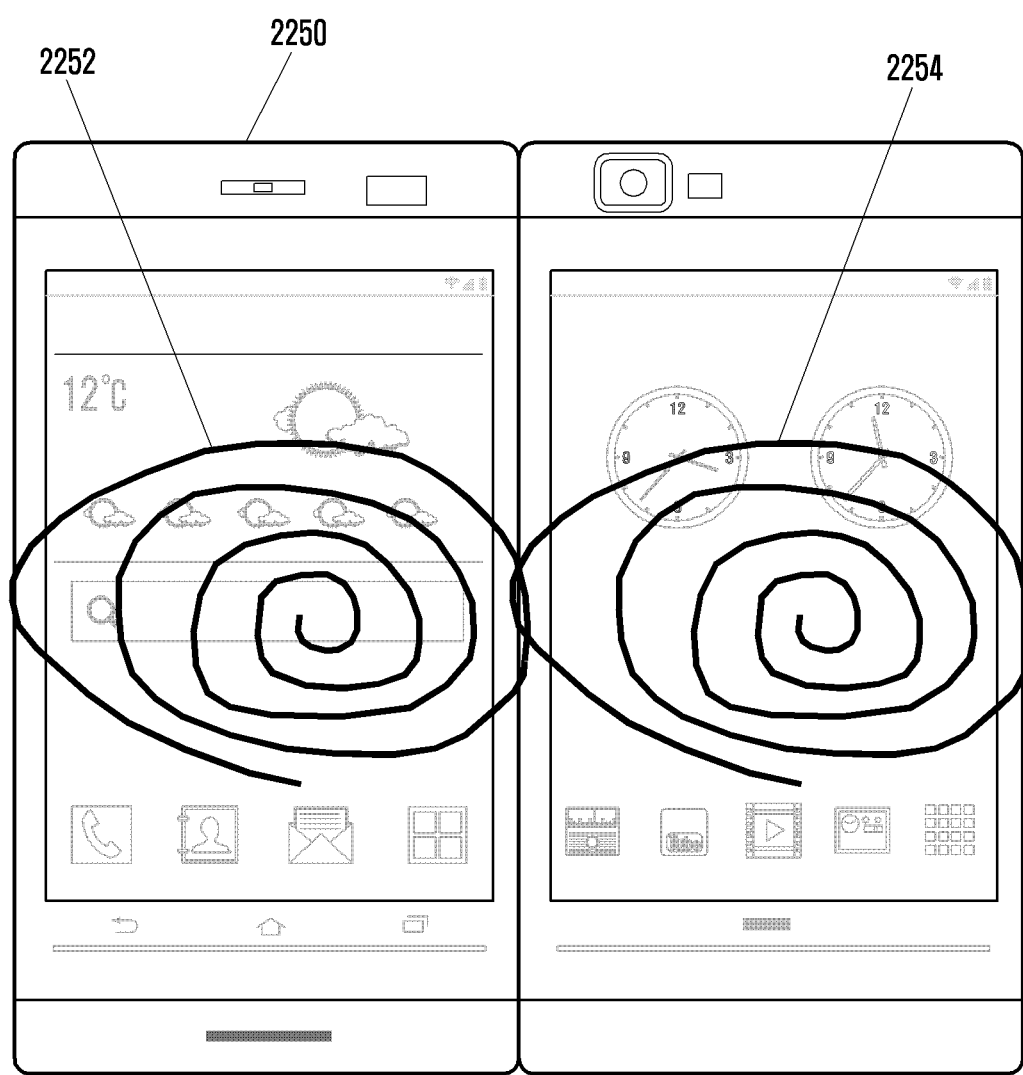

Referring to FIG. 22A, a plurality of coil antennas may be implemented as flat coil antennas 2214 and 2224 and solenoid antennas 2212 and 2222. FIG. 22B may be implemented in a form similar to FIG. 15B. If a plurality of coil antennas is used in a wearable terminal (e.g., smart watch), the first coil antenna 2242 may be included in a write strap and a second coil antenna 2244 may be included in an LCD back as in FIG. 22C. As in FIG. 22D, in an electronic device (e.g., electronic device 100) including two or more displays or including a flip cover, separated coil antennas may be included in respective surfaces.

In accordance with various embodiments, a plurality of coil antennas may operate at the same time or may be divided and operated according to time. The coil antennas may be selectively used depending on an angle of the electronic device 100 and/or a movement (tagging information) of the electronic device 100. The electronic device 100 may guide the area where recognition is good through an output device (e.g., display).

Figure 23:
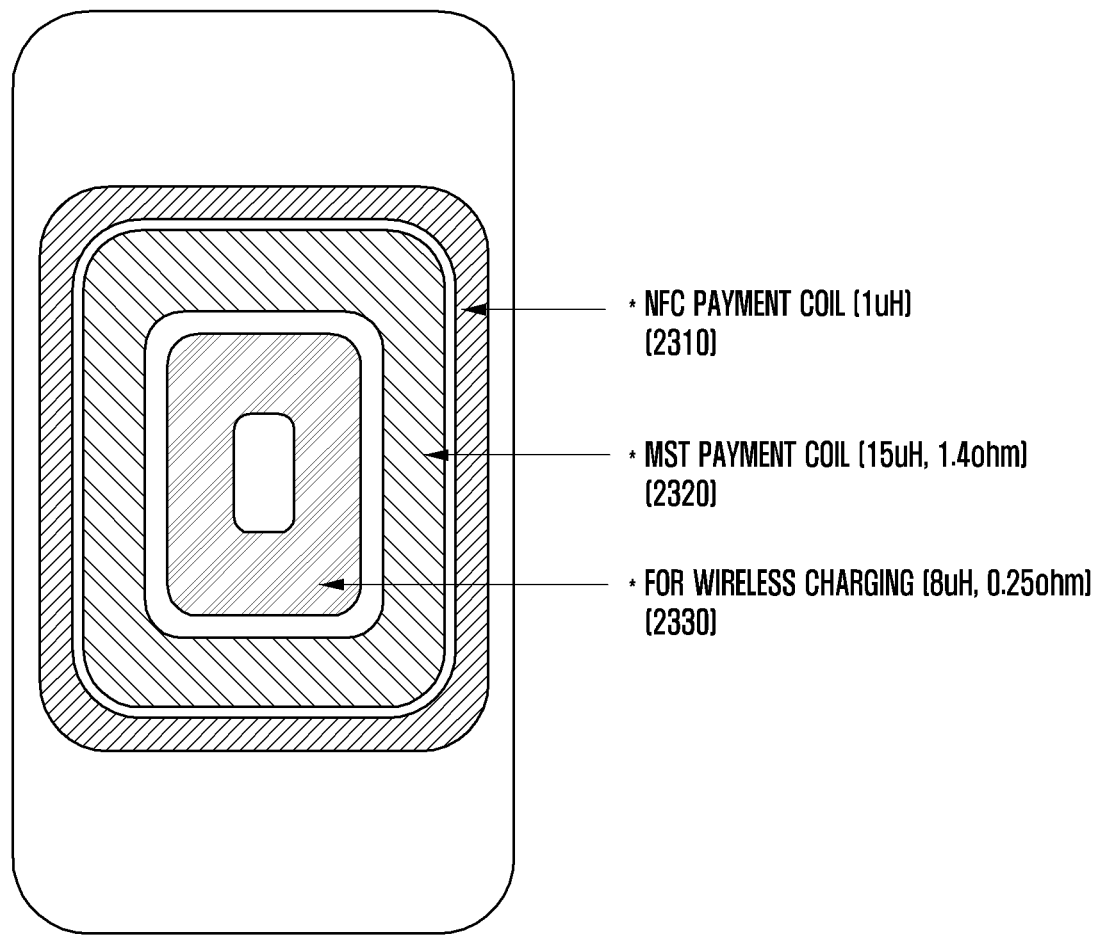
FIG. 23 is a diagram regarding a method of mounting coils according to embodiments of the present disclosure.

FIG. 23 is a diagram regarding a method of mounting coils according to embodiments of the present disclosure.

Referring to FIG. 23, the electronic device 100 may include three different coils. For example, the electronic device 100 may include an NFC coil 2310, an MST coil 2320 and a wireless charging coil 2330. In accordance with various embodiments, in order to mount the three different coils most efficiently, all the three different coils may be disposed to have the same center. For example, the NFC coil 2310 may be mounted on the outermost side because it performs modulation into the highest frequency and has a great interference influence on a surrounding antenna or coil. The MST coil 2320 having a close relation between the size and operating range of the coil may be mounted in the middle. The MST coil and wireless charging, that is, low frequency communication delivering high power, may have less influence on performance although it is surrounded by a coil of a different band or function because the coil has low sensitivity according to surrounding coils.

Figure 24:
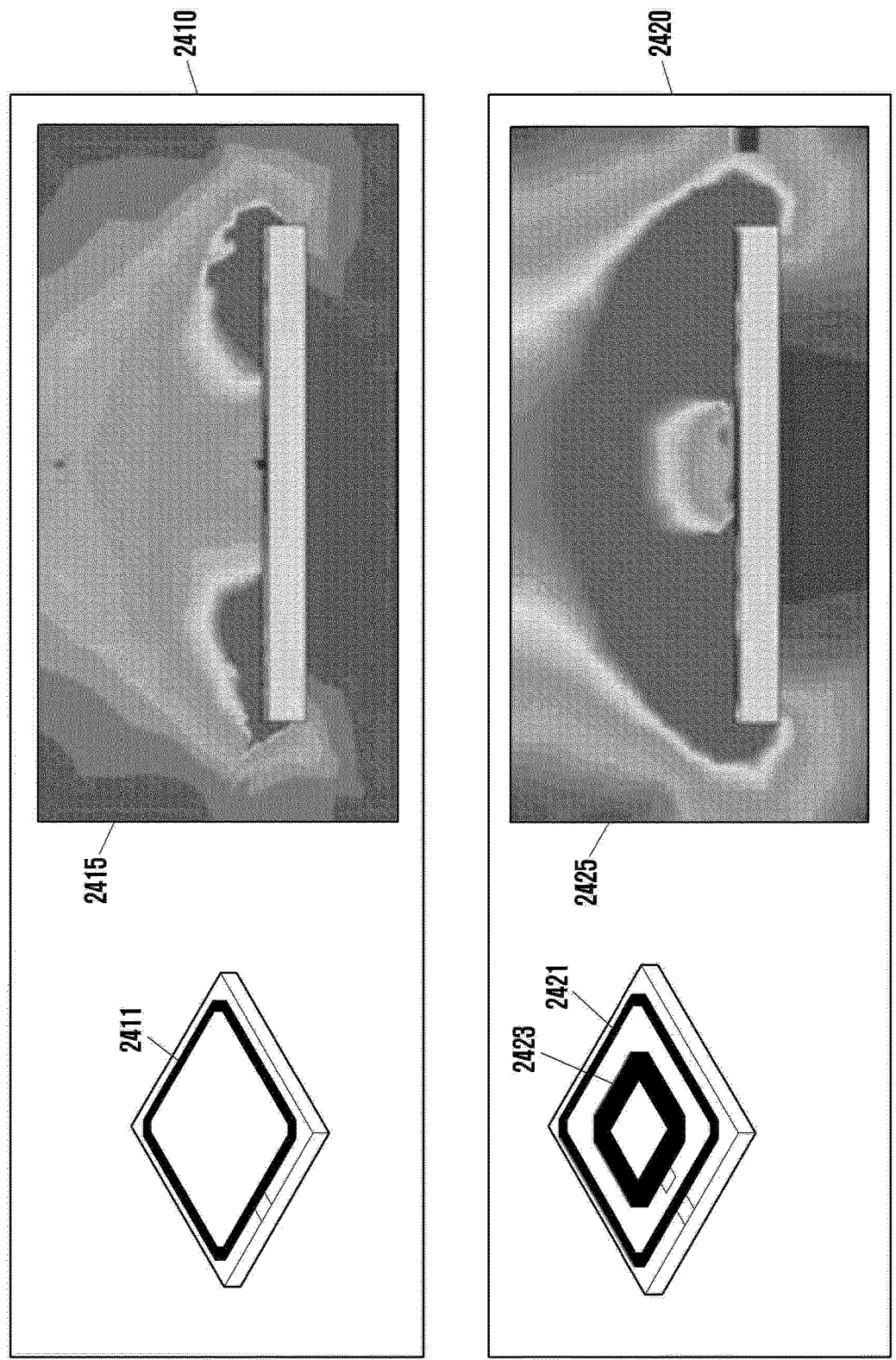
FIGS. 24 and 25 are diagrams regarding coil structures according to various embodiments of the present disclosure and the simulation results of radiation characteristics thereof.
Figure 25:
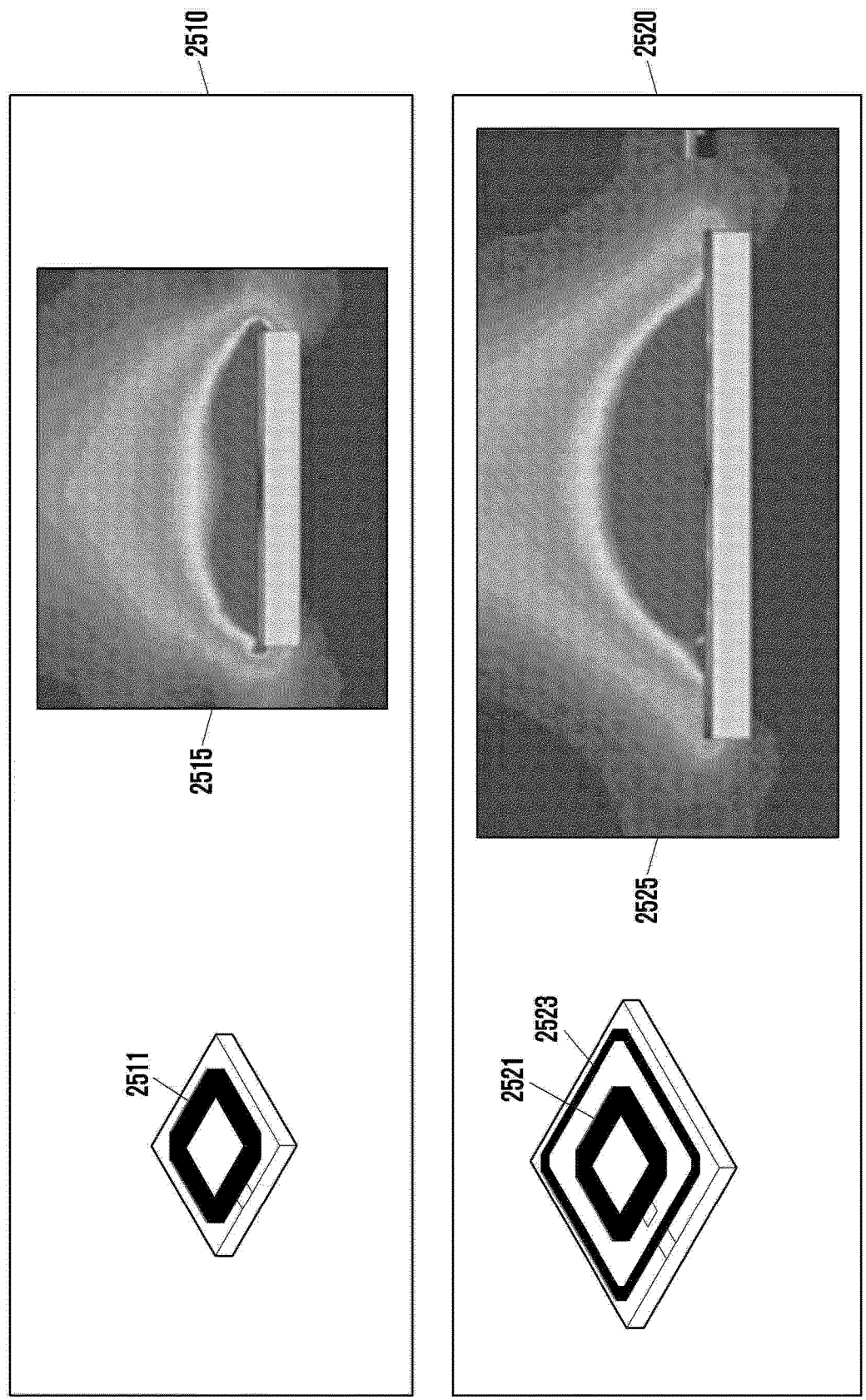

FIGS. 24 and 25 are diagrams regarding coil structures according to various embodiments of the present disclosure and the simulation results of radiation characteristics thereof.

Referring to FIG. 24, the coil structures according to various embodiments may include a first structure 2410 and a second structure 2420.

In accordance with various embodiments, the first structure 2410 may include a short-distance communication coil 2411 (e.g., NFC coil). For example, the short-distance communication coil 2411 may have a first resonant frequency (e.g., 15 MHz).

In accordance with various embodiments, the second structure 2420 may include a short-distance communication coil 2421 and a wireless charging coil 2423 (e.g., WPC coil). For example, the wireless charging coil 2423 may be positioned inside the short-distance communication coil 2421. The wireless charging coil 2423 may have a second resonant frequency (e.g., 500 kHz). The short-distance communication coil 2421 and the wireless charging coil 2423 may be mounted on one surface together.

According to various embodiments, referring to FIGS. 2415 and 2425, the radiation characteristics 2425 of the short-distance communication coil 2421 when the short-distance communication coil 2421 and the wireless charging coil 2423 are mounted together (FIG. 2420) may have a phenomenon in which a magnetic field is reinforced compared to the radiation characteristics 2415 of the short-distance communication coil 2411 when only the short-distance communication coil 2411 is mounted (FIG. 2410). The reason for this is that although an adjacent coil does not operate, the coupling of magnetic fields occurs to induce a surface current, thereby reinforcing the magnetic fields.

Referring to FIG. 25, coil structures according to various embodiments may include a first structure 2510 and a second structure 2520. In accordance with various embodiments, the first structure 2510 may include a first coil 2511 (e.g., WPC coil).

In accordance with various embodiments, the second structure 2520 may include a first coil 2521 (e.g., WPC coil) and a second coil 2523 (e.g., MST coil). For example, the first coil 2521 may be positioned inside the second coil 2523. The first coil 2421 and the second coil 2423 may be mounted together on one surface.

According to various embodiments, referring to FIGS. 2515 and 2525, the radiation characteristics 2525 of the first coil 2521 when the first coil 2521 and the second coil 2523 are mounted together (FIG. 2520) may have a phenomenon in which a magnetic field is reinforced compared to the radiation characteristics 2515 of the first coil 2511 when only the first coil 2511 is mounted (FIG. 2510). The reason for this is that although an adjacent coil does not operate, the coupling of magnetic fields occurs to induce a surface current, thereby reinforcing the magnetic fields.

Referring to FIGS. 24 and 25, the radiation characteristics of a given coil mounted on the outside of one surface or therein can be improved through such reinforced interference. In accordance with one embodiment, if an electronic device includes an NFC coil, an MST coil and a wireless charging coil, effective performance can be achieved when the NFC coil is positioned on the outermost side, the wireless charging coil (e.g., WPC) is positioned on the innermost side, and the MST coil less influenced by surrounding coils is positioned between the NFC coil and the wireless charging coil in order to obtain a proper number of turns (area).

Figure 26:
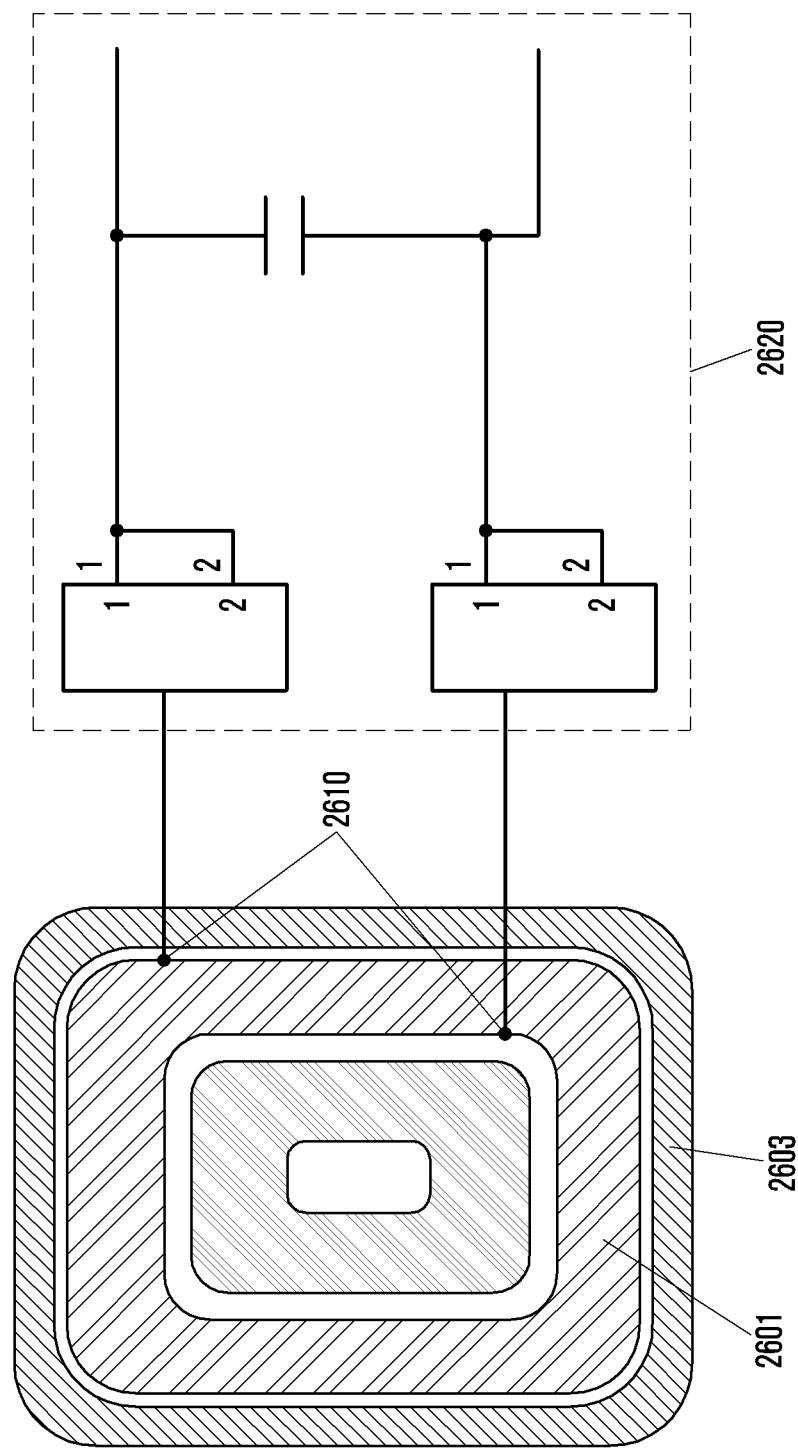
FIG. 26 is a diagram regarding the NFC coupling prevention circuit of an electronic device according to embodiments of the present disclosure.

FIG. 26 is a diagram regarding the NFC coupling prevention circuit of an electronic device according to embodiments of the present disclosure.

Referring to FIG. 26, an NFC coupling prevention circuit 2620 may be mounted on the MST output line 2610 of the electronic device 100. An NFC coil 2603 operates as parasitization due to the resonant frequency of an MST coil 2601, so NFC may operate. Accordingly, the resonant frequency of the MST coil 2601 may be reduced to a low frequency through a shunt capacitor or a series inductor, and thus an effect that the resonant frequency of the MST coil 2601 becomes distant from the resonant frequency of the NFC coil 2603 can be obtained.

In accordance with various embodiments, if an inductor is used in a line through which a high current (e.g., a current flowing into the MST coil is 2 A) flows, it may need to have a very large size.

In accordance with various embodiments, the MST coil may be less influenced by the tuning (shunt capacitor or series capacitor) because it has low dependency on the frequency in producing performance. The WPC coil may be less influenced by the results of the tuning of the MST coil because it has low sensitivity to surrounding coils.

FIG. 27 is a diagram illustrating the best frequency and inductance necessary for each radio technology according to embodiments of the present disclosure.

As shown in FIG. 27, each of the technologies may have a different frequency characteristic and may have different inductance for performance optimization.

Referring to FIG. 27, in accordance with various embodiments, MST may have the best frequency of 0.5~5 kHz and the best inductance of 15~80 uH. Induction method wireless charging (e.g., WPC) may have the best frequency of 100~200 kHz and the best inductance of 8.8 uH. Resonant method wireless charging (e.g., A4WP) may have the best frequency of 6.78 MHz and the best inductance of 1~2 uH. NFC may have the best frequency of 13.56 MHz and the best inductance of 0.5~1 uH.

The electronic device 100 according to one embodiment may require a coil optimized for each technology in order to apply the aforementioned technologies (WPC, A4WP, MST and NFC). In this case, in a small electronic device such as a smartphone, there is limitation to the area and thickness and there may be a difficulty in securing coil performance due to interference attributable to an adjacent coil. Furthermore, inductors (e.g., coils) having proximate resonant frequencies may act as mutual interference. Accordingly, performance optimized for each coil can be derived for each technology through the share or efficient deployment of the coils.

Figure 28:
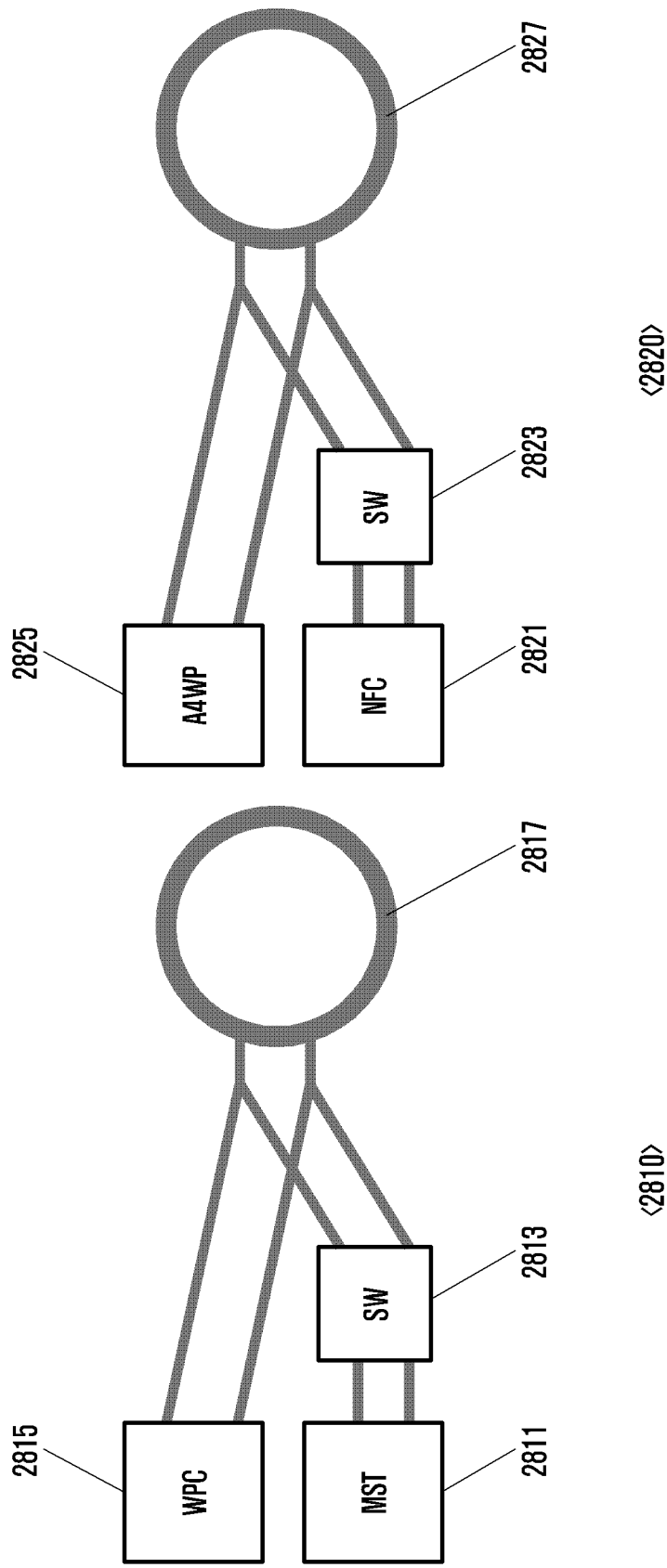
FIG. 28 is a diagram showing that the charging circuit and payment circuit of an electronic device may share a coil according to embodiments of the present disclosure.

FIG. 28 is a diagram showing that the charging circuit and payment circuit of an electronic device may share a coil according to embodiments of the present disclosure.

Referring to FIG. 28, the charging circuit (e.g., WPC 2815, A4WP 2825) and payment circuit (e.g., MST 2811, and NFC 2821) of the electronic device 100 may use a coil 2817, 2827 in common. For reference, inductance of an inductor may be tuned so that each circuit derives optimized performance.

In accordance with various embodiments, a switch 2813, 2823 may be positioned in the payment circuit 2811, 2821 not the charging circuit 2815, 2825. If the switch 2813, 2823 is mounted on the payment circuit 2811, 2821 and the coil 2817, 2827 is shared, charging performance may not be deteriorated because a loss of charging power of the charging circuit 2815, 2825 is prevented to a maximum extent.

In accordance with various embodiments, the switch 2813, 2823 positioned in the payment circuit 2811, 2821 may be turned off during charging and may be turned on during payment.

FIGS. 29A to 29D are diagrams regarding a method of extending coils by connecting different coils through a switch according to embodiments of the present disclosure.

Figure 29A:
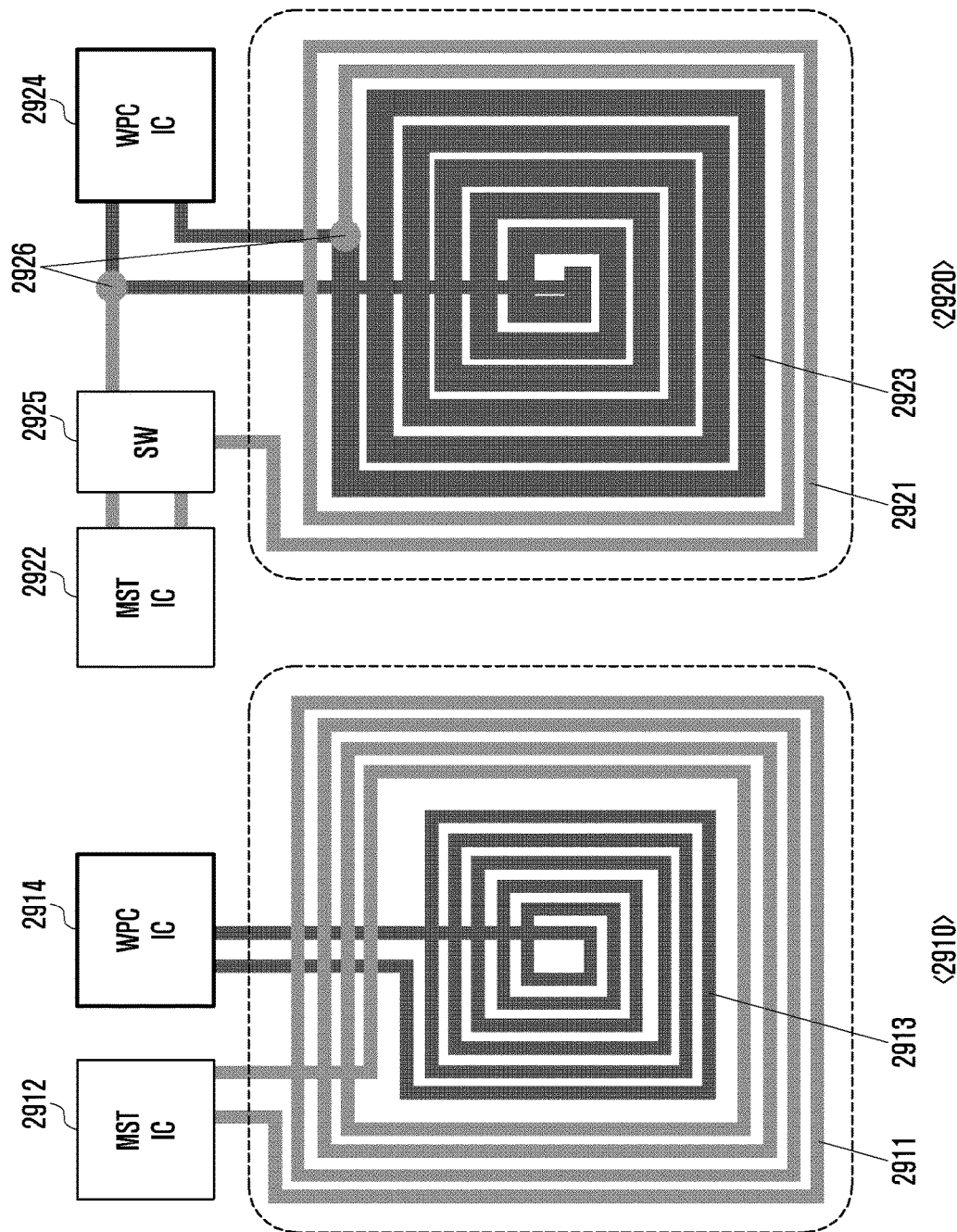
FIGS. 29A to 29D are diagrams regarding a method of extending coils by connecting different coils through a switch according to embodiments of the present disclosure.

Referring to 2910 of FIG. 29A according to various embodiments, an MST coil 2911 is connected to an MST IC 2912, and a WPC coil 2913 is connected to a WPC IC 2914. In this case, the MST coil 2911 and the WPC coil 2913 never share a coil.

Referring to 2920 of FIG. 29A according to various embodiments, an MST coil 2921 is connected to an MST IC 2922, and a WPC coil 2923 is connected to a WPC IC 2924. A switch 2925 may be positioned between the MST coil 2921 and the MST IC 2922. The switch 2925 may be connected to the WPC coil 2923 through a contact point 2926. When the switch is on, the MST coil 2921 is connected to at least part of the WPC coil 2923. Accordingly, an overall coil is extended and thus the number of turns or length can be increased. When the switch is off, the WPC IC 2924 may be charged using only the WPC coil 2923.

Figure 29B:
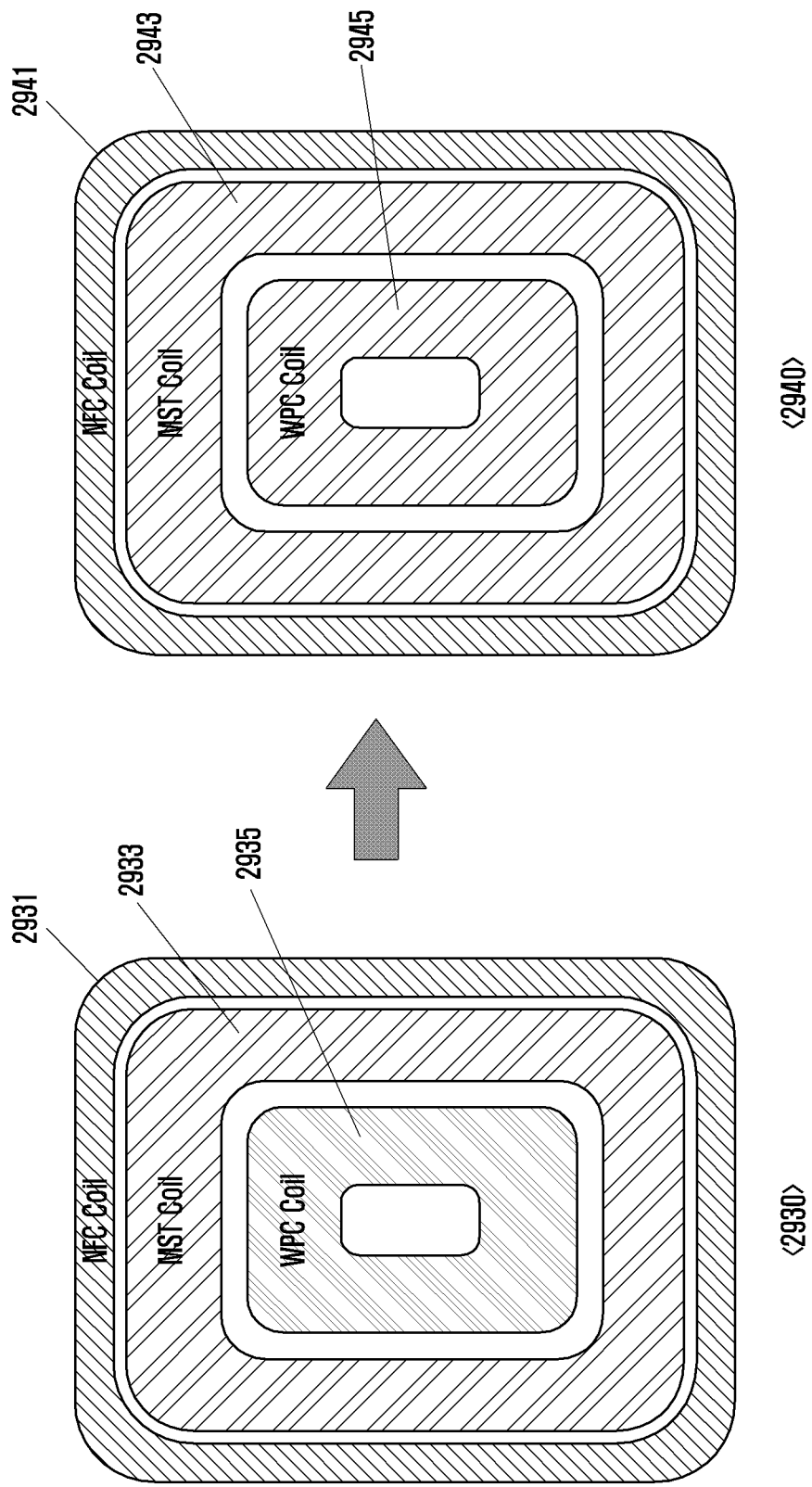

Referring to 2930 of FIG. 29B according to various embodiments, as in 2910 of FIG. 29A, different coils 2931, 2933 and 2935 do not share a coil. In this case, the coils may be a form to surround the outskirts through the same center. In general, performance of MST is proportional to a current flowing into a coil and the number of turns of the coil. The current flowing into the coil is in inverse proportion to resistance of the coil. A line having a wide width is necessary to prevent an increase in the resistance of the coil and to increase the number of turns. However, in 2930 of FIG. 29B, there may be a difficulty in increasing the number of turns while maintaining the width of a line because the mounting area of the MST coil 2933 is limited.

Referring to 2940 of FIG. 29B according to various embodiments, the electronic device 100 may connect a WPC coil 2945 to an MST coil 2943 and use it as the MST coil 2943. That is, as in 2920 of FIG. 29A, the MST coil 2943 may be extended (e.g., an increase in the number of turns or length) and connected by sharing at least part of the WPC coil 2945. For example, the MST coil 2943 may have optimized performance because it can use the WPC coil 2945 and an additional coil (e.g., a coil other than 2945 in 2940). In this case, further optimized performance can be obtained because the length of a coil may be different for each circuit (the length of the coil when payment is performed is more extended than the length of the coil when charging is performed) compared to FIG. 28.

According to various embodiments, the electronic device 100 may include a configuration in which the WPC coil 2945 is extended and connected by sharing at least part of the MST coil 2943 in addition to the configuration in which the MST coil 2943 is extended and connected by sharing at least part of the WPC coil 2945. For example, the MST coil 2943 may be reduced, and the area or number of turns of the WPC coil 2945 may be increased as much as the reduced amount. Accordingly, wireless charging performance of the electronic device 100 can be effectively improved.

In accordance with one embodiment, when wireless charging is performed, the WPC coil 2945 needs to maintain frequency resonance. In order to prevent an influence attributable to an MST circuit, when the WPC coil 2945 performs a wireless charging operation, it may be disconnected from the MST coil 2943. For reference, when charging is performed, the WPC coil 2945 and a bridge or an open stub are used. Charging performance of the WPC coil 2945 may be not influenced by the bridge or the open stub.

Figure 29C:
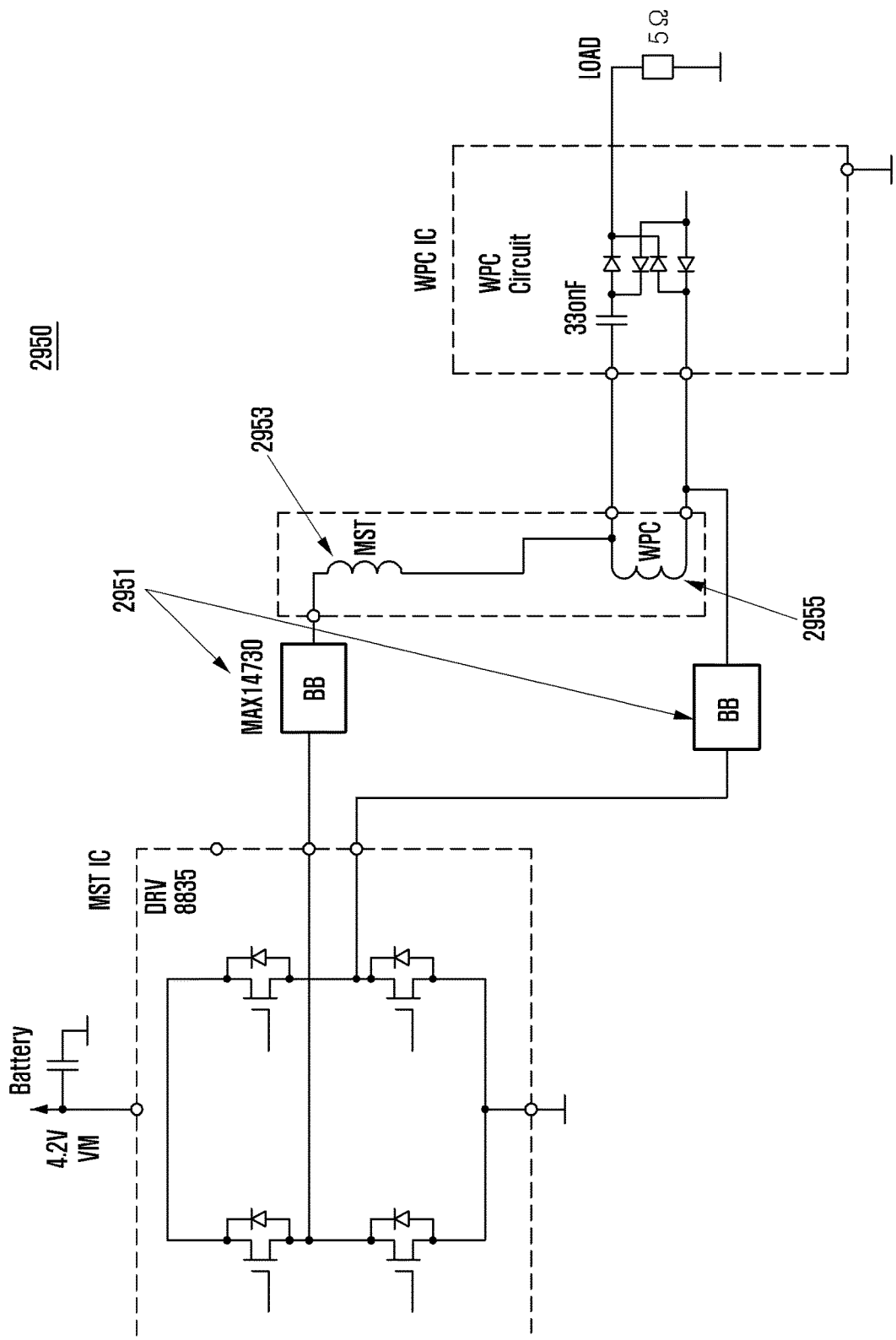

Referring to FIG. 29C according to various embodiments, there is disclosed a circuit diagram 2950 for selectively connecting the MST coil 2953 and WPC coil 2955 of the electronic device 100. The electronic device 100 may have switches 2951 mounted thereon to short-circuit or open a connection between the MST coil 2953 and WPC coil 2955 of an MST circuit (e.g., MST IC). For example, when MST is used, the switches 2951 may be short-circuited so that both the MST coil 2953 and the WPC coil 2955 operate as an extended MST coil (including 2953 and 2955). For another example, when wireless charging is used, the switches 2951 may be open to cut off a connection with the MST circuit. Accordingly, a reduction in charging performance of the WPC coil 2955 that may occur as the MST circuit is connected can be prevented.

In accordance with various embodiments, in the structure 2950, one switch (top) may be positioned between the MST coil 2953 and an MST IC and the other switch (bottom) may be positioned between the WPC coil 2955 and the MST IC so that all the switches 2951 can be mounted on a PCB. For reference, at least part of the structure 2950 may be mounted on an FPCB not a PCB.

In accordance with various embodiments, in order to secure performance of wireless charging (e.g., WPC), it is necessary to further widen the area of the WPC coil 2955. For example, performance of wireless charging may be proportional to the area of a coil for wireless charging or the number of turns of the coil. In the selective connection structure, part of the area occupied by the MST coil 2953 may be reduced, and the coil 2945 for wireless charging may be extended and mounted on the corresponding area. when MST is used, there may be no problem in MST performance because at least part of the coil 2945 for wireless charging is shared by controlling the switch 2951. Accordingly, both WPC performance and MST performance can be improved.

In accordance with various embodiments, in an NFC operation, when the switch 2951 is open, it may help to improve NFC performance. The MST coil 2953 may act as parasitization resonance with respect to NFC. Accordingly, when the switch is open, NFC performance can be improved because the resonant frequency of the MST coil 2953 moves.

Figure 29D:
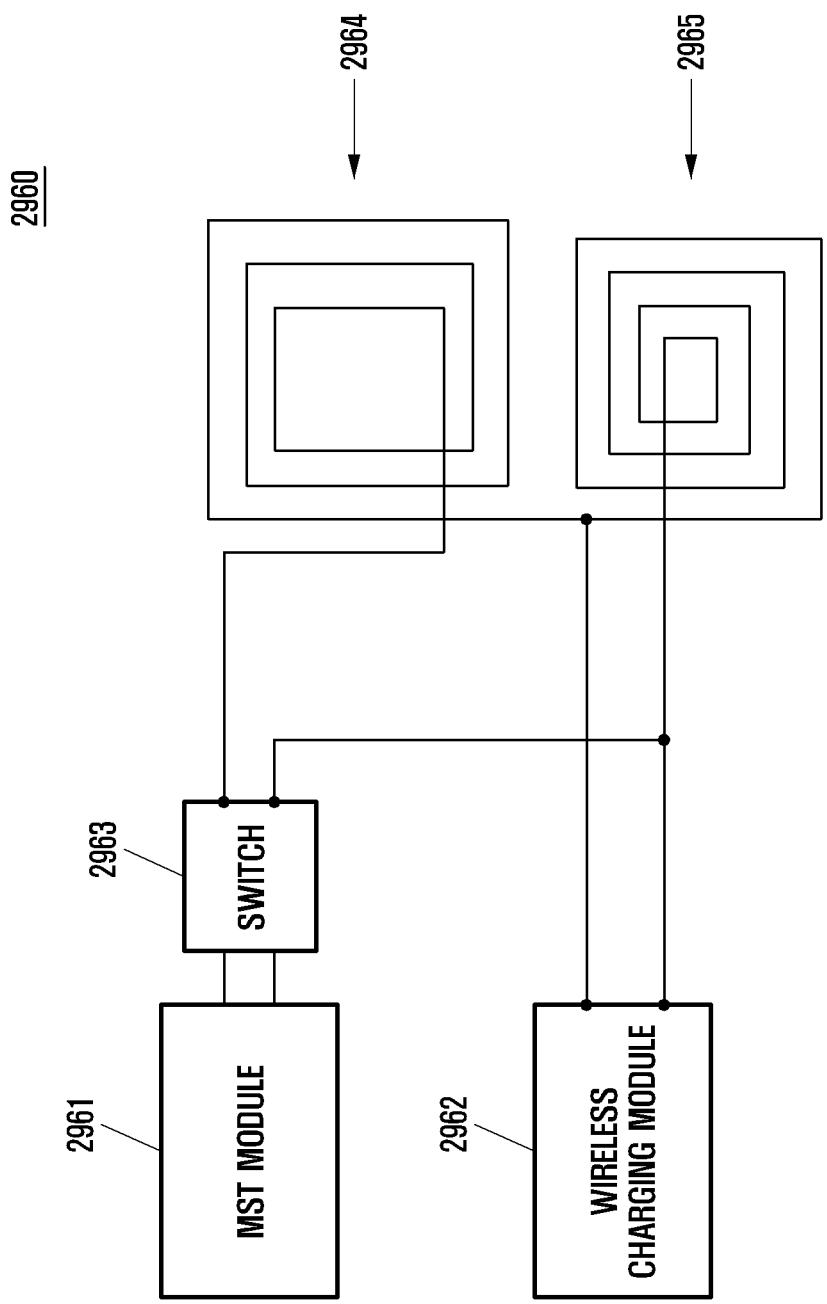

Referring to FIG. 29D according to various embodiments, the electronic device 100 may selectively connect an MST coil 2964 and a wireless charging coil 2965 through a switch 2963.

In accordance with various embodiments, when MST is used, the switch 2963 may be short-circuited so that both the MST coil 2964 and the WPC coil 2965 operate as an extended MST coil (including 2964 and 2965). In accordance with another embodiment, when wireless charging is used, the switch 2963 may be open to cut off a connection with an MST module 2961. Accordingly, a reduction in charging performance of a wireless charging module 2962 that may occur as the MST module 2961 is connected can be prevented.

In accordance with various embodiments, the MST coil 2964 and the wireless charging coil 2965 may be positioned at difference centers. That is, unlike in FIG. 29A or 29B, the coils may be configured to not have the same center. Accordingly, coverage of the coil can be increased, and usability in using payment can be improved. For example, referring to FIG. 19, the null points of magnetic fields according to respective coils can be mutually supplemented by disposing the coils at different centers. Accordingly, usability of a user can be improved.

Figure 30:
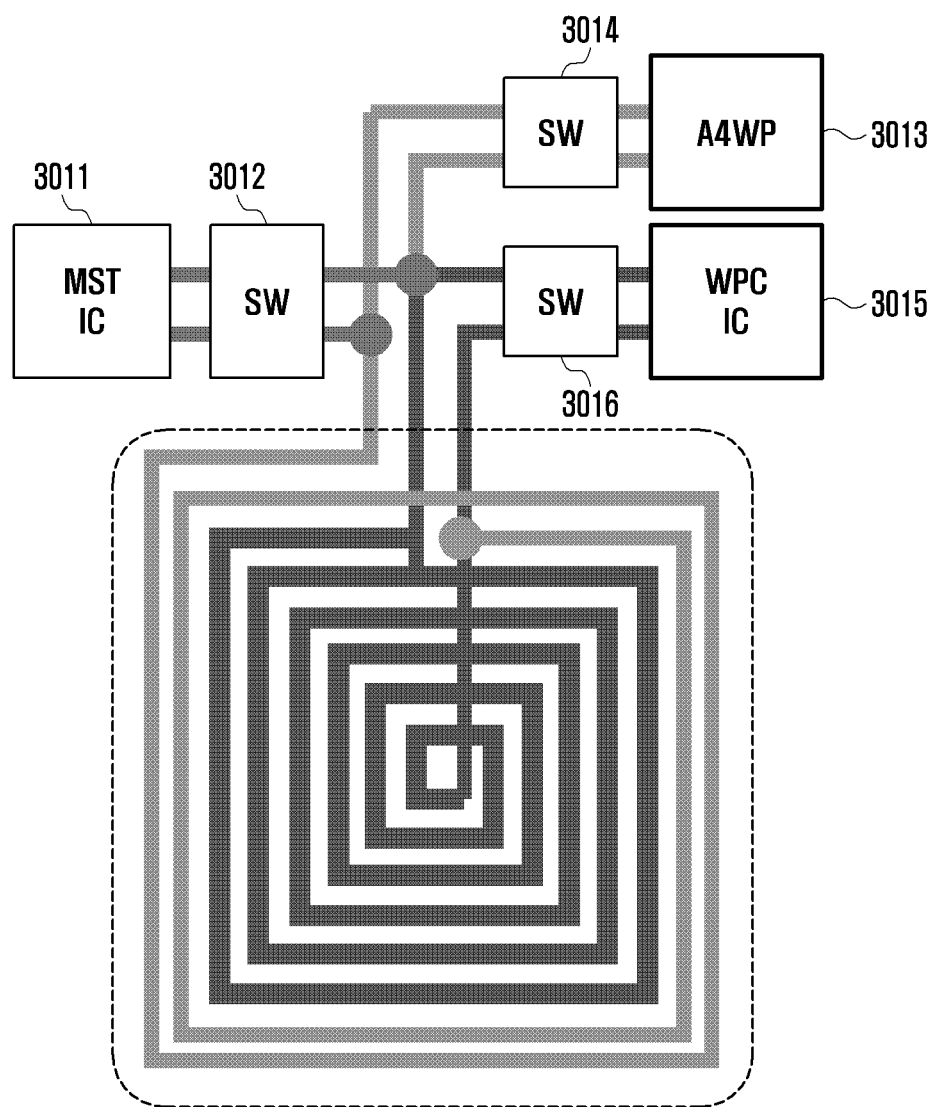
FIG. 30 is a construction showing a selective connection when an electronic device supports WPC and also A4WP according to embodiments of the present disclosure.

FIG. 30 is a structure diagram showing a selective connection when an electronic device according to embodiments of the present disclosure supports an induction method wireless charging method (e.g., WPC) and also resonant method wireless charging (e.g., A4WP).

2920 of FIG. 29A discloses a case where the electronic device 100 supports only WPC during wireless charging. Referring to FIG. 30, the electronic device 100 may further support A4WP. In this case, all of an A4WP IC 3013, a WPC IC 3015 and an MST IC 3011 do not influence mutual operations, and may be selectively connected to through switches 3012, 3014 and 3016 in order to prevent damage to the IC. For example, when the WPC technology is used, only the switch 3016 connected to the WPC IC 3015 may be short-circuited, and the switch 3012 connected to the MST IC 3011 and the switch 3014 connected to the A4WP 3013 may be open. Such selective short-circuit or open of the switches may be applied when the A4WP and MST technologies are used.

In accordance with various embodiments, the WPC IC 3015 may use a WPC coil (deep color). The MST IC 3011 or the A4WP IC 3013 may connect and use an MST coil (light color) and the WPC coil (deep color).

Figure 31:
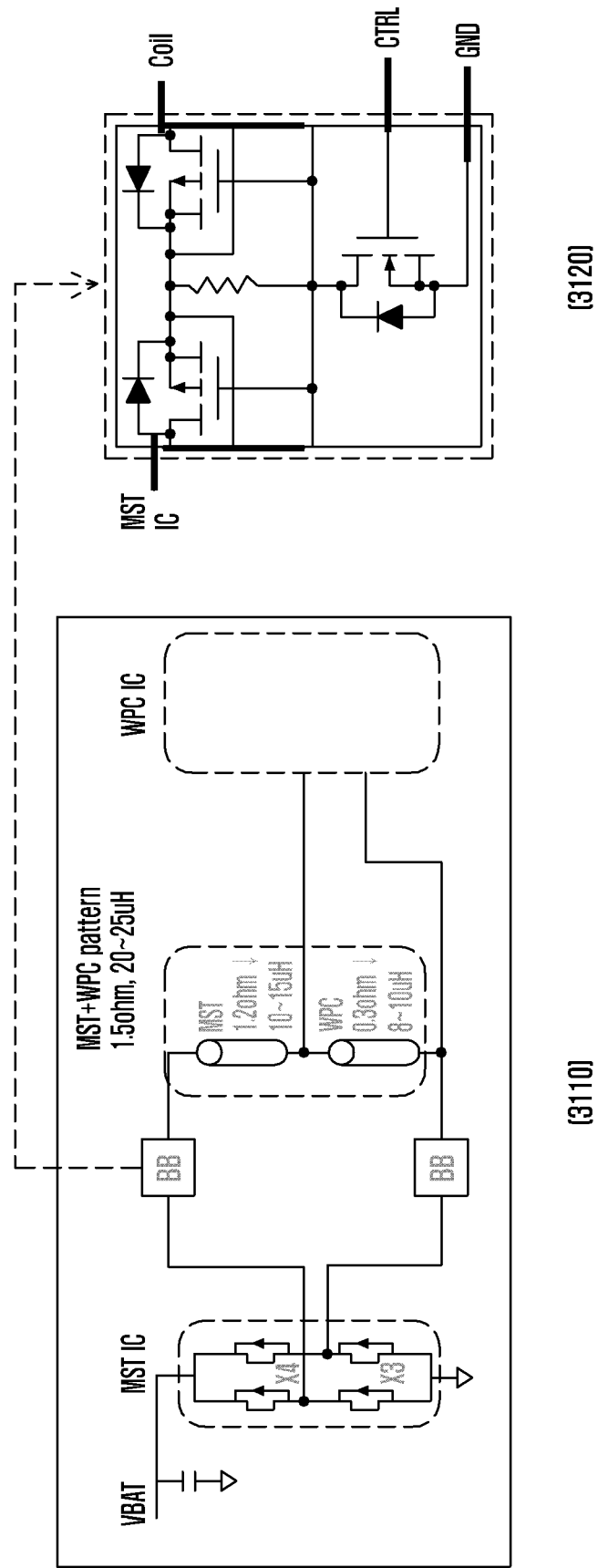
FIG. 31 is a diagram showing a selective connection structure of an MST coil and a WPC coil and an internal structure of a switch according to embodiments of the present disclosure.

FIG. 31 is a diagram showing the selective connection structure 3110 of an MST coil and a WPC coil and the internal structure 3120 of a switch according to embodiments of the present disclosure.

Referring to FIG. 31, all of MST, WPC and A4WP may use a high current. For example, output of an MST IC may be 2.5 A. Furthermore, a switch 3120 needs to be capable of AC blocking of a given level or more because a high AC voltage may be generated. For example, the switch 3120 needs to be capable of clamping a voltage of 50 V or more. Furthermore, for efficient transmission and charging of a magnetic signal, the switch needs to have low resistance when it is on. For example, Ron resistance of the switch 3120 may be 300 mohm or less. In order to satisfy the condition, a 1channel back2back switch using two P type field effect transistors (FETs) may be used.

Figure 32:
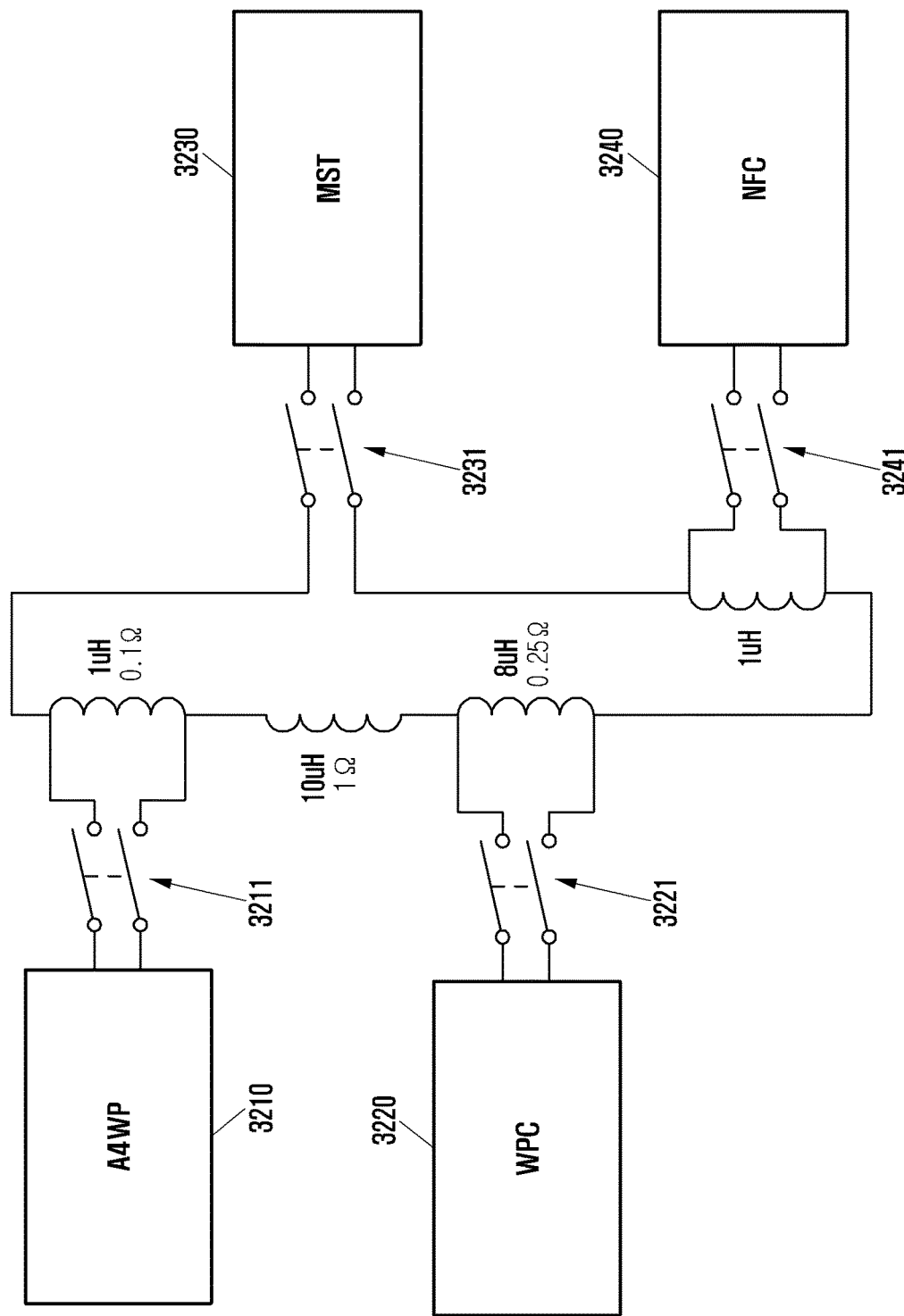
FIG. 32 is a diagram showing a structure in which an MST coil extended up to an A4WP coil, a WPC coil and an NFC coil is used according to embodiments of the present disclosure.

FIG. 32 is a diagram showing a structure in which an MST coil extended up to an A4WP coil, a WPC coil and an NFC coil is used according to embodiments of the present disclosure.

Referring to FIG. 32, when an MST operation is performed, only a switch 3231 connected to an MST circuit 3230 is short-circuited. Switches 3211, 3221 and 3241 connected to A4WP 3210, WPC 3220 and NFC 3240, respectively, may be open in order to prevent the MST operation from being influenced. For example, if all coils are shared as in FIG. 32, the MST can secure inductance of up to 20 uH. Accordingly, radiation performance of the MST can be further improved.

In accordance with various embodiments, if the A4WP 3210, the WPC 3220 or the NFC 3240 is used, only a switch connected to an operating circuit is short-circuited and switches connected to the remaining circuits may be open. Accordingly, each circuit can be prevented from influencing the other circuits.

Figure 33:
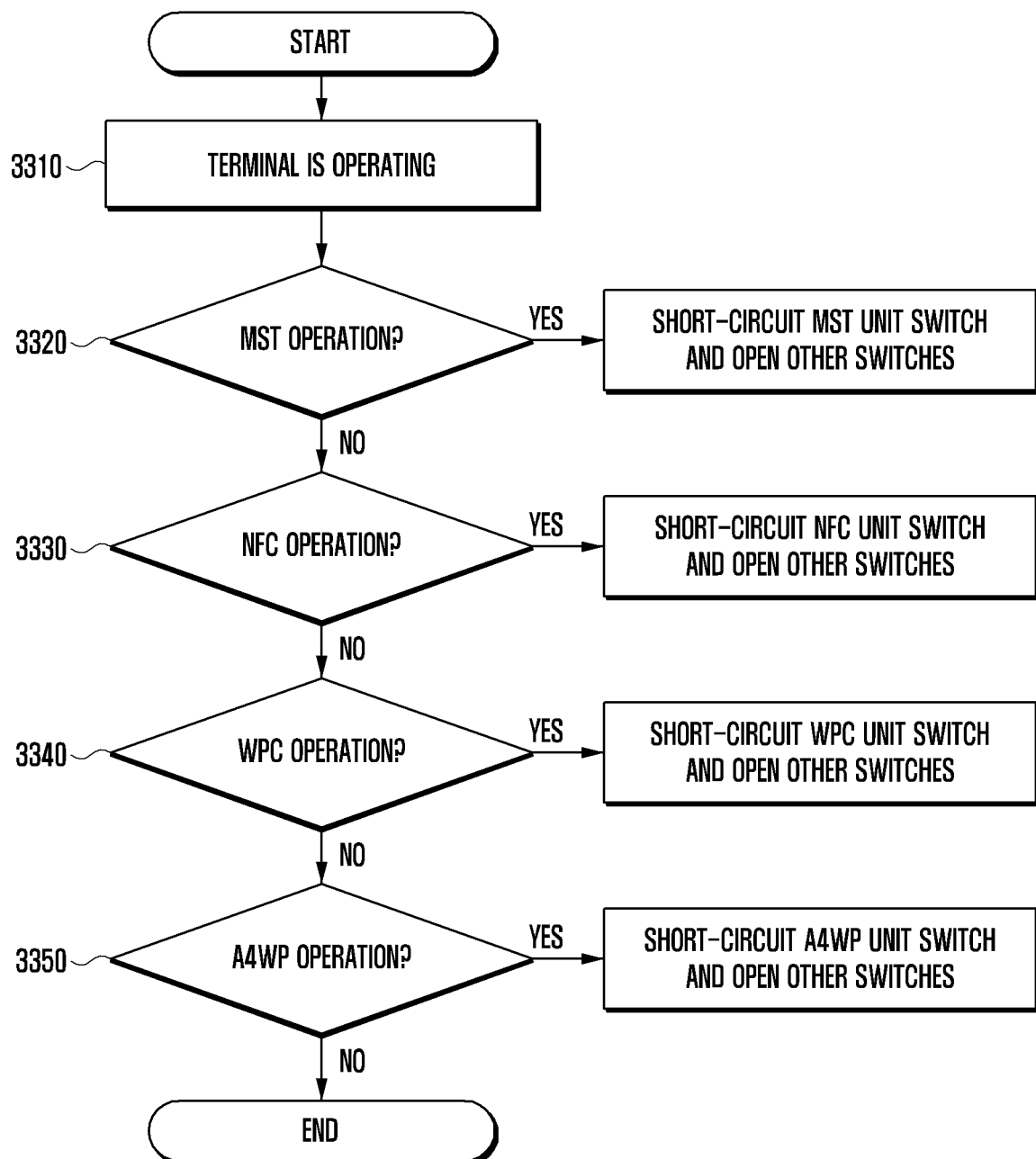
FIG. 33 is a flowchart regarding a switch operation in a coil share structure according to embodiments of the present disclosure.

FIG. 33 is a flowchart regarding a switch operation in a coil share structure according to embodiments of the present disclosure.

Referring to FIG. 33, in accordance with embodiments of the present disclosure, the electronic device 100 may identify that the terminal operates at operation 3310.

In accordance with embodiments of the present disclosure, the electronic device 100 may identify whether an MST operation is necessary at operation 3320. For example, when the MST operation is necessary, the electronic device 100 may short-circuit the switch of an MST unit and open all switches connected to the remaining circuits. For another example, when the MST operation is not necessary, the electronic device 100 may branch to operation 3330.

In accordance with embodiments of the present disclosure, the electronic device 100 may identify whether an NFC operation is necessary at operation 3330. For example, when the NFC operation is necessary, the electronic device 100 may short-circuit the switch of an NFC unit and open all switches connected to the remaining circuits. For another example, when the NFC operation is not necessary, the electronic device 100 may branch to operation 3340.

In accordance with embodiments of the present disclosure, the electronic device 100 may identify whether a WPC operation is necessary at operation 3340. For example, when the WPC operation is necessary, the electronic device 100 may short-circuit the switch of a WPC unit and open all switches connected to the remaining circuits. For another example, when the WPC operation is not necessary, the electronic device 100 may branch to operation 3350.

In accordance with embodiments of the present disclosure, the electronic device 100 may identify whether an A4WP operation is necessary at operation 3350. For example, when the A4WP operation is necessary, the electronic device 100 may short-circuit the switch of an A4WP unit and open all switches connected to the remaining circuits. For another example, when the A4WP operation is not necessary, the electronic device 100 may terminate an operation according to the current flowchart or return to operation 3310. The sequence of the disclosed operations 3320 to 3350 may be freely changed by a change in the design. Furthermore, the operations 3320 to 3350 may be identified with a time lag and all the operations may be identified at the same time.

An electronic device according to one embodiment may adjust the length of a coil using at least one switch. Accordingly, performance can be optimized according to each technology. Furthermore, the best performance can be secured without being influenced by interference from each circuit through the on/off of the switch. Accordingly, usability of a users wireless technology can be effectively improved.

Figure 34:
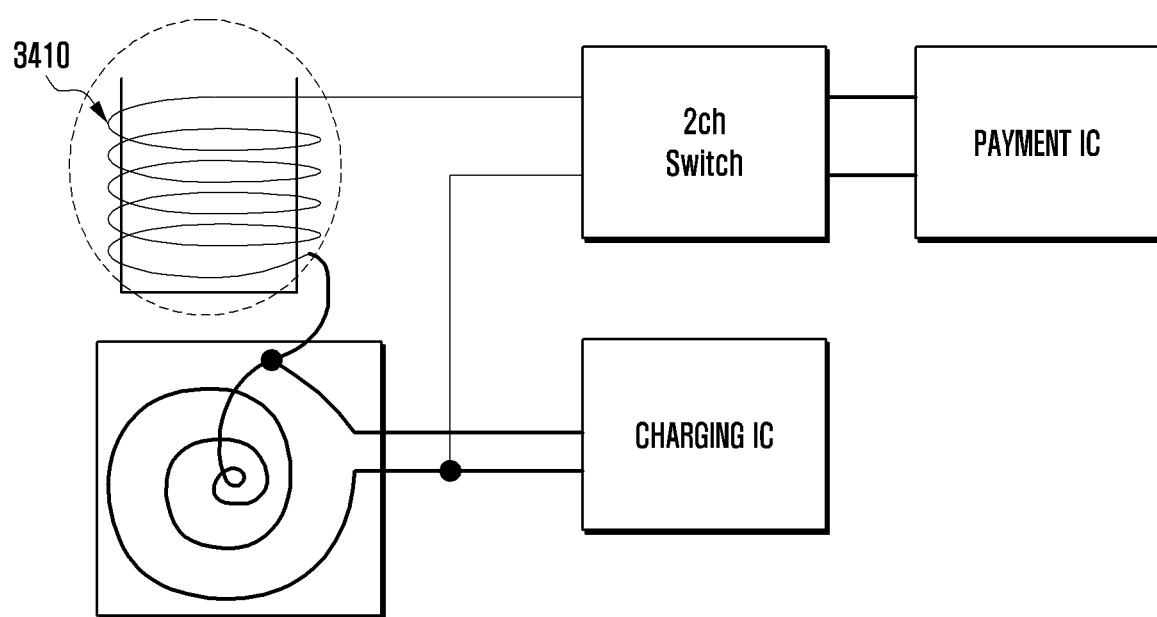
FIG. 34 is a diagram showing that coils of various forms may be used in the coil share structure according to embodiments of the present disclosure.

FIG. 34 is a diagram showing that coils of various forms may be used in the coil share structure according to embodiments of the present disclosure.

Referring to FIG. 34, in accordance with embodiments of the present disclosure, a solenoid 3410 may be used as the coil of the payment circuit of the to electronic device 100. For example, coils disclosed in FIG. 34 may be connected to different ICs (e.g., payment IC and charging IC).

In accordance with various embodiments, in the case of a payment circuit, usability can be increased only when the recognition area and recognition distance of a magnetic signal are wide. For example, the electronic device 100 may widely spread a magnetic signal of the payment circuit using the solenoid 3410. Accordingly, an effect that the payment area of the electronic device 100 is increased can be obtained.

Figure 35:
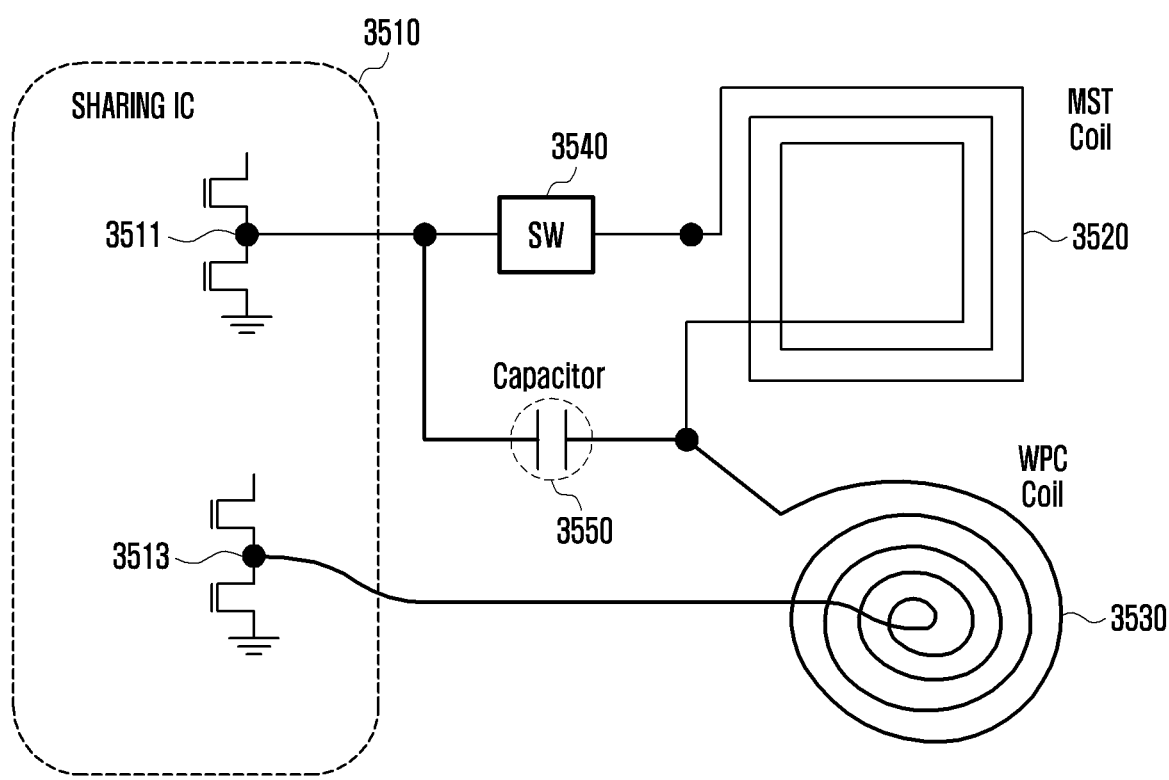
FIG. 35 is a diagram showing an electronic device in which an IC for wireless charging and an IC for MST have a shared IC in the coil share structure according to to embodiments of the present disclosure.

FIG. 35 is a diagram showing the electronic device 100 in which an IC for wireless charging and an IC for MST have a shared IC 3510 in the coil share structure according to embodiments of the present disclosure.

According to one embodiment, the electronic device 100 may support a wireless charging operation and a payment operation through a sharing IC 3510 in which an IC for wireless charging and an IC for MST have been integrated into one. The sharing IC 3510 may have one end 3513 connected to a coil for wireless charging (e.g., WPC coil 3530) and one end 3511 connected to a coil for payment (e.g., MST coil 3520). At least one switch (SW) 3540 may be included between the sharing IC and the MST coil. A capacitor 3550 may be present between the sharing IC 3510 and one end to which the coil for wireless charging 3530 and the MST coil 3520 are connected. The capacitor may match the resonant frequency of the coil for wireless charging 3530 with a wireless charging frequency (e.g., WPC frequency). It is difficult for an MST signal to flow into a path to which the capacitor is connected because the frequency of MST is different from the matched frequency (e.g., WPC frequency). A bandpass filter or a high bandpass filter may be used instead of the capacitor.

The electronic device 100 according to one embodiment may open a switch 3540 between the MST coil 3520 and the sharing IC 3510 when performing a wireless charging operation, and may short-circuit the switch 3540 when performing a payment operation.

Figure 36:
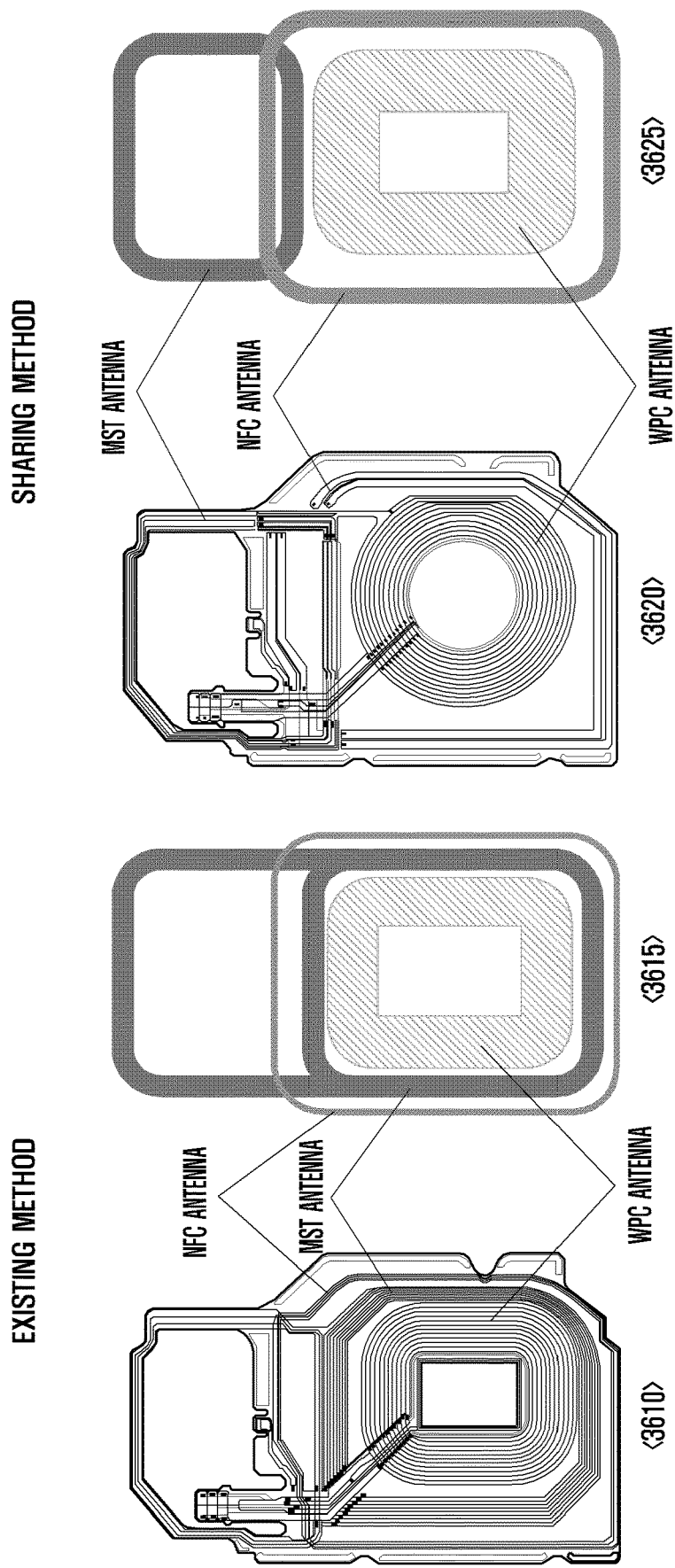
FIG. 36 is a diagram showing the mounting of coils on an electronic device according to an embodiment of the present disclosure.

FIG. 36 is a diagram showing the mounting of coils on an electronic device according to an embodiment of the present disclosure.

Referring to 3610 and 3615 of FIG. 36, the electronic device 100 may have a structure on which a coil for wireless charging (e.g., WPC antenna), an MST coil and an NFC coil are mounted.

In the electronic device 100 according to one embodiment, the coil for wireless charging may be positioned on the innermost side, the NFC coil may be positioned on the outermost side, and the MST coil may be positioned between the coil for wireless charging and the NFC coil. If coils having different uses are mounted, there may be a spatial limit in coil mounting. There may be at least some limits to forms (e.g., a shape, the number of turns and a coil thickness) of the coils due to an interference problem between the coils of different uses.

Referring to 3620 and 3625 of FIG. 36, the electronic device 100 may have a structure in which at least some of a coil for wireless charging (e.g., WPC antenna), an MST coil and an NFC coil are shared.

In the electronic device 100 according to one embodiment, the coil for wireless charging may be positioned on the innermost side, the NFC coil may be positioned on the outermost side, and the MST coil may be positioned at a portion where at least some area of the coil for wireless charging is shared. If the MST coil shares at least some of the coil for wireless charging, the spatial limit problem of the coil for wireless charging and the spatial limit problem of the MST coil can be reduced. Accordingly, performance (e.g., signal intensity and distance increase) improvement can be obtained. If the coil for wireless charging and the MST coil are shared, the MST coil may not surround the coil for wireless charging unlike in FIG. 3610 or 3615, and the coils may have various forms (e.g., a shape, the number of turns and a coil thickness). For example, reception performance of a wireless power signal can be improved because the coil for wireless charging is similar to a coil included in a wireless charger or has the same circular form, the number of turns is increased or a coil thickness is increased. For another example, since the MST antenna shares at least some of the increased coil for wireless charging, the recognition area or recognition distance of a signal can be increased. For yet another example, since the MST coil shares at least some of the coil for wireless charging, at least some of the MST coil positioned in the area surrounding the coil for wireless charging can be reduced. Furthermore, performance (e.g., a signal intensity increase or a recognition distance increase) of NFC can be improved because forms (e.g., a shape, the number of turns and the coil thickness) of the NFC coil positioned on the outermost side are expanded.

Figure 37:
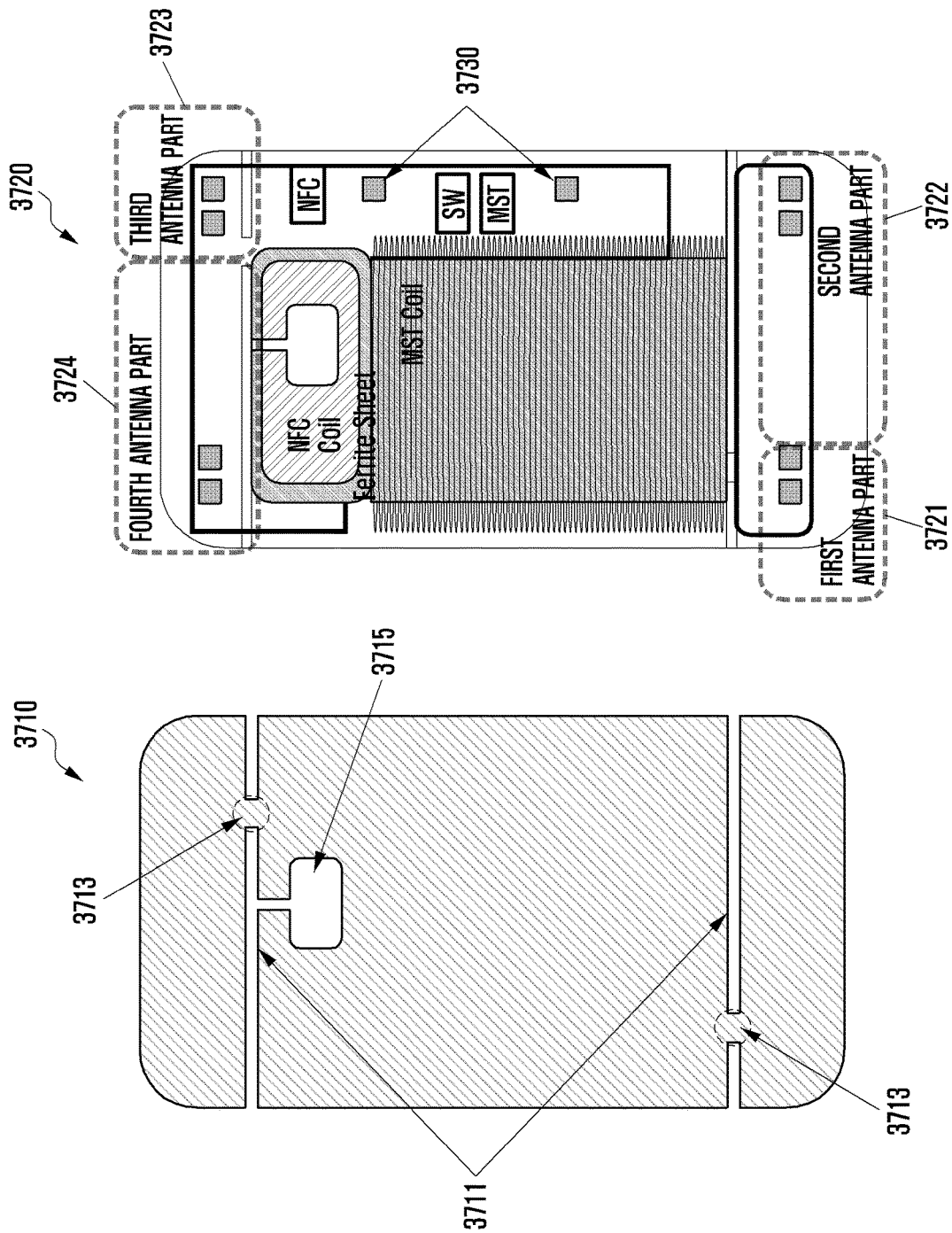
FIG. 37 is a diagram showing an electronic device on which coils have been mounted in the coil share structure according to embodiments of the present disclosure.

FIG. 37 is a diagram showing an electronic device on which coils have been mounted in the coil share structure according to embodiments of the present disclosure.

3710 of FIG. 37 may show the rear casing of the electronic device 100 formed of a conductor. 3720 may schematically show the state in which internal components (PCB, battery, MST coil, NFC coil, etc.) of the electronic device 100 have been coupled.

In accordance with various embodiments, the rear casing of the electronic device 100 may be divided into three parts through slits 3711. Furthermore, the three parts may become conductive through connection parts 3713. An opening 3715 where an optical sensor (camera, PPG sensor, etc.) may be positioned may be included in the rear casing. The slit 3711 is connected to the opening and may have a T-shaped form.

In accordance with various embodiments, referring to FIG. 3720, the MST coil is wound around a ferrite sheet in a solenoid form, and may be positioned between the slits 3711. The ferrite sheet may induce a magnetic flux, formed by the MST coil, toward both sides of the slits and deliver it to the outside of the electronic device 100. A battery (not shown) may be positioned at the back of the MST coil.

In accordance with various embodiments, at least two of the MST coil, the coil for wireless charging and the NFC coil may be connected through a switch. For example, the MST coil and the NFC coil surrounding the ferrite sheet may be connected through the switch.

In accordance with various embodiments, antennas may be formed below the lower slit at the bottom of the rear casing. The left side of the connection part 3713 is a first antenna 3721, and the right side thereof is a second antenna 3722. The antenna may receive a signal from a circuit through feed power positioned in a SUB-PCB, and may radiate the signal. Furthermore, the first antenna 3721 or the second antenna 3722 may receive a wireless signal and deliver the signal to the circuit through feed power.

In accordance with various embodiments, the first antenna 3721 and the second antenna 3722 may operate as main antennas that transmit and receive signals. A frequency supported by the first antenna 3721 may be higher than a frequency supported by the second antenna 3722. For example, the first antenna 3721 may support 1.6 GHz-5 GHz, and the second antenna 3722 may support 600 MHz-2 GHz.

In accordance with one embodiment, antennas may be formed above the upper slit of the rear casing. The left side of the connection part 3713 is a fourth antenna 3724, and the right side thereof is a third antenna 3723. The antenna may receive a signal from a circuit through feed power positioned in a PCB, and may radiate the signal. Furthermore, alternatively, the third antenna 3723 or the fourth antenna 3724 may receive a wireless signal and deliver the signal to the circuit through feed power.

In accordance with various embodiments, the third antenna 3723 and the fourth antenna 3724 that receive a signal may operate as diversity antennas. A frequency supported by the third antenna 3723 may be higher than a frequency supported by the fourth antenna 3724. For example, the third antenna 3723 may support 1.6 GHz-5 GHz, and the fourth antenna 3724 may support 600 MHz-2 GHz.

In accordance with one embodiment, the connection parts 3713 may be positioned on opposite sides on an X axis. The first antenna 3721 and the third antenna 3723, and the second antenna 3722 and the fourth antenna 3724, each one supporting a similar frequency, are positioned in respective diagonal lines, thereby being capable of increasing isolation between the antennas and lowering correlation in signal transmission and reception.

In accordance with various embodiments, a central part between the slits 3711 of the rear casing may be grounded by ground parts 3730 on the PCB. In order to prevent an electric shock, the ground of the PCB may be connected to the rear casing through a capacitor. Performance of the antenna can be improved and a noise shielding effect can be increased through the grounds. The internal heights of the PCB and the SUB-PCB in the electronic device 100 may be different. The PCB and the SUB-PCB may be connected to an FPCB. The SUB-PCB may be positioned at a lower location than the PCB, so the distance between the SUB-PCB and the first/second antenna part in the Z axis may be greater than the distance between the PCB and the first antenna part. Performance of the first/second antenna part can be improved by increasing the distance between the SUB-PCB and the first/second antenna part. The circuit of the main PCB and the feed power unit of the SUB-PCB may be connected through a coaxial line.

An electronic device according to various embodiments includes a first cover configured to form the front of the electronic device; a second cover configured to form the back of the electronic device; memory included in a space formed between the first cover and the second cover; a processor included in the space and electrically connected to the memory; a first antenna and second antenna included in the space and electrically connected to the processor, and a switch included in the space and connected to at least one of the first antenna and the second antenna. When the memory may be executed, the memory may include instructions enabling the processor to short-circuit the switch so that the first antenna and the second antenna are connected when the processor executes a function corresponding to the first antenna; and the first antenna and the second antenna together transmits magnetic field signals.

The instructions may include instructions enabling the processor to open the switch so that the first antenna and the second antenna are separated when the processor executes a function corresponding to the second antenna; and a magnetic field signal is transmitted using the second antenna.

The first antenna may be an MST coil, and the second antenna may be a wireless charging coil.

The first antenna may be an NFC coil, and the second antenna may be a wireless charging coil.

The switch may be connected to the first antenna.

The centers of the first antenna and the second antenna may be identical.

The centers of the first antenna and the second antenna may not be identical.

The first antenna may be a flat coil, and the second antenna may be a solenoid.

The electronic device may further include a third antenna included in the space and electrically connected to the processor and switches included in the space and connected to the first antenna to the third antenna, respectively. The instructions may include instructions enabling the processor to short-circuit only a switch connected to an antenna corresponding to an executed function when the processor executes the function corresponding to at least one of the first antenna, the second antenna and the third antenna.

The third antenna may be an NFC coil and may be positioned on the outermost side surrounding the first antenna and the second antenna.

A method of operating an electronic device including a first antenna, a second antenna and a switch connected to at least one of the first antenna and the second antenna according to various embodiments may include an operation of connecting the first antenna and the second antenna by short-circuiting the switch when a function corresponding to the first antenna may be executed; and an operation for the first antenna and the second antenna to transmit magnetic field signals together.

The method may further include an operation of separating the first antenna and the second antenna by opening the switch when a function corresponding to the second antenna may be executed; and an operation of transmitting a magnetic field signal using the second antenna.

The first antenna may be an MST coil and the second antenna may be a wireless charging coil.

The first antenna may be an NFC coil and the second antenna may be a wireless charging coil.

The switch may be connected to the first antenna.

The centers of the first antenna and the second antenna may be identical.

The centers of the first antenna and the second antenna may not be identical.

The first antenna may be a flat coil, and the second antenna may be a solenoid.

The electronic device may further include switches connected to the third antenna and the first antenna to the third antenna, respectively. The electronic device may further include an operation of short-circuiting only a switch connected to an antenna corresponding to an executed function when the function corresponding to at least one of the first antenna, second antenna and third antenna is executed.

The third antenna is an NFC coil and may be positioned on the outermost side surrounding the first antenna and the second antenna.

The embodiments disclosed in this document have been proposed for description and understanding of the disclosed technical contents and do not limit the scope of the present disclosure. Accordingly, the scope of the present disclosure should be construed as including all changes or various other embodiments based on the technical spirit of the present disclosure.

The invention claimed is:

1. An electronic device, comprising:
    a first antenna;
    a second antenna;
    a switch connected to at least one of the first antenna and the second antenna;
    a filter configured to filter a pre-determined frequency and connected to the first antenna and the second antenna;
    a processor electrically connected to the switch and the filter,
    wherein the processor is configured to:
       control the switch to short-circuit so that the first antenna and the second antenna are connected and transmit magnetic field signals together.

2. The device of claim 1, wherein the processor is configured to open the switch so that the first antenna and the second antenna are separated when the processor executes a function corresponding to the second antenna; and a magnetic field signal is transmitted using the second antenna.

3. The device of claim 1, wherein:
the filter has a resonant frequency associated with a wireless charging frequency so that the filter filters a magnetic secure transfer (MST) signal.

4. The device of claim 3, wherein the switch is connected to the first antenna.

5. The device of claim 1, wherein:
the filter is a capacitor configured to have a resonant frequency associated to a wireless charging frequency so that the capacitor filters an MST signal.

6. The device of claim 1, wherein centers of the first antenna and the second antenna are identical.

7. The device of claim 1, wherein centers of the first antenna and the second antenna are not identical.

8. The device of claim 1, wherein:
the first antenna is a flat coil, and
the second antenna is a solenoid.

9. The device of claim 1, further comprising:
a third antenna electrically connected to the processor; and
second and third switches connected to the first antenna to the third antenna, respectively,
wherein the processor is configured to short-circuit only a switch connected to an antenna corresponding to a function executed by the processor.

10. The device of claim 9, wherein the third antenna is a near field communication (NFC) coil and is positioned on an outermost side surrounding the first antenna and the second antenna.

11. A method of operating an electronic device comprising a first antenna, a second antenna, a filter configured to filter a pre-determined frequency and connected to the first antenna and the second antenna and a switch connected to at least one of the first antenna and the second antenna, the method comprising:
connecting the first antenna and the second antenna by short-circuiting the switch when a function corresponding to the first antenna is executed; and
transmitting magnetic field signals together with the first antenna and the second antenna.

12. The method of claim 11, further comprising:
separating the first antenna and the second antenna by opening the switch when a function corresponding to the second antenna is executed; and
transmitting a magnetic field signal using the second antenna.

13. The method of claim 11, wherein:
the filter has a resonant frequency associated with a wireless charging frequency so that the filter filters an MST signal.

14. The method of claim 13, wherein the switch is connected to the first antenna.

15. The method of claim 11, wherein centers of the first antenna and the second antenna are identical or the centers of the first antenna and the second antenna are not identical.

* * * * *